US007415589B2

(12) United States Patent  
Hirakawa et al.

(10) Patent No.: US 7,415,589 B2
(45) Date of Patent: Aug. 19, 2008

(54) DATA PROCESSING SYSTEM WITH MULTIPLE STORAGE SYSTEMS

(75) Inventors: Yusuke Hirakawa, Odawara (JP); Kazuhito Suishu, Odawara (JP); Yoshihiro Asaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/798,798

(22) Filed: May 17, 2007

(65) Prior Publication Data

US 2007/0260832 A1 Nov. 8, 2007

Related U.S. Application Data

(63) Continuation of application No. 11/595,853, filed on Nov. 13, 2006, now Pat. No. 7,240,173, which is a continuation of application No. 11/328,059, filed on Jan. 10, 2006, now Pat. No. 7,167,963, which is a continuation of application No. 10/879,472, filed on Jun. 30, 2004, now Pat. No. 7,117,327.

(30) Foreign Application Priority Data

Apr. 28, 2004 (JP) .............................. 2004-133418

(51) Int. Cl.
*G06F 12/00* (2006.01)
(52) U.S. Cl. ...................... 711/162; 711/111; 711/112; 711/114; 707/204
(58) Field of Classification Search .................. 711/162
See application file for complete search history.

(56) References Cited

U.S. PATENT DOCUMENTS

| 5,860,090 | A | 1/1999 | Clark .......................... 711/113 |
| 5,873,096 | A | 2/1999 | Lim et al. | |
| 6,144,999 | A | 11/2000 | Khalidi et al. | |
| 6,148,383 | A | 11/2000 | Micka et al. ................. 711/162 |
| 6,209,002 | B1 | 3/2001 | Gagne et al. | |
| 6,457,053 | B1 | 9/2002 | Satagopan et al. .......... 709/226 |
| 6,463,501 | B1 | 10/2002 | Kern et al. | |
| 6,611,901 | B1 * | 8/2003 | Micka et al. ................. 711/162 |

(Continued)

FOREIGN PATENT DOCUMENTS

EP 1283469 A2 2/2003

(Continued)

*Primary Examiner*—Donald Sparks
*Assistant Examiner*—Hashem Farrokh
(74) *Attorney, Agent, or Firm*—Mattingly, Stanger, Malur & Brundidge, P.C.

(57) ABSTRACT

A data processing system has a plurality of storage systems. In this system, data replication is performed at high speed and efficiency while maintaining data integrity. In addition, when failure has occurred in a configuration element, the time necessary to resume the data replication is reduced. In accordance with an instruction from first host computer, updating of replication-target data and creation of a journal are performed in a storage system A; and updating of replication data and creation of a journal are performed in a storage system B. A storage system C retrieves a journal from the storage system B in asynchronization with the updating, and performs updating of replication data. When failure has occurred in the storage system B, a journal-retrieving end is altered to the storage system, and the replication data is updated in accordance with the retrieved journal.

21 Claims, 66 Drawing Sheets

U.S. PATENT DOCUMENTS

| | | |
|---|---|---|
| 6,615,223 B1 | 9/2003 | Shih et al. |
| 6,622,152 B1 | 9/2003 | Sinn et al. |
| 6,779,093 B1 | 8/2004 | Gupta ........................ 711/162 |
| 7,020,743 B2 | 3/2006 | Lee et al. .................... 711/113 |
| 7,117,327 B2 | 10/2006 | Hirakawa et al. |
| 7,167,963 B2 | 1/2007 | Hirakawa et al. |
| 2003/0014523 A1 | 1/2003 | Teloh et al. ................. 709/226 |
| 2003/0051111 A1 | 3/2003 | Nakano et al. .............. 711/162 |
| 2004/0024975 A1 | 2/2004 | Morishita et al. ........... 711/147 |
| 2004/0260899 A1* | 12/2004 | Kern et al. .................. 711/162 |
| 2005/0071389 A1 | 3/2005 | Gupta |
| 2005/0071710 A1 | 3/2005 | Micka et al. |
| 2005/0114285 A1 | 5/2005 | Cincotta |
| 2005/0182888 A1* | 8/2005 | Murotani et al. ............... 711/1 |
| 2006/0107007 A1 | 5/2006 | Hirakawa et al. |

FOREIGN PATENT DOCUMENTS

| | | |
|---|---|---|
| EP | 1494120 A2 | 1/2005 |
| EP | 1494120 A3 | 2/2005 |
| EP | 1548594 A1 | 6/2005 |

\* cited by examiner

FIG.3

| SETTING ITEM | EXAMPLE SET VALUE |
|---|---|
| RECEIVED TIME OF WRITE INSTRUCTION | 1999/3/17 22:20:10 |
| GROUP NUMBER | 1 |
| UPDATE NUMBER | 4 |
| LOGICAL ADDRESS OF WRITE INSTRUCTION | LOGICAL VOLUME NUMBER : 1<br>POSITION FROM FIRST POSITION OF STORAGE AREA IN LOGICAL VOLUME : 700 |
| DATA SIZE OF WRITE DATA | 300 |
| LOGICAL ADDRESS OF JOURNAL LOGICAL VOLUME STORING WRITE DATA | LOGICAL VOLUME NUMBER : 4<br>POSITION FROM FIRST POSITION OF STORAGE AREA IN LOGICAL VOLUME : 1500 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | PRIMARY | OPEN3 | 3 | 1 | 0 | 1 | 0 |
| 2 | PRIMARY | OPEN6 | 6 | 2 | 0 | 1 | 3 |
| 3 | UNUSED | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | UNUSED | OPEN6 | 6 | 0 | 0 | 2 | 12 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | PRIMARY/ SECONDARY | OPEN3 | 3 | 1 | 3 | 1 | 0 |
| 2 | PRIMARY/ SECONDARY | OPEN6 | 6 | 2 | 4 | 2 | 0 |
| 3 | NORMAL | OPEN9 | 9 | 0 | 0 | 3 | 0 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | SECONDARY | OPEN3 | 3 | 0 | 1 | 1 | 0 |
| 2 | SECONDARY | OPEN6 | 6 | 0 | 2 | 2 | 0 |
| 3 | NORMAL | OPEN9 | 9 | 0 | 0 | 3 | 0 |

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | A | 1 | B | 1 | 1 | 0 |
| 2 | NORMAL | A | 2 | B | 2 | 1 | 0 |
| 3 | UNUSED | 0 | 0 | 0 | 0 | 0 | 0 |

500

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | A | 1 | B | 1 | 1 | 0 |
| 2 | NORMAL | A | 2 | B | 2 | 1 | 0 |
| 3 | NORMAL | B | 1 | C | 1 | 2 | 0 |
| 4 | NORMAL | B | 2 | C | 2 | 2 | 0 |
| 5 | UNUSED | 0 | 0 | 0 | 0 | 0 | 0 |

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | B | 1 | C | 1 | 1 | 0 |
| 2 | NORMAL | B | 2 | C | 2 | 1 | 0 |
| 3 | UNUSED | 0 | 0 | 0 | 0 | 0 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 4 | 6 | SYNCHRONOUS | B | 1 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 3 | 6 | SYNCHRONOUS | A | 1 |
| 2 | NORMAL | 3,4 | 3 | 6 | ASYNCHRONOUS | C | 1 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 3 | 5 | ASYNCHRONOUS | B | 2 |

| | LOGICAL ADDRESS | |
|---|---|---|
| | LOGICAL VOLUME NUMBER | POSITION FROM FIRST POSITION OF STORAGE AREA IN LOGICAL VOLUME |
| UPDATE INFORMATION AREA FIRST ADDRESS | 4 | 0 |
| WRITE DATA AREA FIRST ADDRESS | 4 | 700 |
| UPDATE INFORMATION LATEST ADDRESS | 4 | 250 |
| UPDATE INFORMATION OLDEST ADDRESS | 4 | 50 |
| WRITE DATA LATEST ADDRESS | 4 | 2200 |
| WRITE DATA OLDEST ADDRESS | 4 | 1300 |
| READ INITIATION ADDRESS | 4 | 200 |
| RETRY INITIATION ADDRESS | 4 | 150 |

| | LOGICAL ADDRESS | |
|---|---|---|
| | LOGICAL VOLUME NUMBER | POSITION FROM FIRST POSITION OF STORAGE AREA IN LOGICAL VOLUME |
| UPDATE INFORMATION AREA FIRST ADDRESS | 3 | 0 |
| WRITE DATA AREA FIRST ADDRESS | 3 | 700 |
| UPDATE INFORMATION LATEST ADDRESS | 3 | 250 |
| UPDATE INFORMATION OLDEST ADDRESS | 3 | 150 |
| WRITE DATA LATEST ADDRESS | 3 | 2200 |
| WRITE DATA OLDEST ADDRESS | 3 | 1800 |
| READ INITIATION ADDRESS | 3 | 200 |
| RETRY INITIATION ADDRESS | 3 | 150 |

| | LOGICAL ADDRESS | |
|---|---|---|
| | LOGICAL VOLUME NUMBER | POSITION FROM FIRST POSITION OF STORAGE AREA IN LOGICAL VOLUME |
| UPDATE INFORMATION AREA FIRST ADDRESS | 3 | 0 |
| WRITE DATA AREA FIRST ADDRESS | 3 | 700 |
| UPDATE INFORMATION LATEST ADDRESS | 3 | 200 |
| UPDATE INFORMATION OLDEST ADDRESS | 3 | 50 |
| WRITE DATA LATEST ADDRESS | 3 | 2000 |
| WRITE DATA OLDEST ADDRESS | 3 | 1300 |
| READ INITIATION ADDRESS | 3 | 0 |
| RETRY INITIATION ADDRESS | 3 | 0 |

| SETTING ITEM | EXAMPLE SET VALUE |
|---|---|
| RECEIVED TIME OF WRITE INSTRUCTION | 1999/3/17 22:20:10 |
| GROUP NUMBER | 1 |
| UPDATE NUMBER | 5 |
| LOGICAL ADDRESS OF WRITE INSTRUCTION | LOGICAL VOLUME NUMBER : 1<br>POSITION FROM FIRST POSITION OF STORAGE AREA IN LOGICAL VOLUME : 800 |
| DATA SIZE OF WRITE DATA | 100 |
| LOGICAL ADDRESS OF JOURNAL LOGICAL VOLUME STORING WRITE DATA | LOGICAL VOLUME NUMBER : 4<br>POSITION FROM FIRST POSITION OF STORAGE AREA IN LOGICAL VOLUME : 2200 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | PRIMARY | OPEN3 | 3 | 1 | 3 | 1 | 0 |
| 2 | PRIMARY | OPEN6 | 6 | 2 | 4 | 1 | 3 |
| 3 | UNUSED | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | UNUSED | OPEN6 | 6 | 0 | 0 | 2 | 12 |

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | ABNORMAL | A | 1 | B | 1 | 1 | 0 |
| 2 | ABNORMAL | A | 2 | B | 2 | 1 | 0 |
| 3 | NORMAL | A | 1 | C | 1 | 2 | 0 |
| 4 | NORMAL | A | 2 | C | 2 | 2 | 0 |
| 5 | UNUSED | 0 | 0 | 0 | 0 | 0 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | ABNORMAL | 1,2 | 4 | 6 | SYNCHRONOUS | B | 1 |
| 2 | NORMAL | 3,4 | 4 | 6 | ASYNCHRONOUS | C | 1 |

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | A | 1 | C | 1 | 1 | 0 |
| 2 | NORMAL | A | 2 | C | 2 | 1 | 0 |
| 3 | UNUSED | 0 | 0 | 0 | 0 | 0 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 3 | 4 | ASYNCHRONOUS | A | 2 |

600

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | PRIMARY | OPEN3 | 3 | 0 | 3,1 | 1 | 0 |
| 2 | PRIMARY | OPEN6 | 6 | 0 | 4,2 | 1 | 3 |
| 3 | UNUSED | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | UNUSED | OPEN6 | 6 | 0 | 0 | 2 | 12 |

400

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | A | 1 | B | 1 | 1 | 0 |
| 2 | NORMAL | A | 2 | B | 2 | 1 | 0 |
| 3 | NORMAL | A | 1 | C | 1 | 2 | 0 |
| 4 | NORMAL | A | 2 | C | 2 | 2 | 0 |
| 5 | UNUSED | 0 | 0 | 0 | 0 | 0 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 4 | 6 | ASYNCHRONOUS | B | 1 |
| 2 | NORMAL | 3,4 | 4 | 6 | ASYNCHRONOUS | C | 1 |

600

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | SECONDARY | OPEN3 | 3 | 0 | 3,1 | 1 | 0 |
| 2 | SECONDARY | OPEN6 | 6 | 0 | 4,2 | 2 | 0 |
| 3 | NORMAL | OPEN9 | 9 | 0 | 0 | 3 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 3 | 5 | ASYNCHRONOUS | A | 1 |
| 2 | ABNORMAL | 3,4 | 3 | 5 | ASYNCHRONOUS | C | 1 |

600

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS ||
|---|---|---|---|---|---|---|---|
| | | | | | | STORAGE DEVICE NUMBER | POSITION FROM FIRST POSITION |
| 1 | PRIMARY | OPEN3 | 3 | 1 | 3 | 1 | 0 |
| 2 | PRIMARY | OPEN6 | 6 | 2 | 4 | 1 | 3 |
| 3 | UNUSED | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | UNUSED | OPEN6 | 6 | 0 | 0 | 2 | 12 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 4 | 8 | SYNCHRONOUS | B | 1 |
| 2 | NORMAL | 3,4 | 4 | 8 | ASYNCHRONOUS | C | 1 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS ||
|---|---|---|---|---|---|---|---|
| | | | | | | STORAGE DEVICE NUMBER | POSITION FROM FIRST POSITION |
| 1 | SECONDARY | OPEN3 | 3 | 1 | 3 | 1 | 0 |
| 2 | SECONDARY | OPEN6 | 6 | 2 | 4 | 2 | 0 |
| 3 | NORMAL | OPEN9 | 9 | 0 | 0 | 3 | 0 |

| GROUP NUMBER | GROUP STATE | PAIR SET | JOURNAL LOGICAL VOLUME NUMBER | UPDATE NUMBER | REPLICATION MODE | DESTINATION STORAGE SYSTEM NUMBER | DESTINATION GROUP NUMBER |
|---|---|---|---|---|---|---|---|
| 1 | NORMAL | 1,2 | 3 | 7 | SYNCHRONOUS | A | 1 |
| 2 | ABNORMAL | 3,4 | 3 | 5 | ASYNCHRONOUS | C | 1 |

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | PRIMARY | OPEN3 | 3 | 1 | 3 | 1 | 0 |
| 2 | PRIMARY | OPEN6 | 6 | 2 | 4 | 2 | 0 |
| 3 | NORMAL | OPEN9 | 9 | 0 | 0 | 3 | 0 |

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | B | 1 | A | 1 | 1 | 0 |
| 2 | NORMAL | B | 2 | A | 2 | 1 | 0 |
| 3 | NORMAL | B | 1 | C | 1 | 2 | 0 |
| 4 | NORMAL | B | 2 | C | 2 | 2 | 0 |
| 5 | UNUSED | 0 | 0 | 0 | 0 | 0 | 0 |

500

| LOGICAL VOLUME NUMBER | VOLUME STATE | FORMAT TYPE | SIZE | SYNCHRONIZATION PAIR NUMBER | ASYNCHRONIZATION PAIR NUMBER | PHYSICAL ADDRESS | |
|---|---|---|---|---|---|---|---|
| | | | | | | STORAGE DEVICE NUMBER | POSITION FROM FIRST POSITION |
| 1 | SECONDARY | OPEN3 | 3 | 1 | 0 | 1 | 0 |
| 2 | SECONDARY | OPEN6 | 6 | 2 | 0 | 1 | 3 |
| 3 | UNUSED | OPEN6 | 6 | 0 | 0 | 1 | 9 |
| 4 | NORMAL | OPEN9 | 9 | 0 | 0 | 2 | 0 |
| 5 | NORMAL | OPEN3 | 3 | 0 | 0 | 2 | 9 |
| 6 | UNUSED | OPEN6 | 6 | 0 | 0 | 2 | 12 |

400

| PAIR NUMBER | PAIR STATE | PRIMARY STORAGE SYSTEM NUMBER | PRIMARY LOGICAL VOLUME NUMBER | SECONDARY STORAGE SYSTEM NUMBER | SECONDARY LOGICAL VOLUME NUMBER | GROUP NUMBER | COPIED ADDRESS |
|---|---|---|---|---|---|---|---|
| 1 | NORMAL | B | 1 | A | 1 | 1 | 0 |
| 2 | NORMAL | B | 2 | A | 2 | 1 | 0 |
| 3 | UNUSED | 0 | 0 | 0 | 0 | 0 | 0 |

DATA PROCESSING SYSTEM WITH MULTIPLE STORAGE SYSTEMS

CROSS-REFERENCE TO RELATED APPLICATION

The present application is a continuation of application Ser. No. 11/595,853, filed Nov. 13, 2006 now U.S. Pat. No. 7,240,173; which is a continuation of application Ser. No. 11/328,059, filed Jan. 10, 2006, now U.S. Pat. No. 7,167,963; which is a continuation of application Ser. No. 10/879,472, filed Jun. 30, 2004, now U.S. Pat. No. 7,117,327, which claims priority from Japanese Patent Application No. JP 2004-133418 filed on Apr. 28, 2004, the content of which is hereby incorporated by reference into this application.

TECHNICAL FIELD OF THE INVENTION

The present invention relates to a data processing system having a plurality of storage systems, and more specifically, to techniques for performing data replication between storage systems and performing continuation and resumption of data replication in the event of failure.

BACKGROUND OF THE INVENTION

In recent years, to enable continuous services to be provided at all times to customers, importance has been increasing for techniques regarding data replication between a plurality of storage systems so as to provide services even when failure has occurred in a storage system such as a storage device for storing data, particularly, techniques for performing data replication between remote sites and continuation/resumption for data replication in the event of failure. By way of techniques for replication information stored in a first storage system to a second storage system and a third storage system, there are techniques disclosed in a patent document described below.

In the specification of the U.S. Pat. No. 6,209,002, there is disclosed a technique in which data stored in a first storage system is transferred (replicated) to a second storage system, the transferred data is further replicated by the second storage system and transferred therefrom to a third storage system. A computer and the first storage system are connected together by means of a communication link, the first storage system and the second storage system connected together by means of a communication link, and further, the second storage system and the third storage system are connected together by means of a communication link. The first storage system retains a replication-object first logical volume. The second storage system retains a replicated copy of the first logical volume, namely a second logical volume, and also retains a replicated copy of the second logical volume, namely a third logical volume. The third storage system retains a replicated copy of the third logical volume, namely a fourth logical volume. The second storage system exclusively executes data replication processing from the second logical volume to the third logical volume, and data replication processing from the third logical volume to the fourth logical volume.

SUMMARY OF THE INVENTION

According to the technique disclosed in the specification of the U.S. Pat. No. 6,209,002 described above, the data difference between the first logical volume and the fourth logical volume is not managed. As such, when failure has occurred in the second storage system, since the data difference is not recognized by the system, the full data in the first logical volume should be transferred (replicated) to the third storage system to resume data replication in the fourth logical volume. During the data replication, a complete replicated copy regarding the first logical volume is not present, so that the time required for the processing during that time is preferably as short as possible. However, a problem is that the time is increased proportionately with the amount of the replication object data (the first logical volume).

The present invention is made in view of the problems described above. An object of the present invention is to provide a technique that enables data replication to be executed at high speed rate and efficiency while data integrity is being maintained, that enables reducing the time necessary until data replication is resumed in a replication-destination logical volume even when failure has occurred in a constitutional element, and that enables data integrity to be maintained even during a time until the replication-destination logical volume is updated in a data processing system having a plurality of storage systems, in which replication-target first logical volume stored in a first storage system is replicated to a second and third storage system. The expression "resumption of data replication" or variations thereof refers to an event that replication-destination replication data is updated consistent with the replication-source data (the first logical volume) into the state retaining a complete replicated copy.

Another object of the present invention is to provide a technique that enables reducing the time necessary until data replication is resumed in the logical volume retained in the third storage system that is to retain a replicated copy based on a replicated copy retained in the second storage system when failure has occurred in the second storage system retaining the replicated copy.

Another object of the present invention is to provide a technique that enables reducing the time necessary until data replication is resumed in the logical volume retained in the second storage system when the second storage system has recovered from failure.

Still another object of present invention is to provide a technique for retaining a replicated data copy in two or more storage systems (the first and third storage systems) when failure has occurred in a computer (host computer) using the first storage system and processing is continued/resumed by using the second storage system.

In order to achieve the above-described objects, a data processing system of the present invention comprises a plurality of storage systems each including a control section (storage-device controller) and storage devices whereby to have the functionality of storing data into storage areas, wherein the storage systems are interconnected by means of communication lines whereby a replicated copy of data is retained between the storage systems. The data processing system is characterized by having the configuration described hereunder.

The data processing system of the present invention has at least three storage systems, namely, first, second, and third storage systems, that are disposed at, for example, sites spaced away from one another. The first storage system retains first (primary logical volume) data as replication target data, the second storage system retains second data (secondary logical volume) as replication data of the first data, and a third storage system retains third data (secondary logical volume) as replication data of the first data. A host computer or the like uses the first storage system through a communication line to perform information processing by accessing the first data.

In synchronization with data updating of the first data in the first storage system, the data processing system performs the processes of data updating of the second data in the second storage system, creating information regarding data updating of the first and second data as a journal including identifiers of data update sequence, and storing the journal into a storage area in at least any one of the first and second storage systems. In addition, in asynchronization with the data updating of the first data in the first storage system, the data processing system performs transfer (copying) to store the journal into a storage area in the third storage system, and the third storage system performs data updating of the third data in accordance with the data update sequence in the first storage system by using the third journal.

As data replication modes to be performed between the storage systems, the data processing system of the present invention includes synchronous replication and asynchronous data replication, and performs the data replication in these mode between the storage systems. The synchronous replication is performed between the first storage system retaining the first data and the second storage system retaining the second data. The asynchronous data replication is performed between the second storage system retaining the second data and the third storage system retaining the third data.

The synchronous data replication is in synchronization with the data updating of the primary logical volume, and the data updating of the secondary logical volume is performed through an instruction. In the storage system, information regarding the data updating is created as the journal concurrently with the data updating, and the journal is stored into the storage area.

The asynchronous data replication is in asynchronization with the data updating of the primary logical volume, and the data updating of the secondary logical volume is performed based on transfer (copying) of the journal via a communication line. A journal necessary for data updating is transferred (copied) between the storage systems, and the third storage system performs the data updating by update reflection, that is, writing of the write data corresponding to data part in the primary logical volume into the secondary logical volume in accordance with the journal. In the update reflection, the data updating is performed in accordance with update information by following the update sequence of data in the primary logical volume.

According to the data processing system of the present invention, in normal operation, in accordance with an instruction received from a host computer, the first storage system performs data updating of the first data, instructs the second storage system to perform data updating of the second data and to create information regarding the data updating as a journal. In accordance with the instruction from the first storage system, the second storage system performs the data updating of the second data, creates the journal, and stores the journal into a journal-dedicated storage area in the second storage system.

Alternatively, in accordance with an instruction received from the host computer, the first storage system performs data updating of the first data, creates information regarding the data updating as a first journal, stores the journal into a storage area in the first storage system, and instructs the second storage system to perform the data updating of the second data and to create information regarding the data updating as a second journal. In accordance with the instruction from the first storage system, the second storage system performs the data updating of the second data, creates the second journal, and stores the second journal into the storage area.

Practically, the journals are each configured to include a copy of the data (write data accompanying an update instruction (such as a write instruction) to the first data) used in the data updating, a write instruction at the time of the data updating, and an update number or update time as the identifier of the data update sequence. The update information is configured to include, for example, a write instruction used at the updating time and the update time.

In the event of the data updating of the first data, in synchronization therewith, the first storage system makes to the second storage system an instruction, such as a remote write instruction, for data updating of the second data via a communication line between first and second storage systems to perform the data updating. The instruction for the data updating is accompanied by information including an identifier (such as the update number or update time) of the data update sequence regarding the data updating in the first storage system.

In accordance with the instruction from the first storage system for the data updating and information including the identifier of the data update sequence, the second storage system performs the data updating of data corresponding to the first data for the second data, creates information regarding the data updating as the second journal, and stores the second journal. When creating the second journal, the second storage system updates information using information including the identifier of the data update sequence, which has been received from the first storage system, and creates the journal by using the update information.

Alternatively, when making the instruction for the data updating to the second storage system, the first storage system transfer (copy) the first journal, and the second storage system may receive the first journal and store the journal as the second journal into the storage area.

The third storage system retrieves (copies) the second journal from the second storage system via a communication line between the second and third storage systems, and stores the journal as a third journal into a journal-dedicated storage area in the third storage system. The third storage system performs the data updating of data corresponding to the first data for the third data based on the identifier in accordance with the data update sequence of the first data in the first storage system by using the third journal.

By the synchronous data replication, the second data is made consistent with the first data, and the first journal is made consistent with the second journal. By the asynchronous data replication, the third data is made consistent with the first data at the time of reflection of all updates associated with the retrieval of the update part of data from the second journal after updating of the second data and first data.

According to the data processing system of the present invention, in the event of failure occurrence, transfer of the each individual journal is performed between the storage systems, and data updating is resumed by using the each individual journal.

According to the data processing system of the present invention, in the event that failure has occurred in the replication source in the asynchronous data replication, that is, the second storage system in the normal operation, a replication source in the asynchronous data replication is altered from the second storage system to the first storage system serving as a replication source in the synchronous data replication, whereby the asynchronous data replication is continued/resumed. For example, after the occurrence of failure is recognized by the storage system, the third storage system and the first storage system alters the replication source in the asynchronous data replication from the second storage system to the first storage system through exchange of instructions and responses between the first and third storage systems.

After the failure occurrence, the third storage system obtains a journal necessary to update the third data to be latest, that is, a differential between the first journal and the third journal via a communication line between the first storage system and the third storage system, and stores the differential as the third journal into the journal-dedicated storage area in the third storage system. The third storage system performs data updating of the third data based on the identifier in accordance with the data update sequence of the first data in the first storage system by using the third journal. By continually performing the processings after the failure occurrence, the third data and the first data are made consistent with each other at the time of update reflection between the first journal and the third journal in the third storage system, the system enters a state where the data replication is resumed, that is, the complete replication is maintained.

Further, in the event that the second storage system has recovered from the failure after the failure occurrence, the asynchronous data replication of the first data retained by the first storage system is initiated in the second storage system. In asynchronization with the data updating of the first data, the second storage system retrieves (copies) data from the first journal of the first storage system via the communication line between the first and second storage systems, stores the data as the second journal into the journal-dedicated storage area in the second storage system. The second storage system performs data updating of the third data based on the identifier in accordance with the data update sequence of the first data in the first storage system by using the third journal.

Further, according to the data processing system of the present invention, after the second storage system has initiated the asynchronous data replication of the first data in the first storage system, and has updated the second data to be latest in accordance with the first journal, the asynchronous data replication of the first data in the first storage system is altered to the synchronous data replication.

After the second storage system has recovered from the failure, when the second storage system has retrieved (copied) data from the first journal of the first storage system, when the first storage system enters a state where retrieval from first journal of the first storage system has all been completed (that is, transfer of the data in the second storage system has all been completed) through the communication line between the first and second storage systems, and when update reflection of the second data has been completed whereby data updating has been completed in the second storage system, the mode of the data replication of the first data in the first storage system and the second storage system is altered from the asynchronization process to the synchronization process. By the alteration, the data updating of the second data is performed in synchronization with the data updating of the first data, as in the case of the process at the normal time operation.

In addition, the data processing system of the present invention corresponds to the case where continuation/resumption takes place by using the second storage system retaining the second data as replication data and a second host computer using the second storage system (the data replication and the information processing by the host computer).

In this case, after the failure occurrence, in accordance with an instruction from the second host computer or the like, the synchronous data replication of the second data is initiated by exchanging the replication source and replication destination with each other in the synchronous data replication through exchange of instructions and responses between the first and second storage systems. The second storage system performs the data updating of the second data in accordance with an instruction received from the second host computer, creates information regarding the data updating as the second journal including the identifier, and stores the second journal into the journal-dedicated storage area in the second storage system. The first storage system retains, as the first data, replication data of the second data retained by second storage system.

When performing data updating of the second data, the second storage system makes to the first storage system an instruction, such as a remote write instruction, for data updating of the second data via a communication line between first and second storage systems to perform the data updating. The instruction for the data updating is accompanied by information including an identifier (such as the update number or update time) of the data update sequence, which has been used by the second storage system to create the second journal.

In accordance with the instruction from the second storage system for the data updating and the identifier of the data update sequence, the first storage system performs the data updating of data corresponding to the second data for the first data, creates information regarding the data updating as the first journal, and stores the first journal. When creating the first journal, the first storage system updates information using information including the identifier of the data update sequence, which has been received from the second storage system, and creates the journal by using the update information.

In asynchronization with the updating of the second and first data, the third storage system retrieves data from the second journal of the second storage system via a communication line between the second and third storage systems, and stores the journal as a third journal into a journal-dedicated storage area in the third storage system. The third storage system retains, as the third data, replication data of the second data retained by the second storage system replication, and performs the data updating of data corresponding to the first data for the third data based on the identifier in accordance with the data update sequence of the first data in the first storage system by using the third journal.

The data processing system of the present invention is characterized in that in order to maintain data integrity of the secondary logical volumes, the logical volumes required to follow the data update sequence are registered to a same group number, an update number is allocated in units of data updating in data in the group, and information regarding the group into the journal. Additionally, the data processing system is characterized in that in the storage system retaining the replication data, the data updating process is performed for the replication data in the sequence of the update number.

According to the data processing system of the present invention, when creating/storing each of the first, second, third journals, the each individual storage system may include, as the update information, the logical address of the write instruction, the size of the write data, the logical address of the logical volume storing the write data, and a group number indicative of a logical volume required to follow the data update sequence, for example.

The data processing system of the present invention is characterized in that the third storage system makes a read instruction to the second storage system, and in response thereto the second storage system transmits untransmitted journal data from the second journal in accordance with the identifier. In this case, in response to one instruction, untransmitted data may be collectively transmitted from the second storage system to the third storage system, or may be transmitted one by one. The number of journals for one instruction may be specified by the third storage system in association with the read process for example, or may be determined by a user in the event of the group registration. The read process may be an ordinary read instruction or a dedicated instruction (journal read instruction). For example, information for group management administration, information the journal storing management, and the like having the third storage system are transferred also to the third storage system to be retained, and the third storage system reads the journal from the second storage system in accordance with the information.

The data processing system of the present invention is characterized in that the third storage system makes an instruction for a journal transmission specification to the second storage system in accordance with the identifier, and the second storage system transmits specified journal data from the second journal in accordance with the specification. However, the transmission journal specification may be a specification for a single journal; or it may be a specification for a plurality of journals or for the number of transmission journals.

The data processing system of the present invention is characterized in that the second storage system side makes to the third storage system a write instruction for journal data from the second data, and in response thereto the third storage system receives the journal data and writes the data into the storage area. The write instruction may be an ordinary write instruction or a dedicated instruction journal write instruction). For example, information for group management administration, information the journal storing management, and the like having the third storage system are transferred also to the third storage system to be retained, and the third storage system writes the journal data into the storage area of the third storage system in accordance with the information.

According to the data processing system of the present invention, with regard to the timing with which journal transfer (copying) is performed between the third and second storage systems in the asynchronization process, instructions for the journal transfer may be periodically determined at a predetermined time interval. Alternatively, the timing may be determined in accordance with the number of retained or exchanged journals in the storage system. Still alternatively, the timing may be determined in accordance with the size of retained or exchanged journals (or, the size of write data) in the second and third storage systems. For example, information on the number, size, or the like, information the journal storing management, and the like having the second storage system are transferred also to the third storage system to be retained, and the third storage system determines the timing in accordance with the information. Alternatively, the timing may be determined in accordance with a communication load state in the communication line between the second and third storage systems or processing load state in the second and third storage system.

Further, according to the data processing system, in the asynchronous data replication, the number of transmission journals to a single read instruction may be dynamically altered in accordance with a transfer capability and load in a communication line between the second storage system and the third storage system.

According to the data processing system of the present invention, the each individual storage system may store the each individual journal into the storage area in the storage system. Alternatively, the journals may be stored in a cache memory used by the system in the storage system. Alternatively, the journals may be stored concentrically in a predetermined portion, or may be distributedly stored in a plurality of portions. Alternatively, addition, one logical volume may be allocated for journals corresponding to one group. Still alternatively, the sizes of storage areas for storing the journals in the individual storage systems may be the same, or may be different from each other.

The data processing system of the present invention is characterized in that the each individual storage system stores the each individual journal into a journal-dedicated storage area in the own storage system, and frees the storage area from an oldest journal in the data update sequence in accordance with the identifier, whereby constantly new journals are retained corresponding to the storage size. However, the storage areas for journals already reflected in the data updating may be as necessary. Alternatively, the storage areas may be freed when the journal storage area has become short.

The journal storage area may be freed at the time of reception process of the journal read instruction from the third storage system in the second storage system. Alternatively, the storage area may be freed after the journal has be transmitted to the third storage system. Still alternatively, the method may be such that the third storage system specifies an update number indicating a journal unnecessary to be retrieved as it is accompanied by the read instruction or the updating completion degree, and the storage area of the journal is freed in accordance with the specification.

According to the data processing system of the present invention, the transfer of the journal may be such that the journal are transmitted in the sequence of the update number in accordance with the identifier of the data update sequence between the storage systems. However, the journal need not be transmitted in the sequence of the update number.

In the inventions disclosed for the present patent application, effects and/or advantages obtainable with representative ones will be briefly summarized hereunder.

According to the present invention, the data replication can be practiced between a plurality of storage systems at high speed and efficiency rate while maintaining data integrity. Even in the event that failure has occurred in a configuration element such as the storage system and host computer, since the data updating with journal transfer is performed, the time necessary to resume the data replication can be reduced. Concurrently, data integrity can be maintained, and the process can be quickly continued/resumed.

In addition, in the data processing system for performing replication the replication-target first logical volume stored in the first storage system to the second and third storage systems, in the event that failure has occurred in the second storage system retaining replication data, the time can be reduced to resume the data replication, by using replication retained in the second storage system, in the logical volume retained in the third storage system that retains replication data.

Further, in the event that the second storage system has recovered from the failure, the time necessary to resume the data replication in the logical volume retained by the second storage system can be reduced.

Furthermore, in the event that failure has occurred in the computer using the first storage system, when the process is continued/resumed by using the second storage system, replication data can be retained in two or 10 more storage systems (first and third storage system).

BRIEF DESCRIPTIONS OF THE DRAWINGS

FIG. 3 is a view for explaining an example of update information in a journal in an embodiment according to the present invention;

Figure 5:
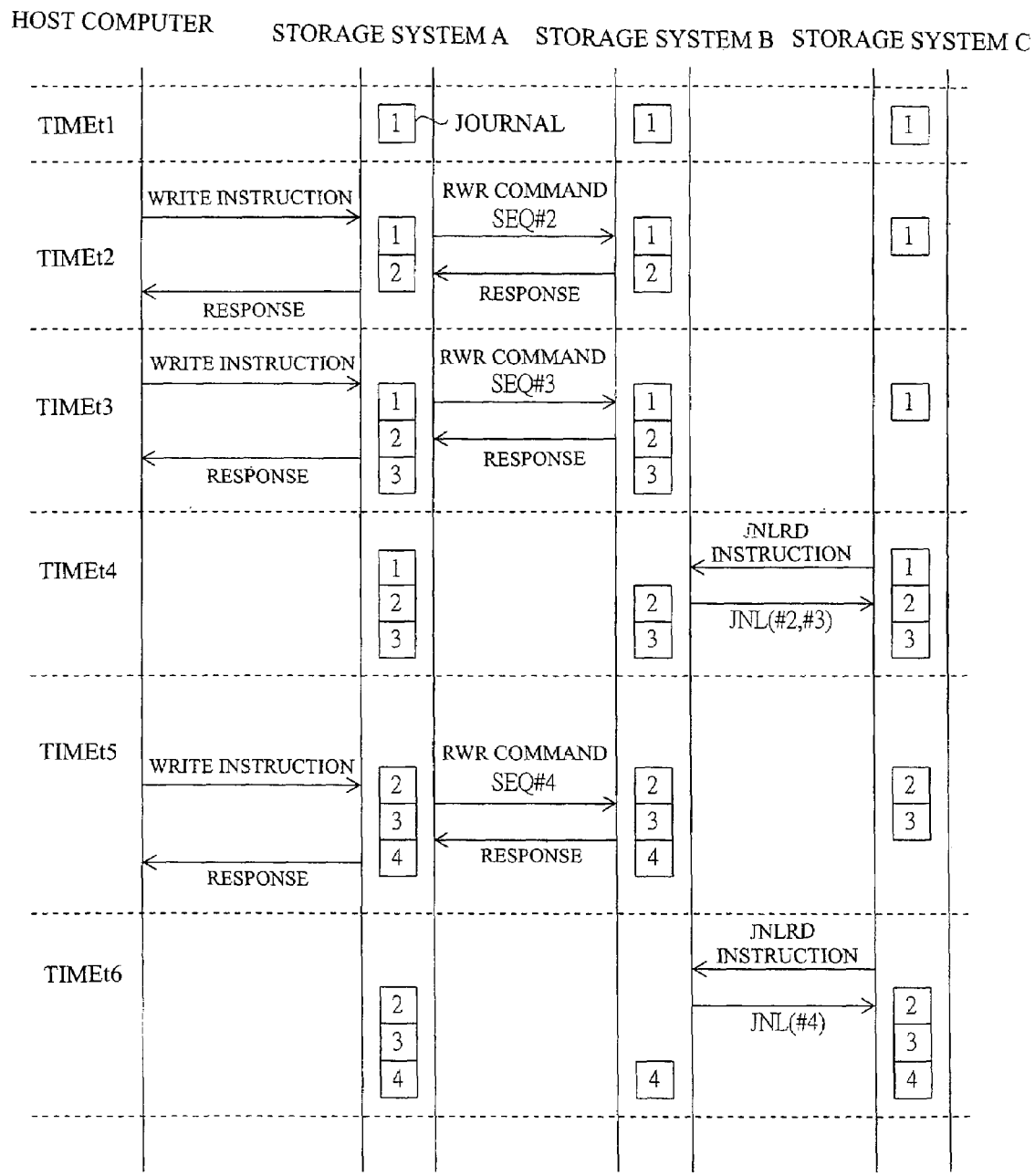
Figure 10:
Figure 16:
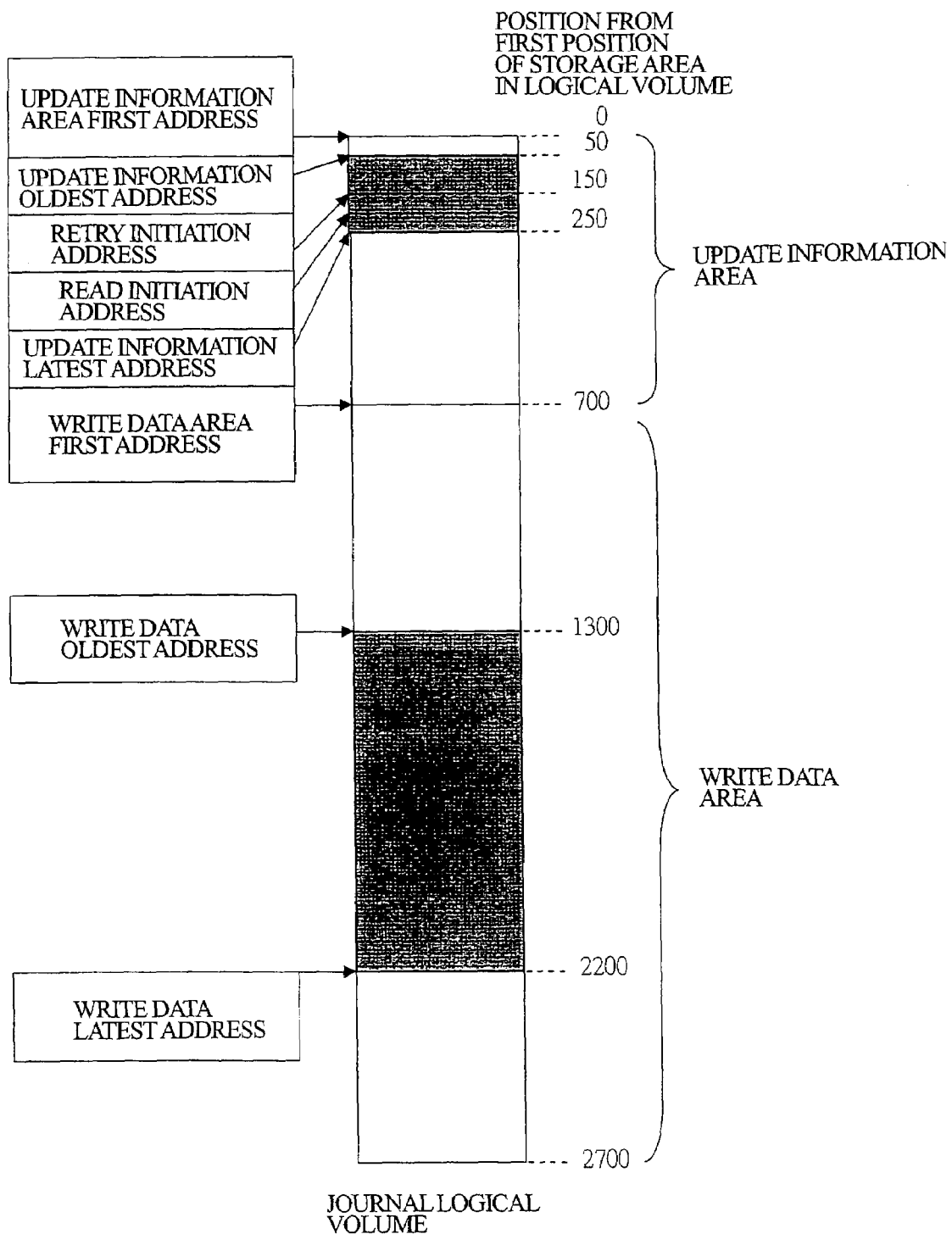
Figure 19:
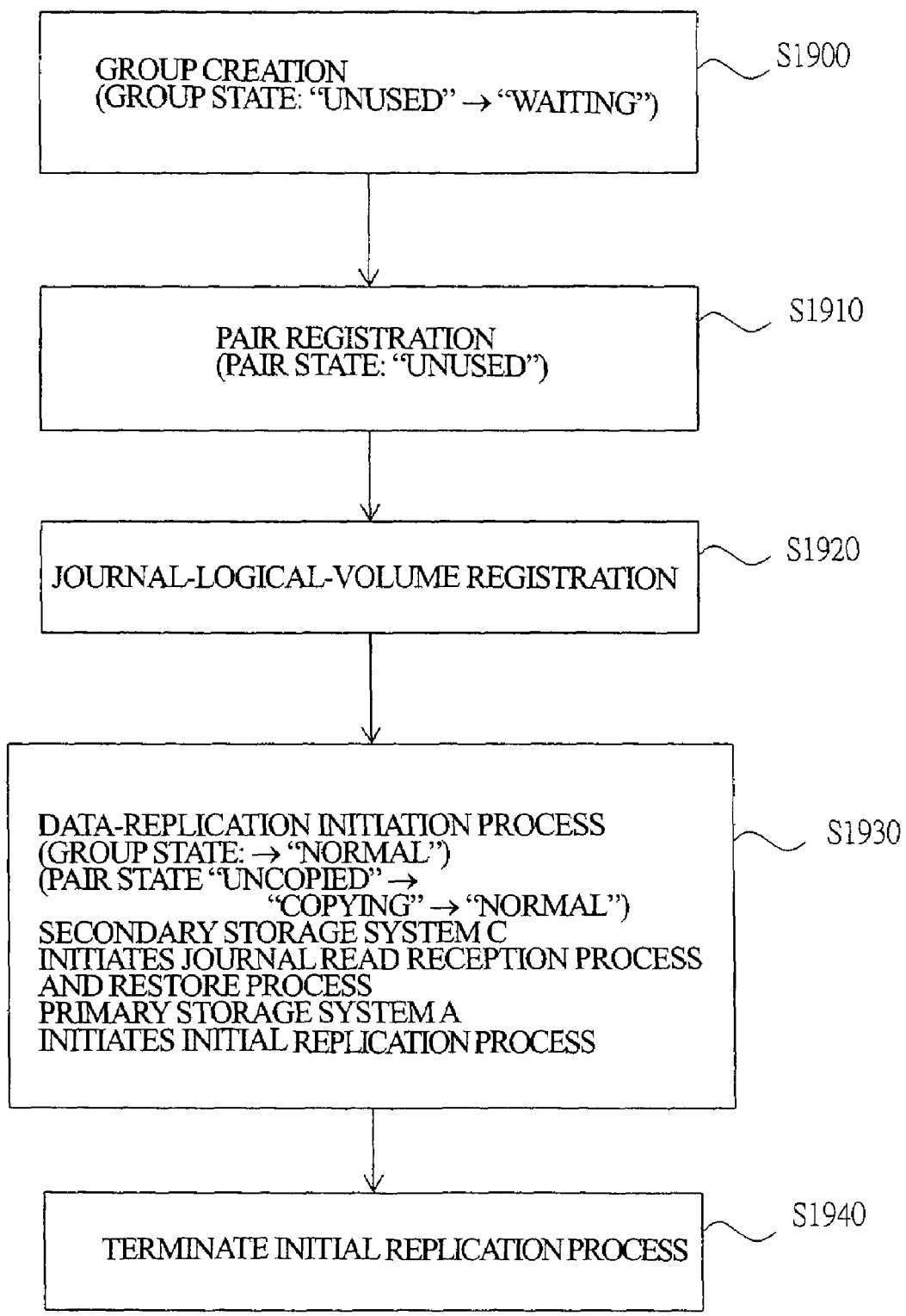
Figure 20:
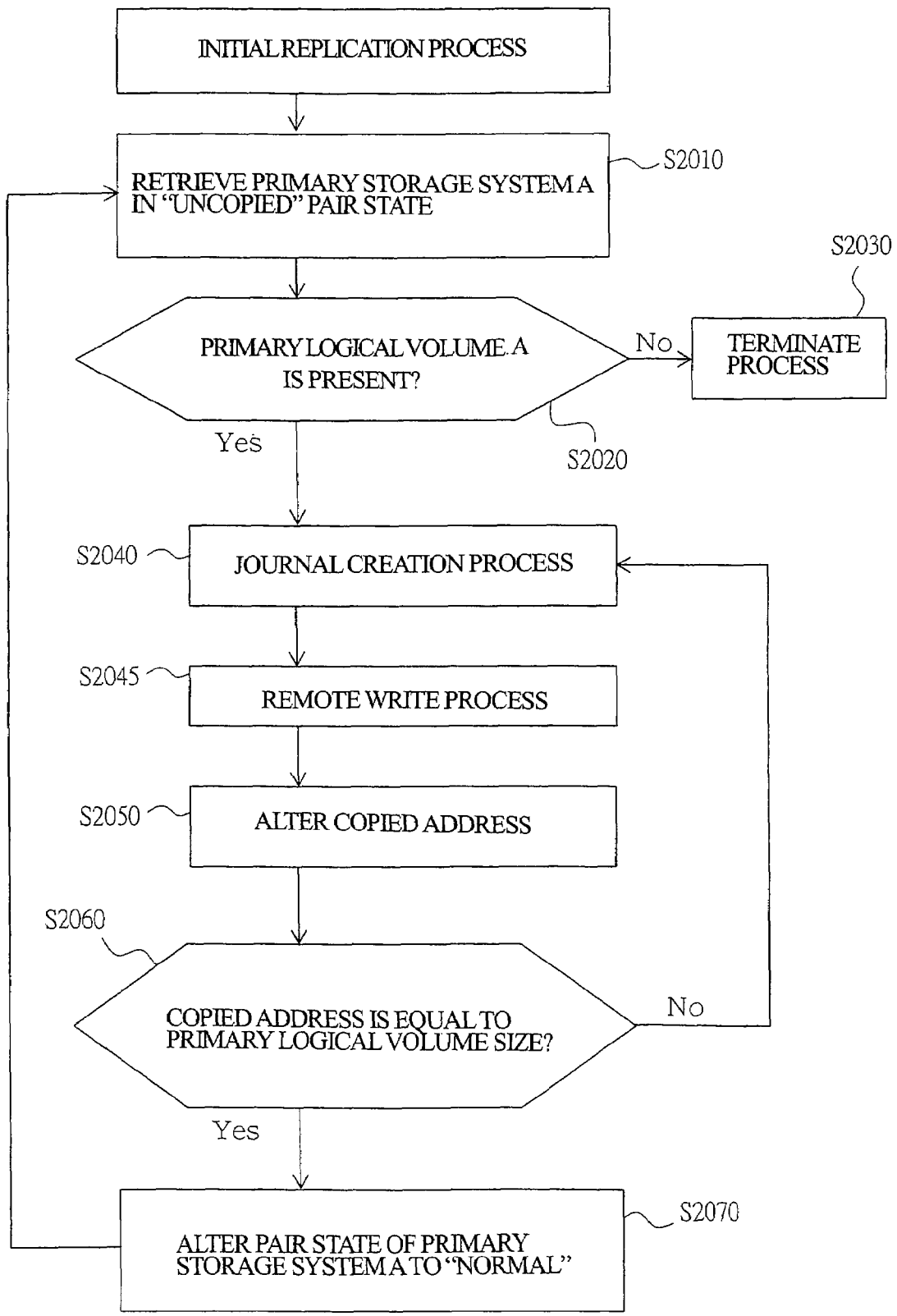
Figure 21:
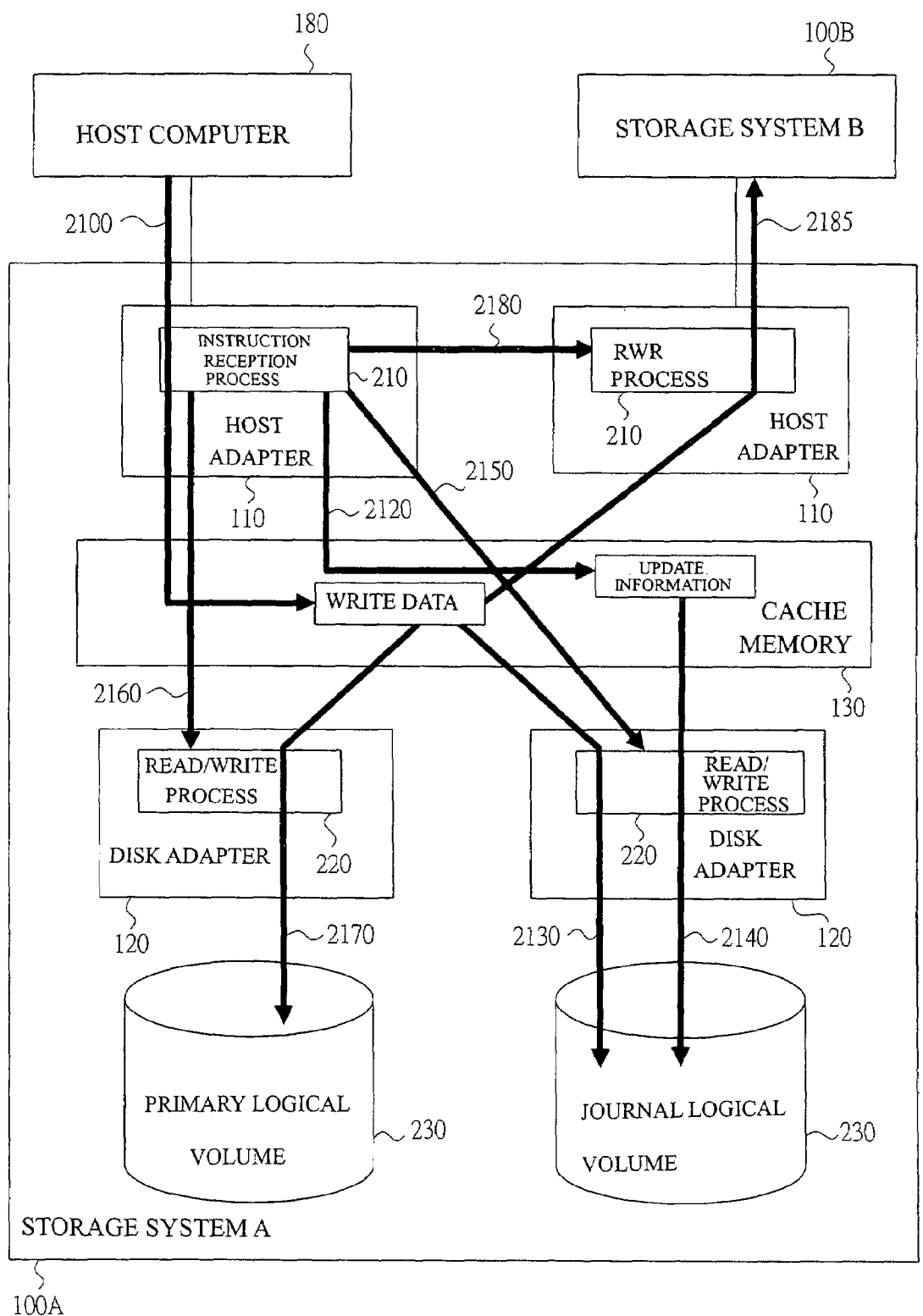
Figure 22:
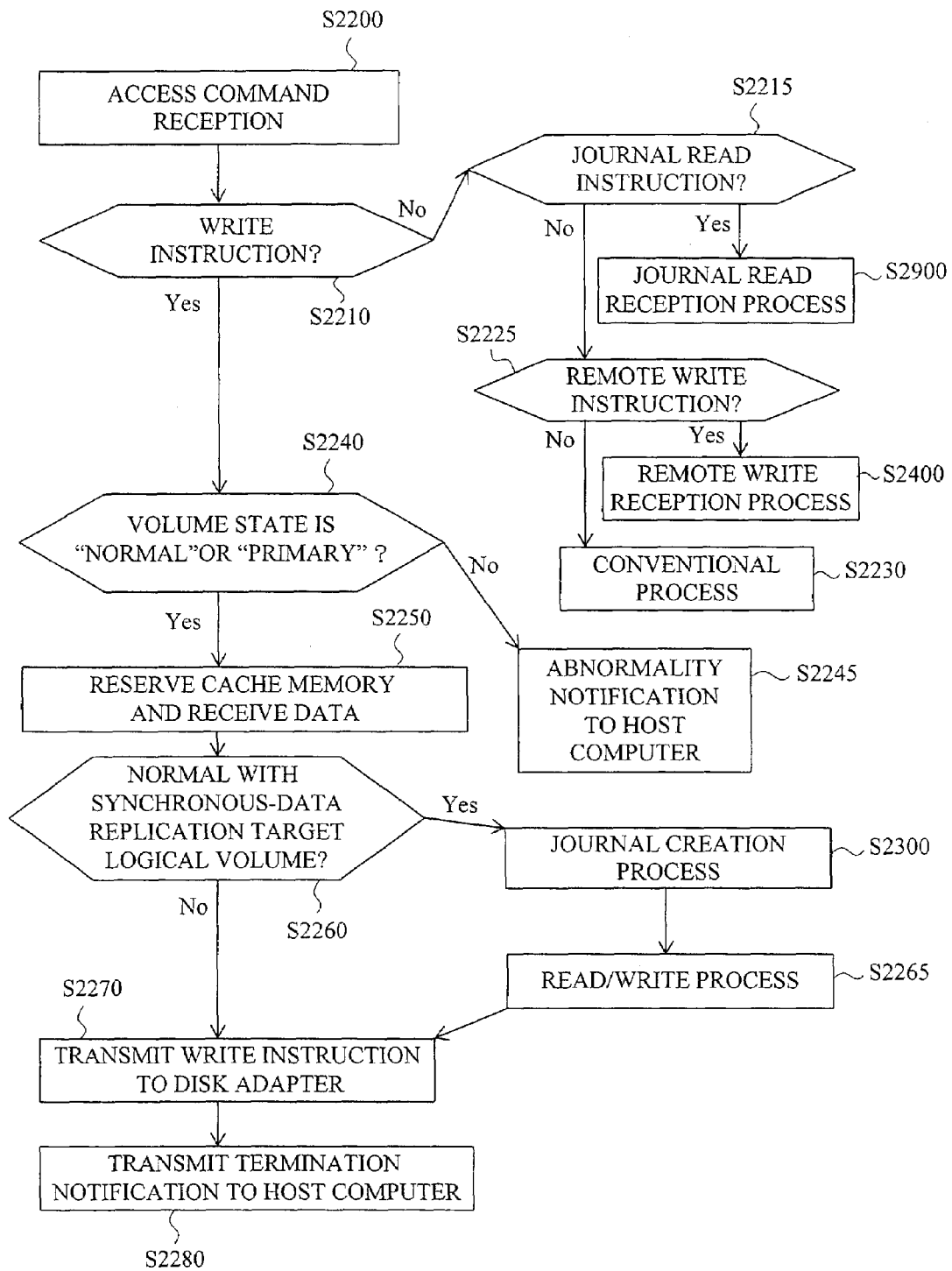
Figure 23:
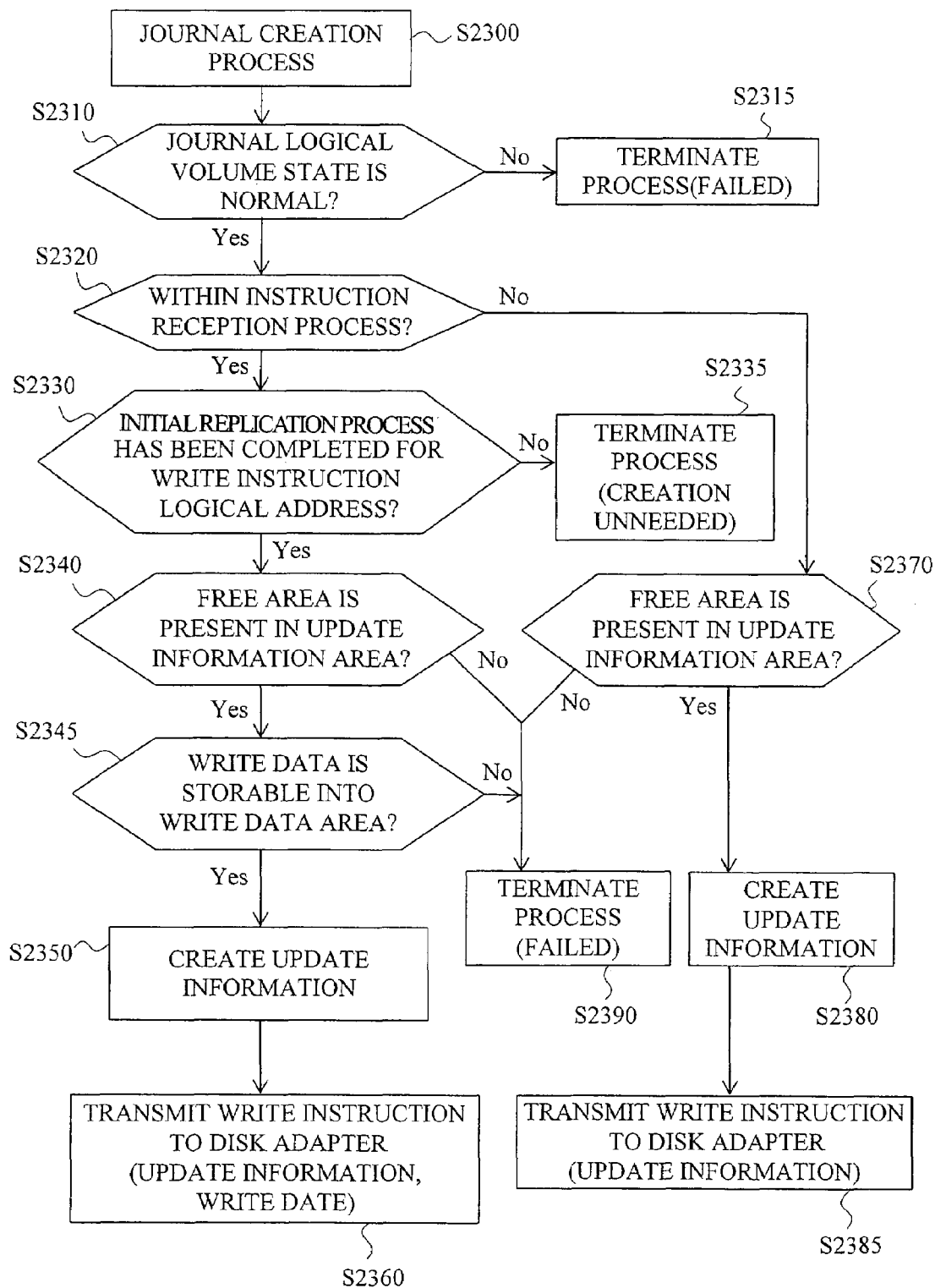
Figure 24:
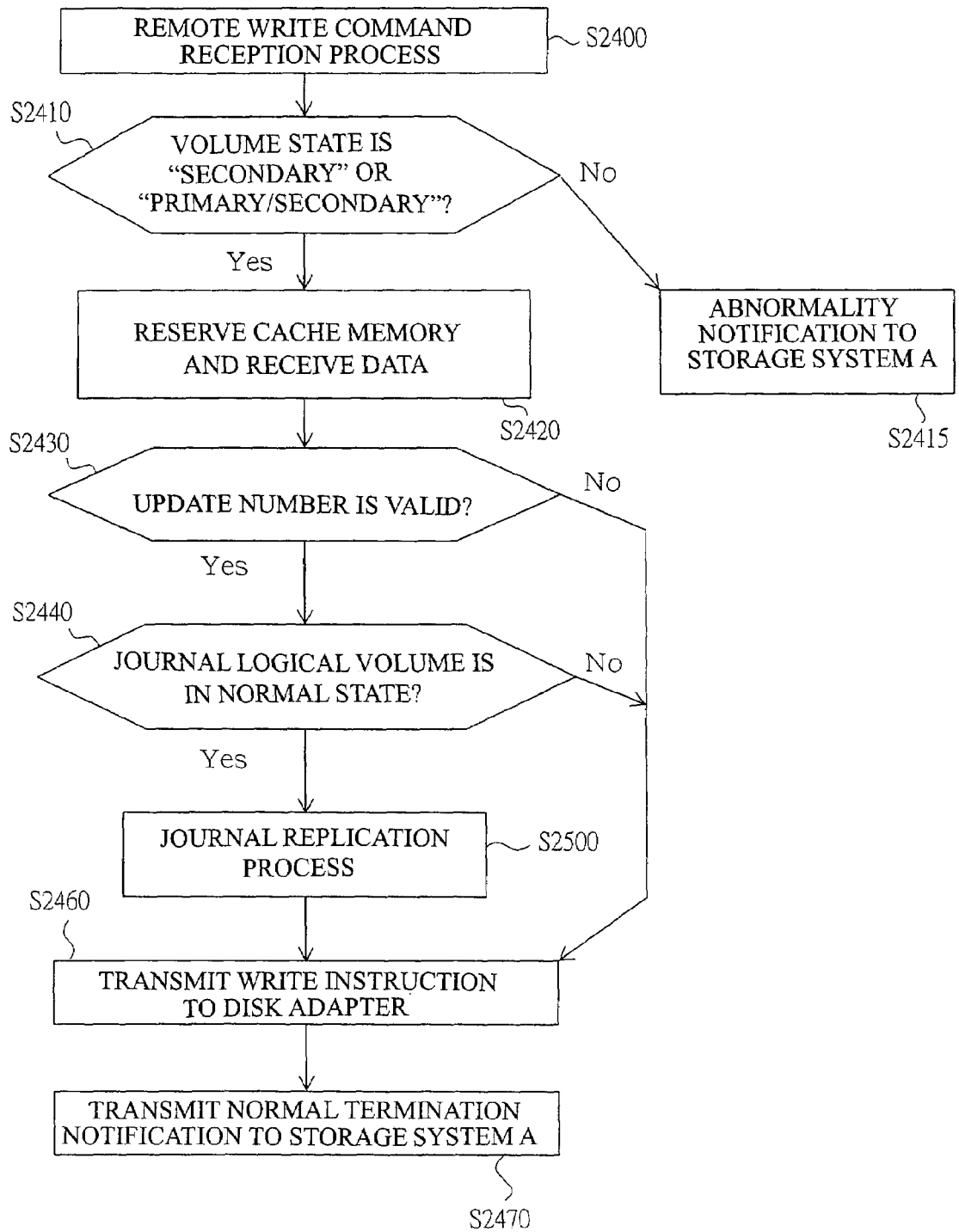
Figure 25:
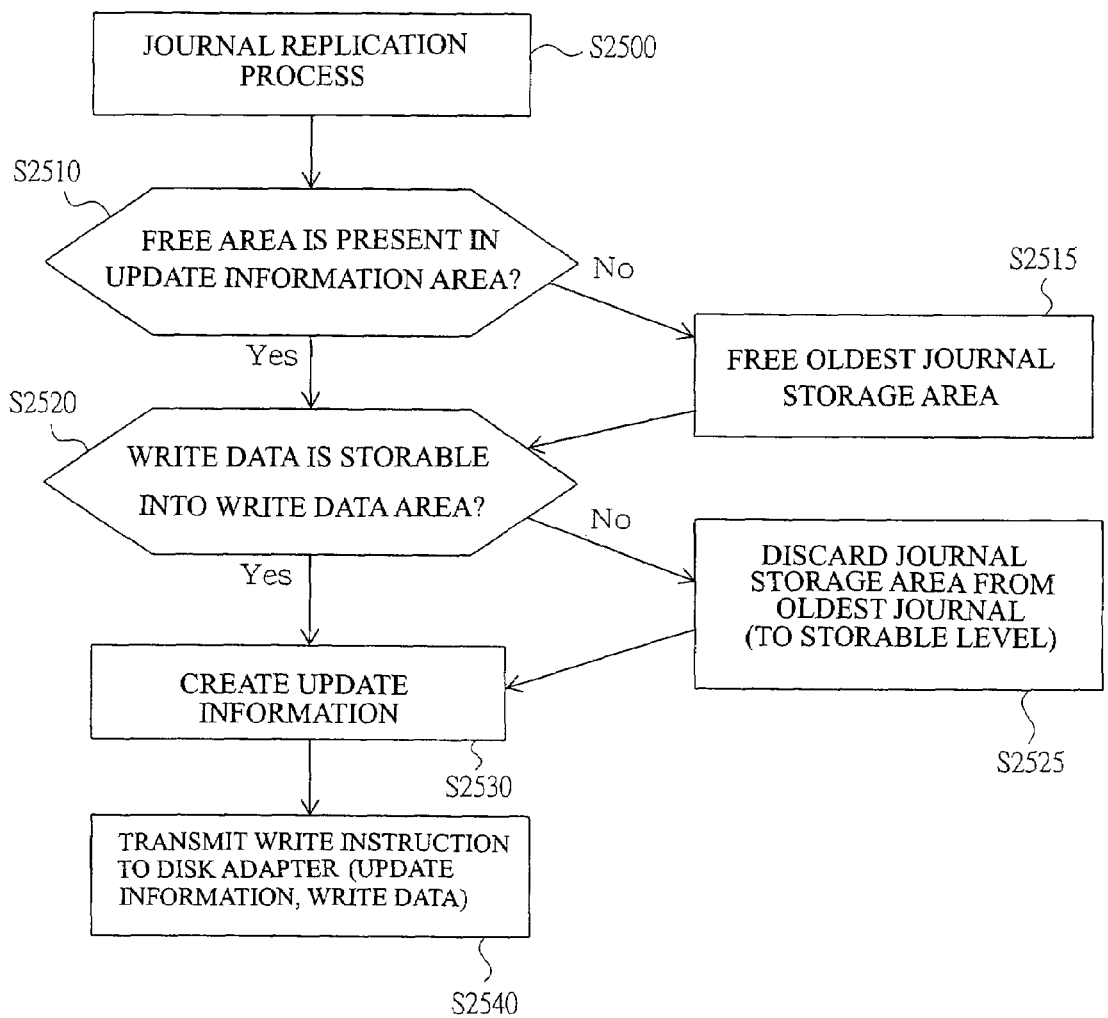
Figure 26:
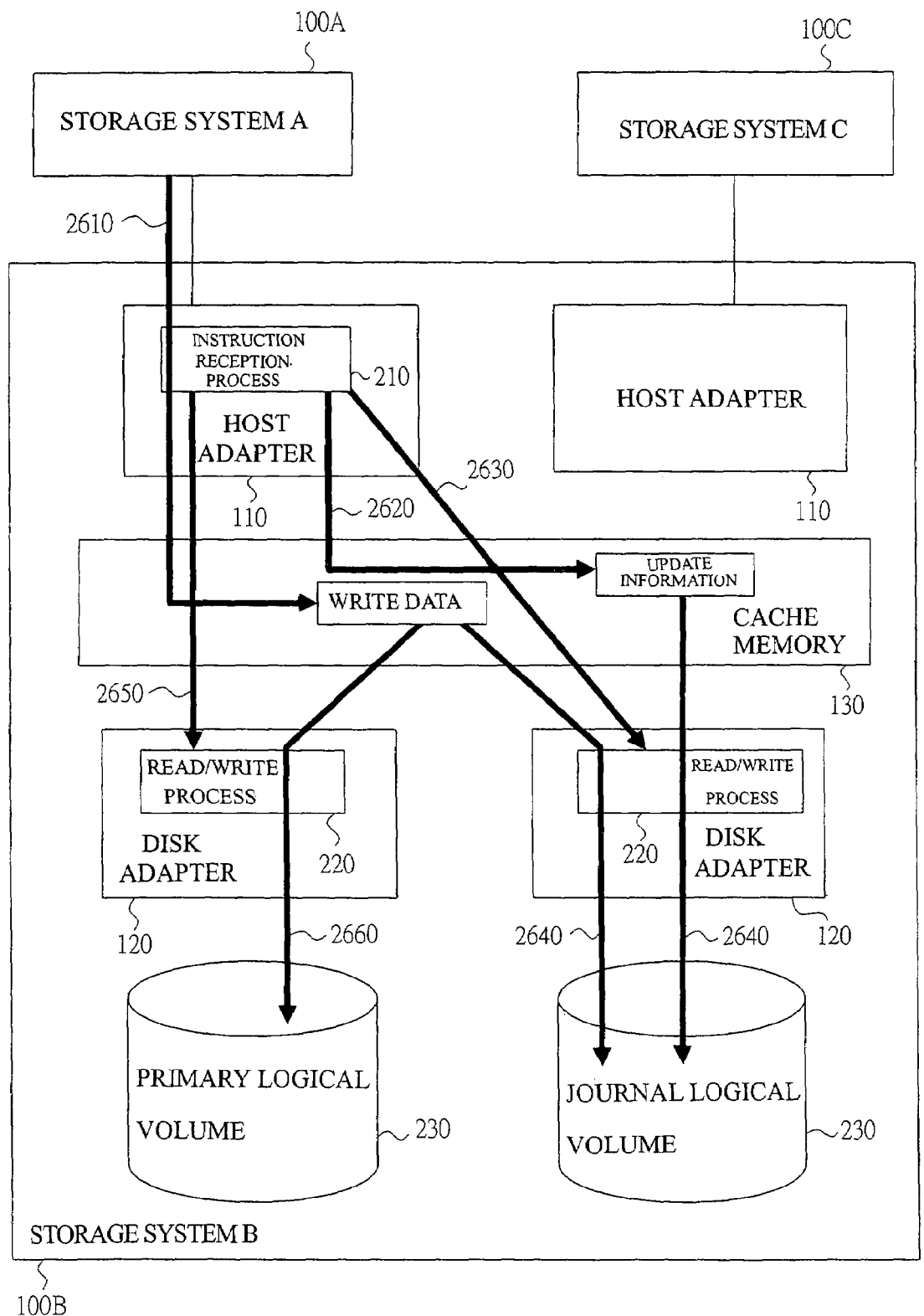
Figure 28:
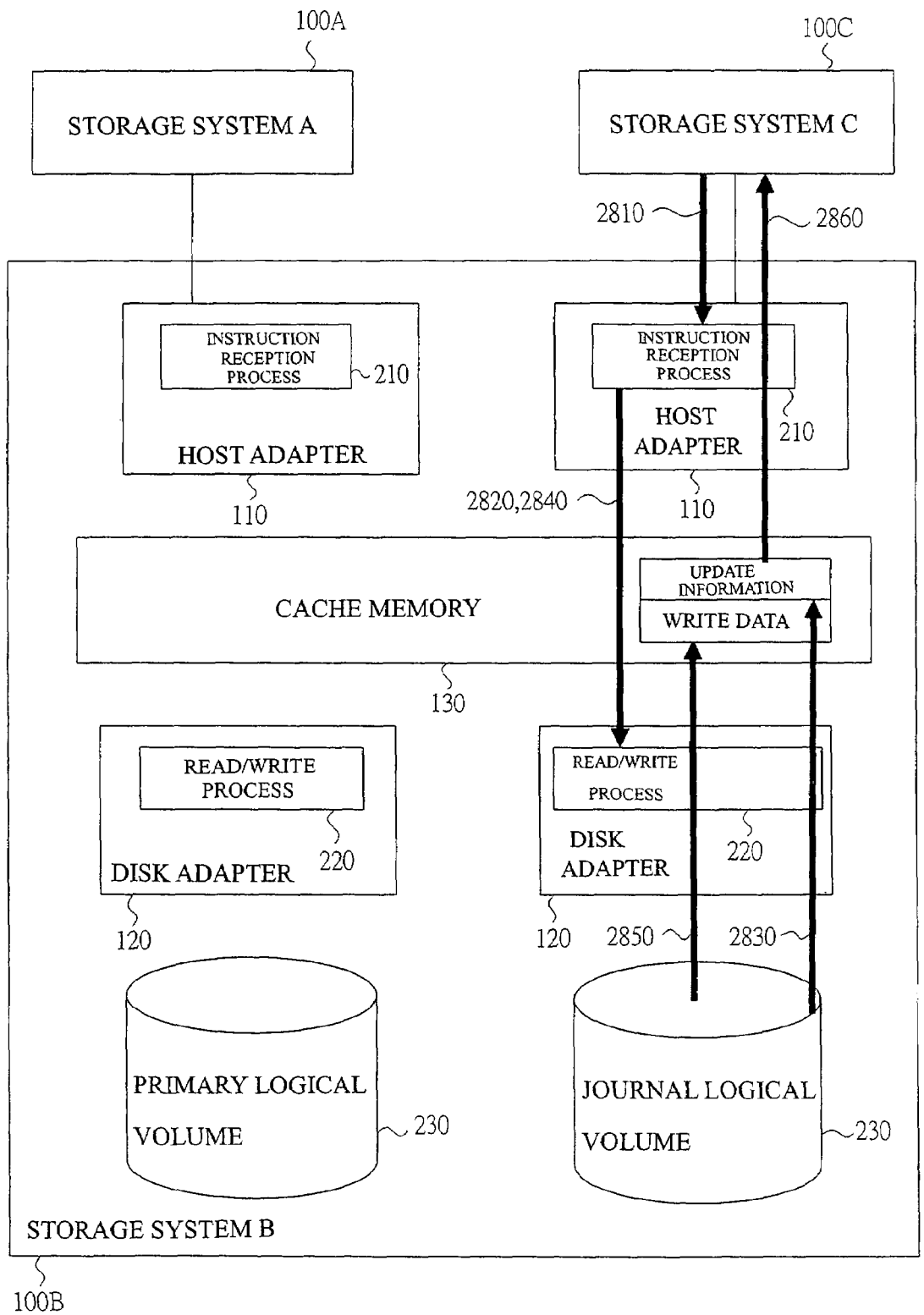
Figure 29:
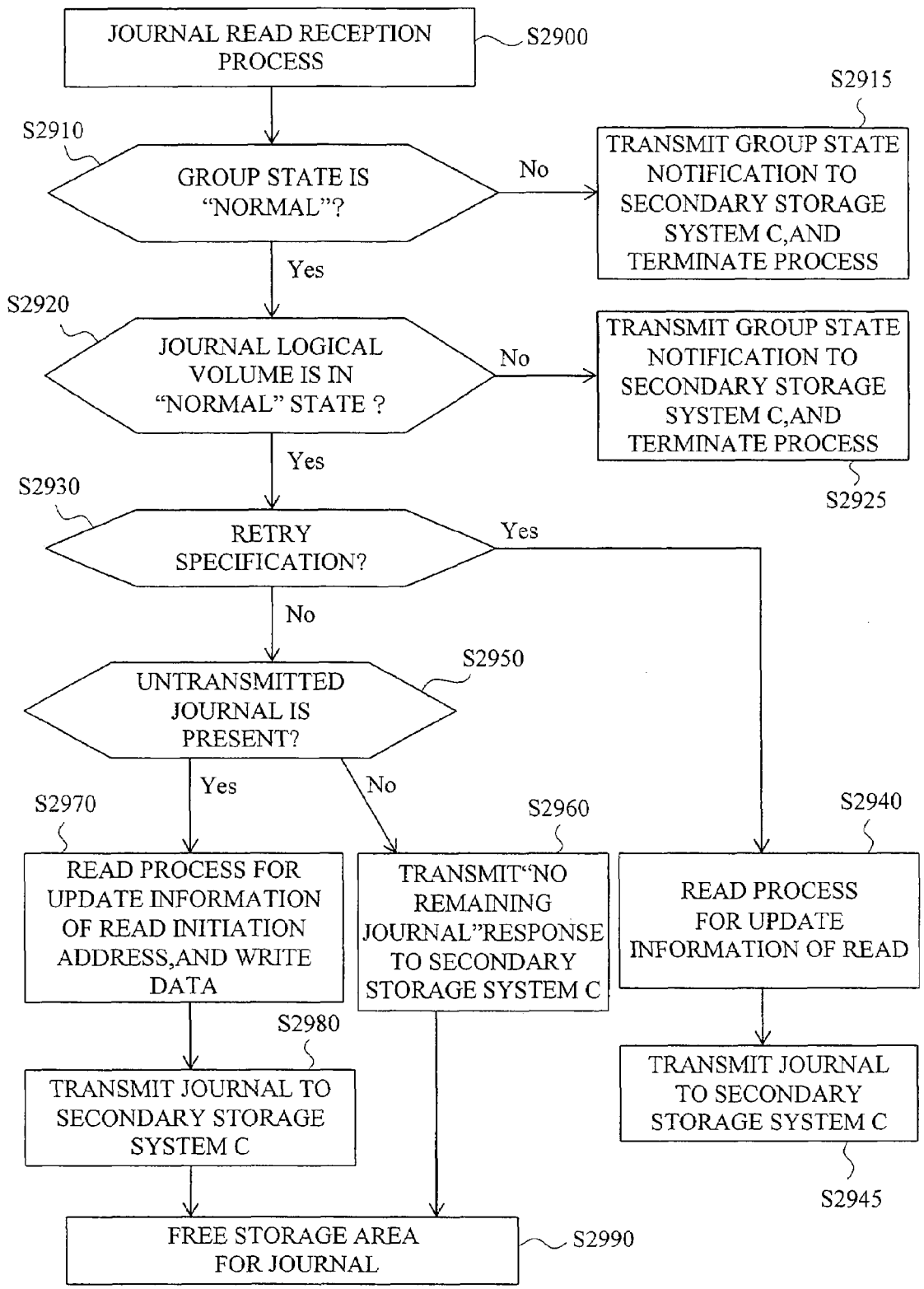
Figure 30:
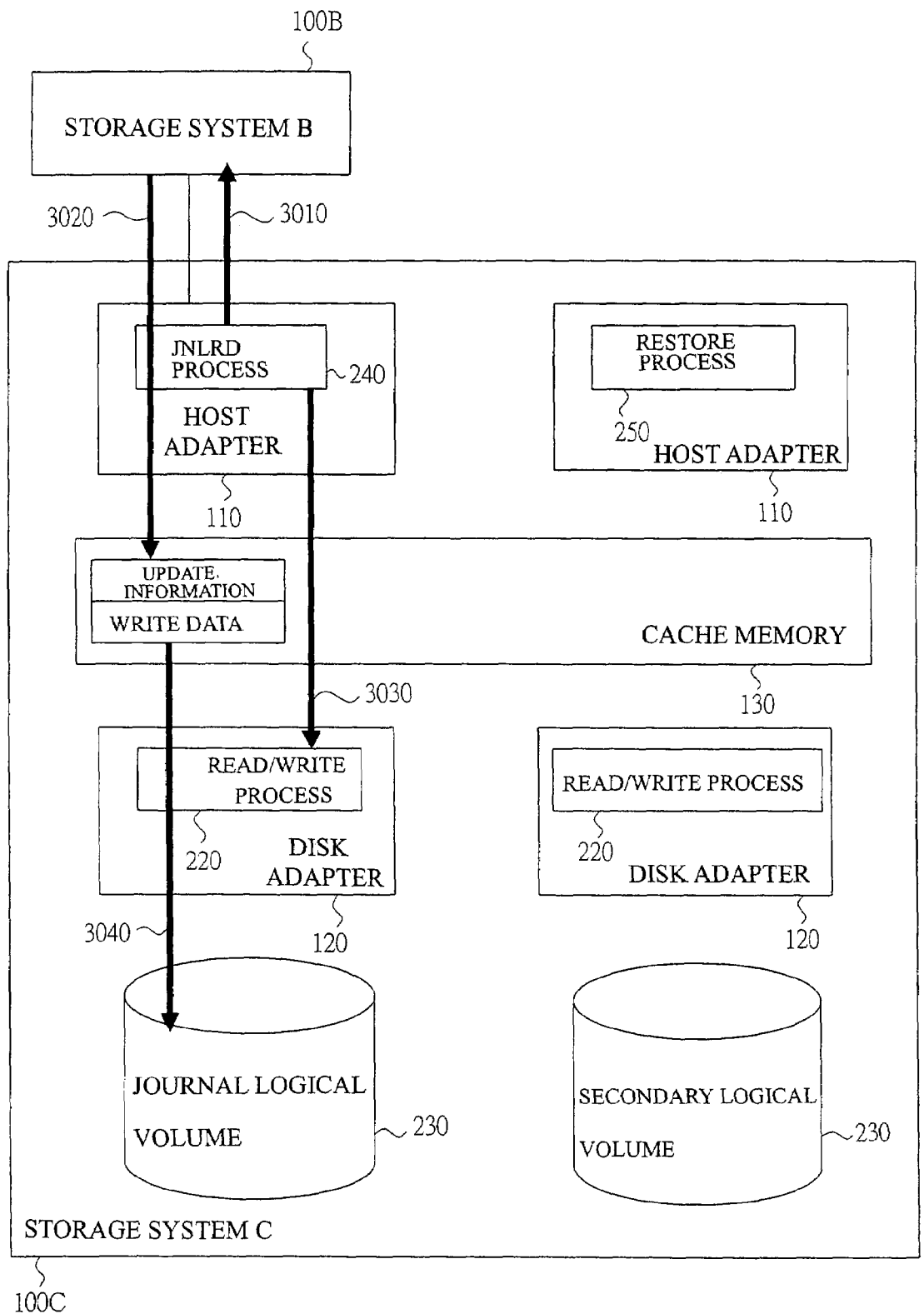
Figure 31:
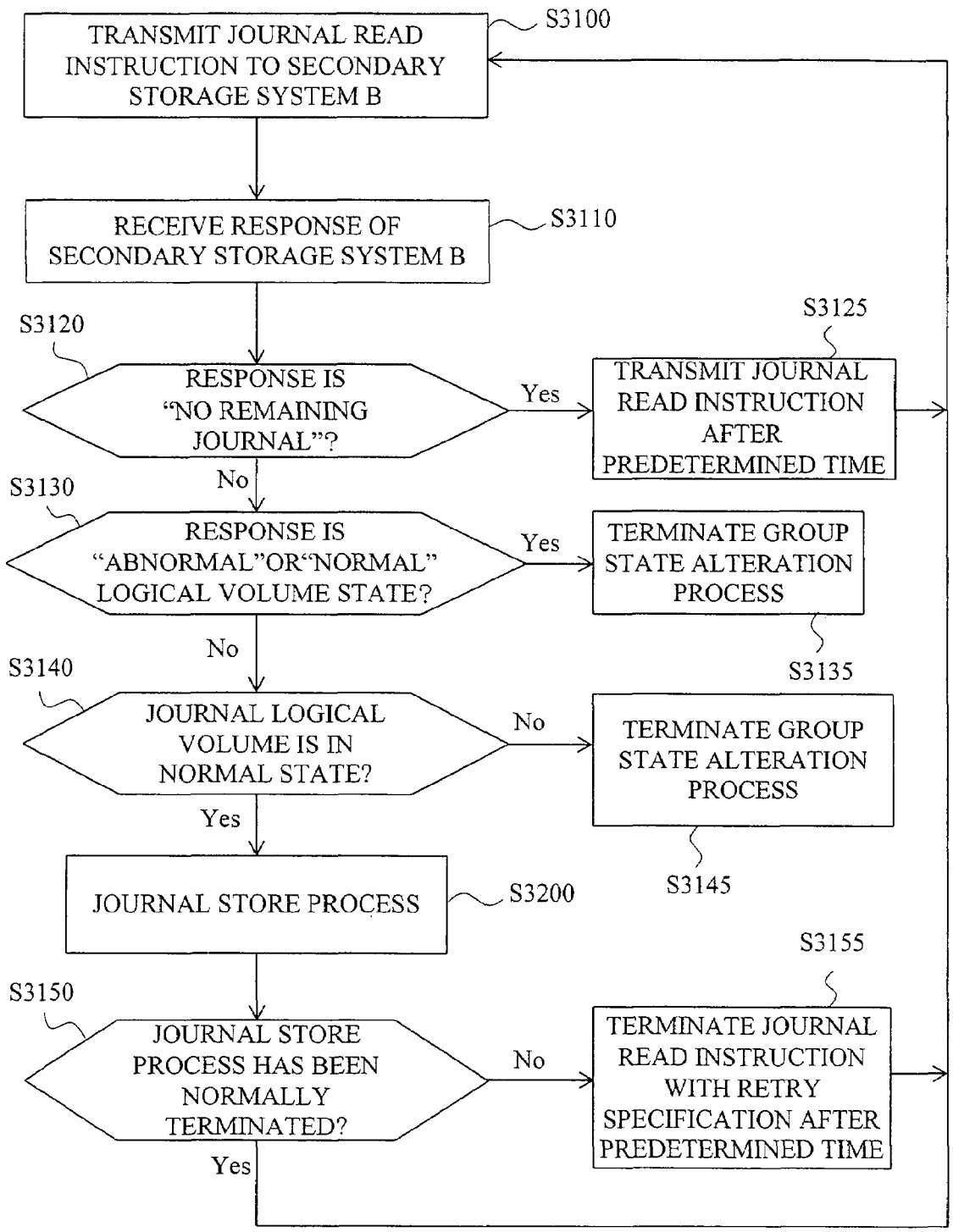
Figure 32:
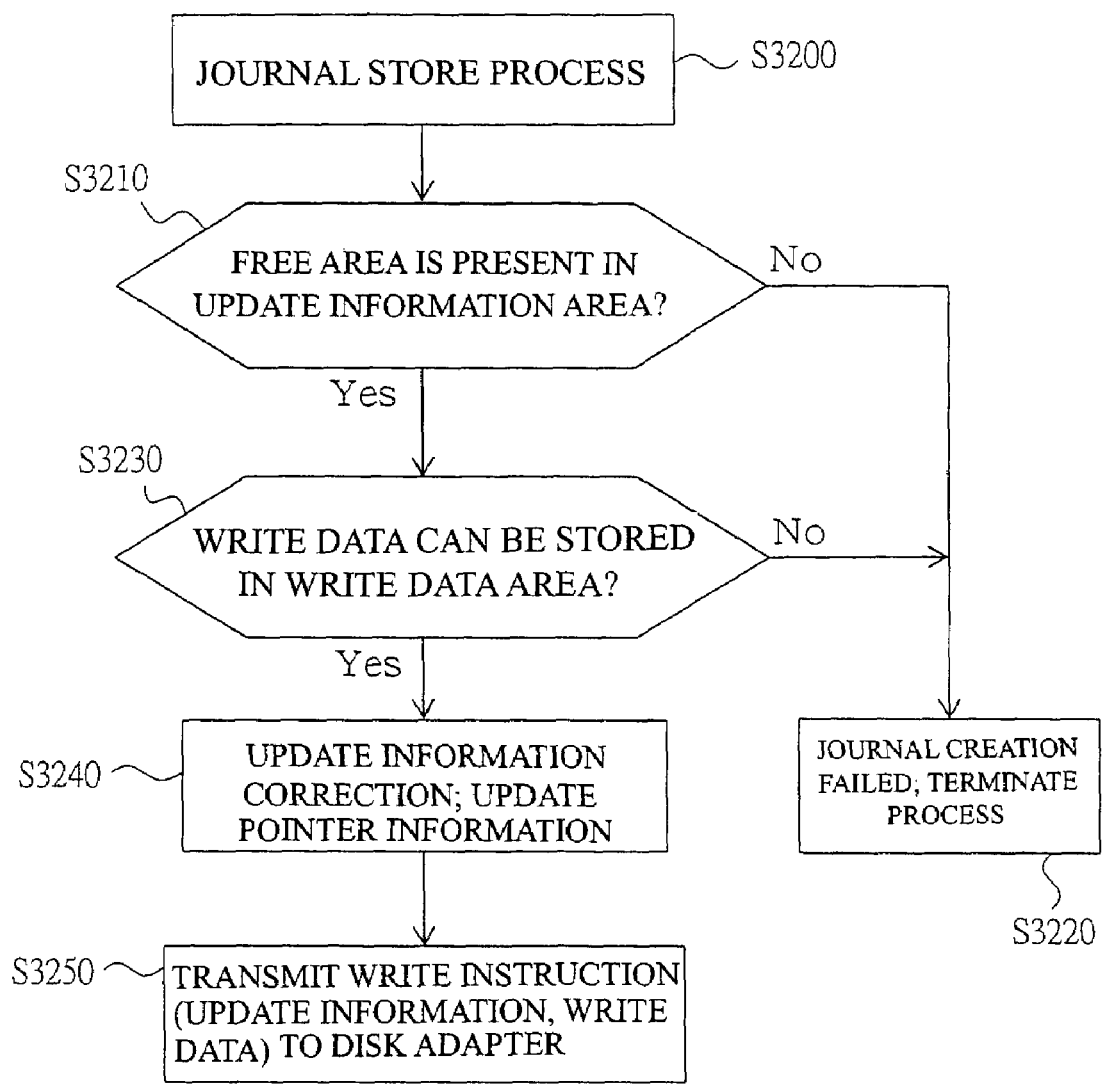
Figure 33:
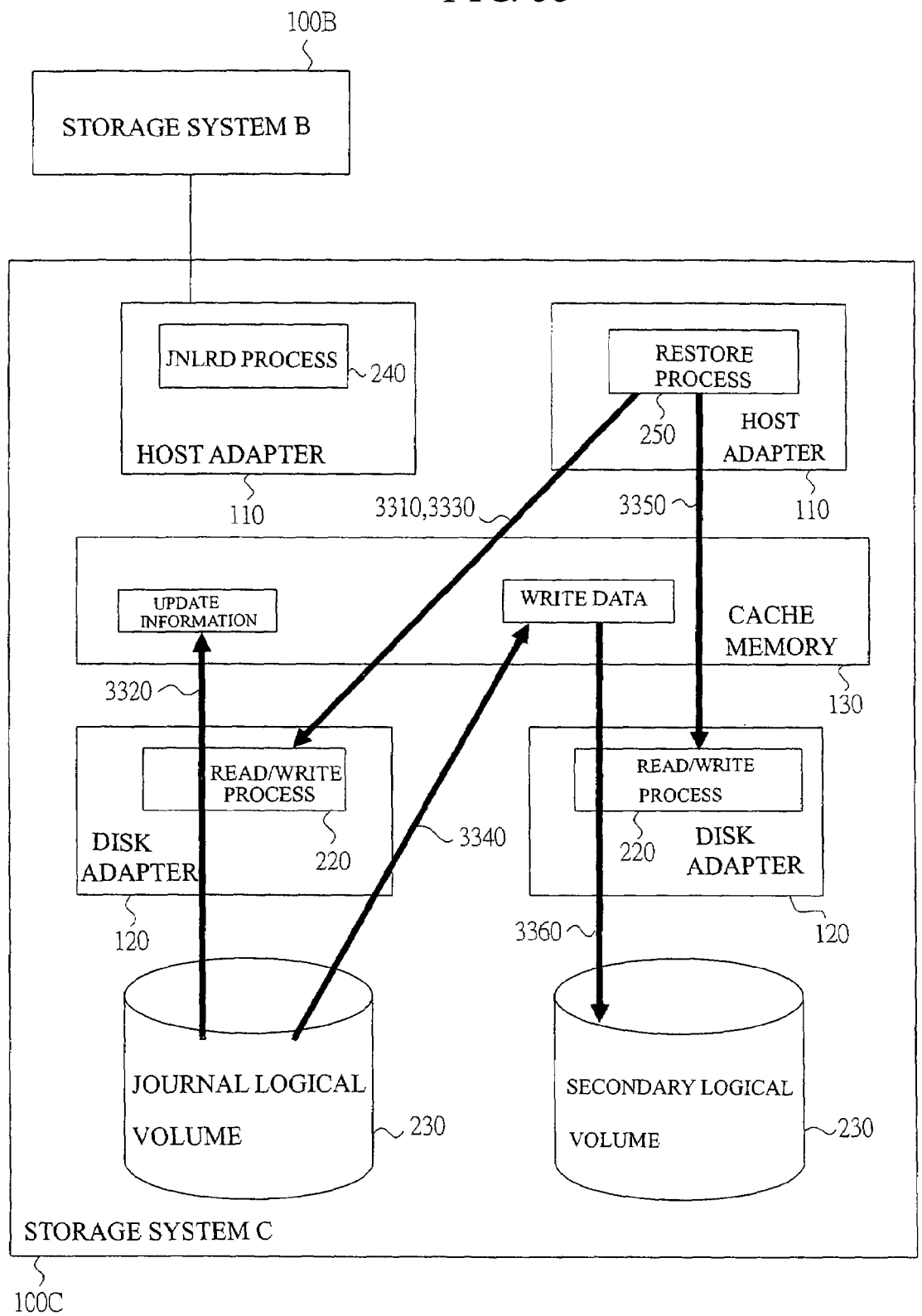
Figure 34:
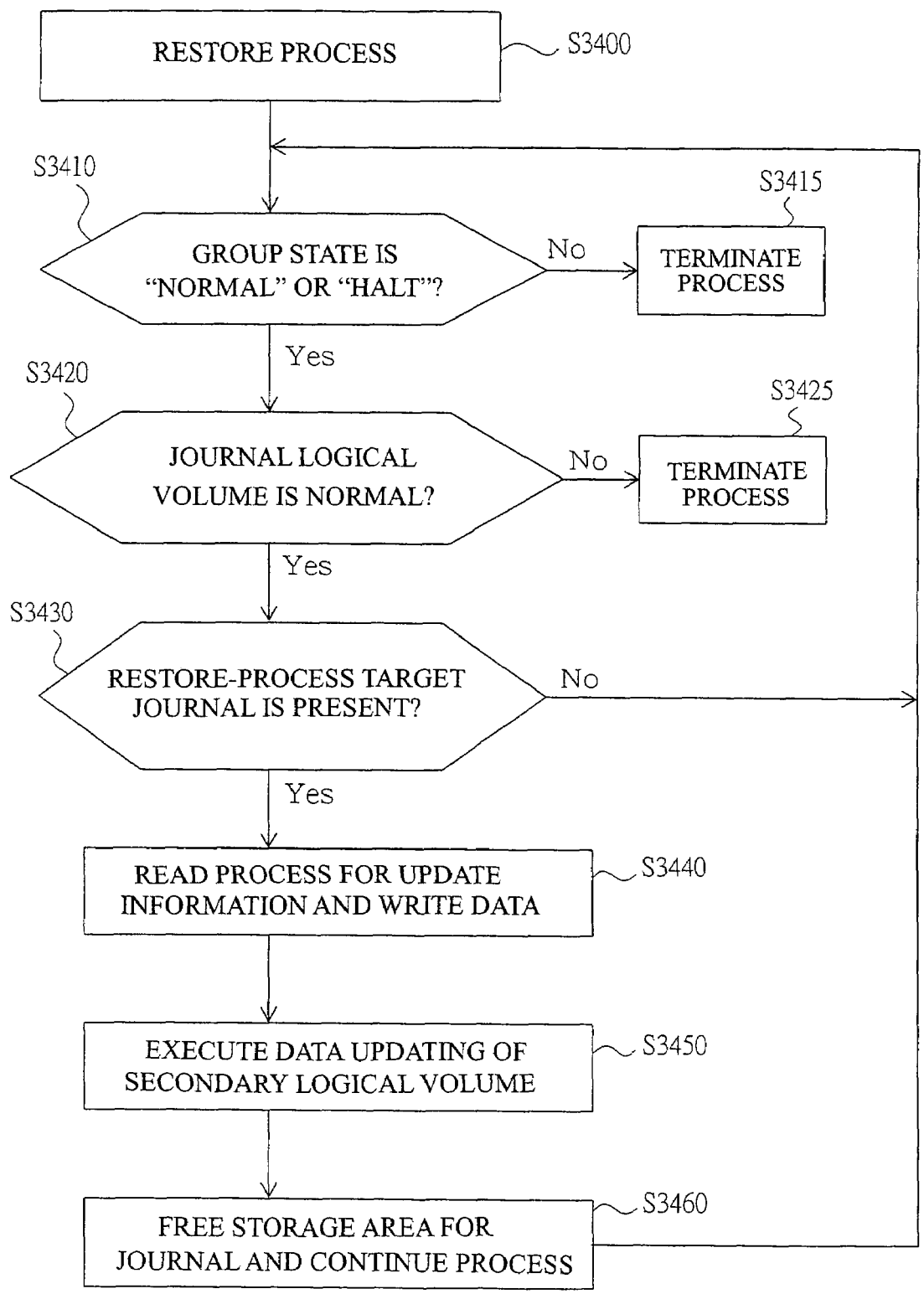
Figure 35:
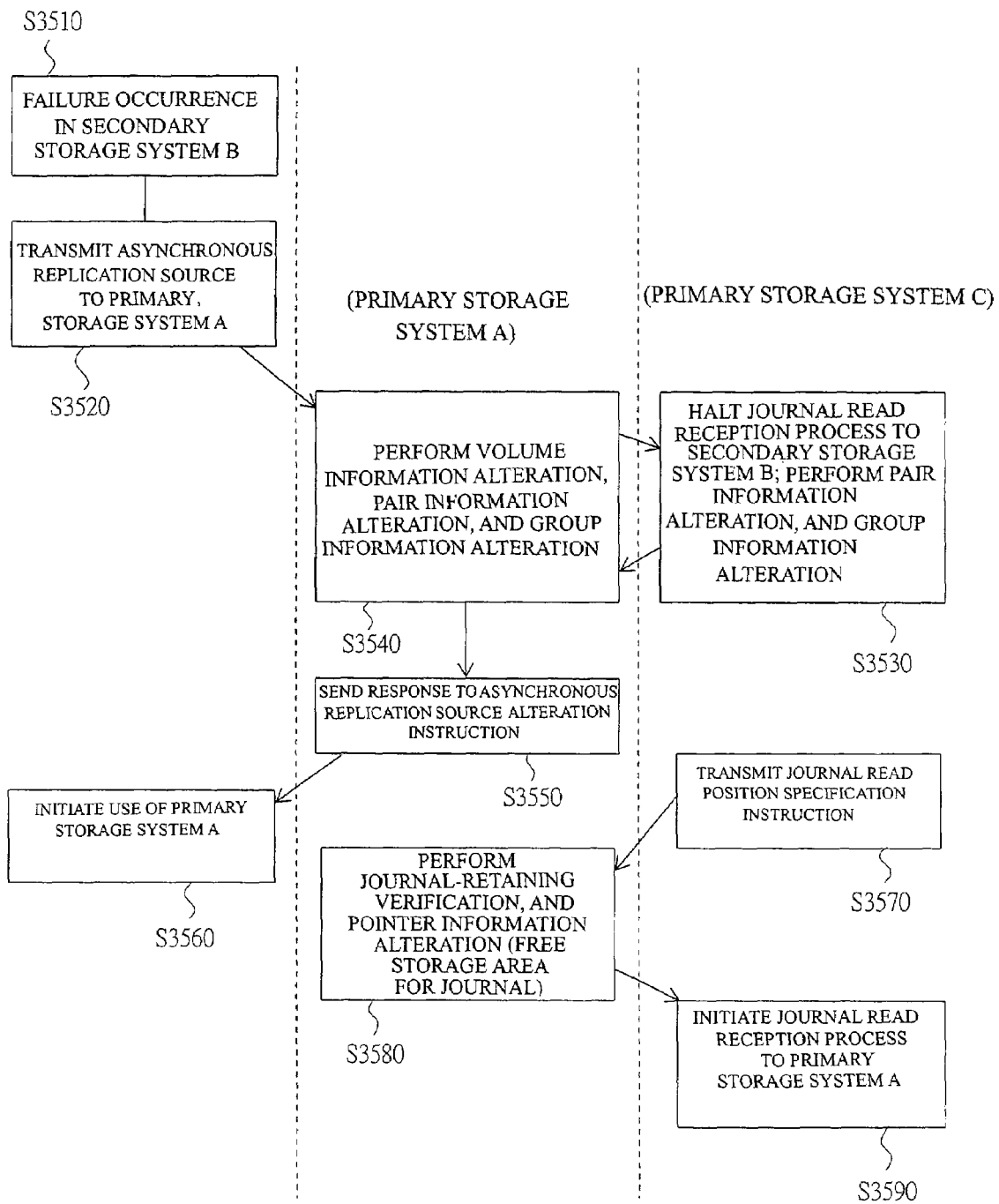
Figure 36:
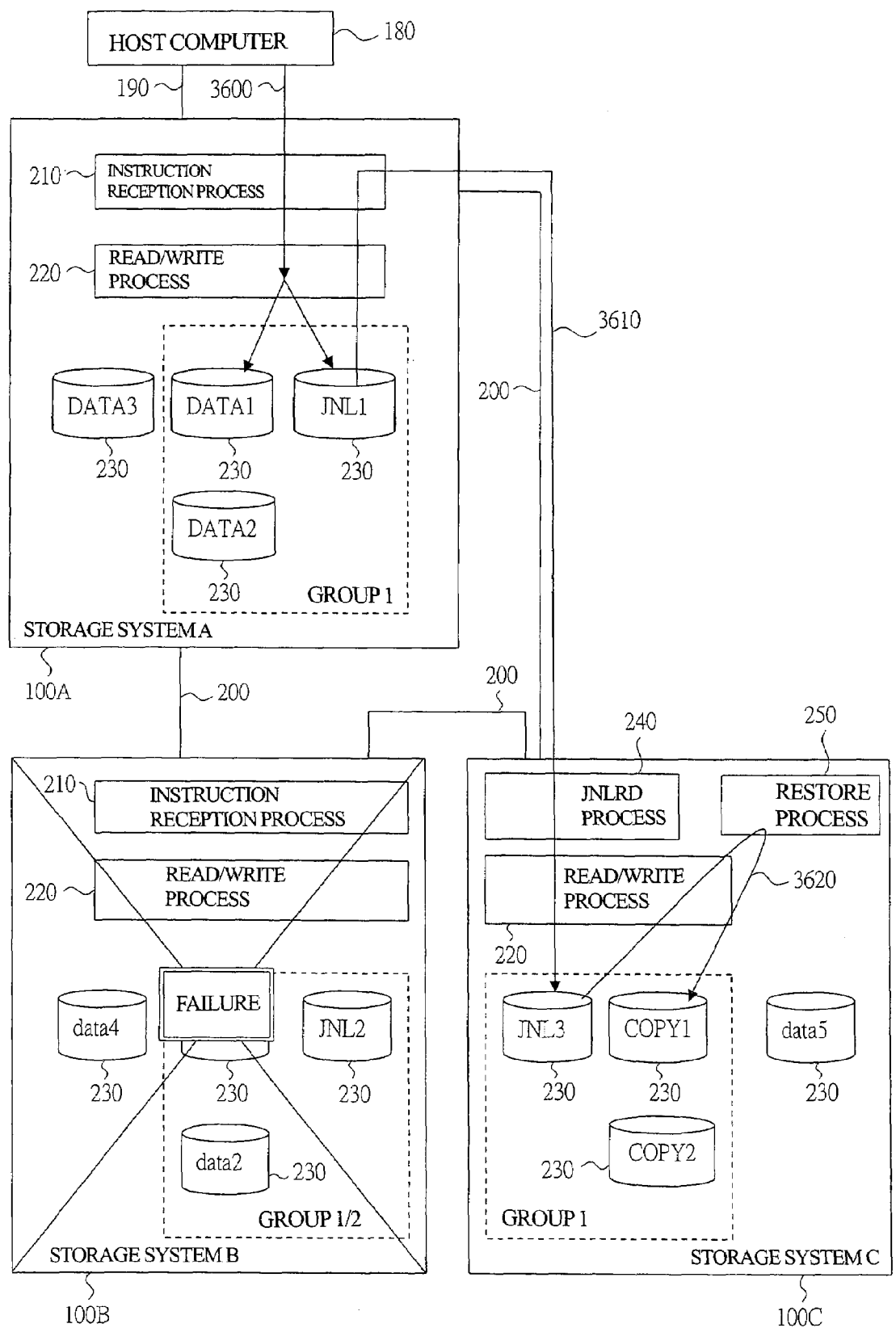
Figure 37:
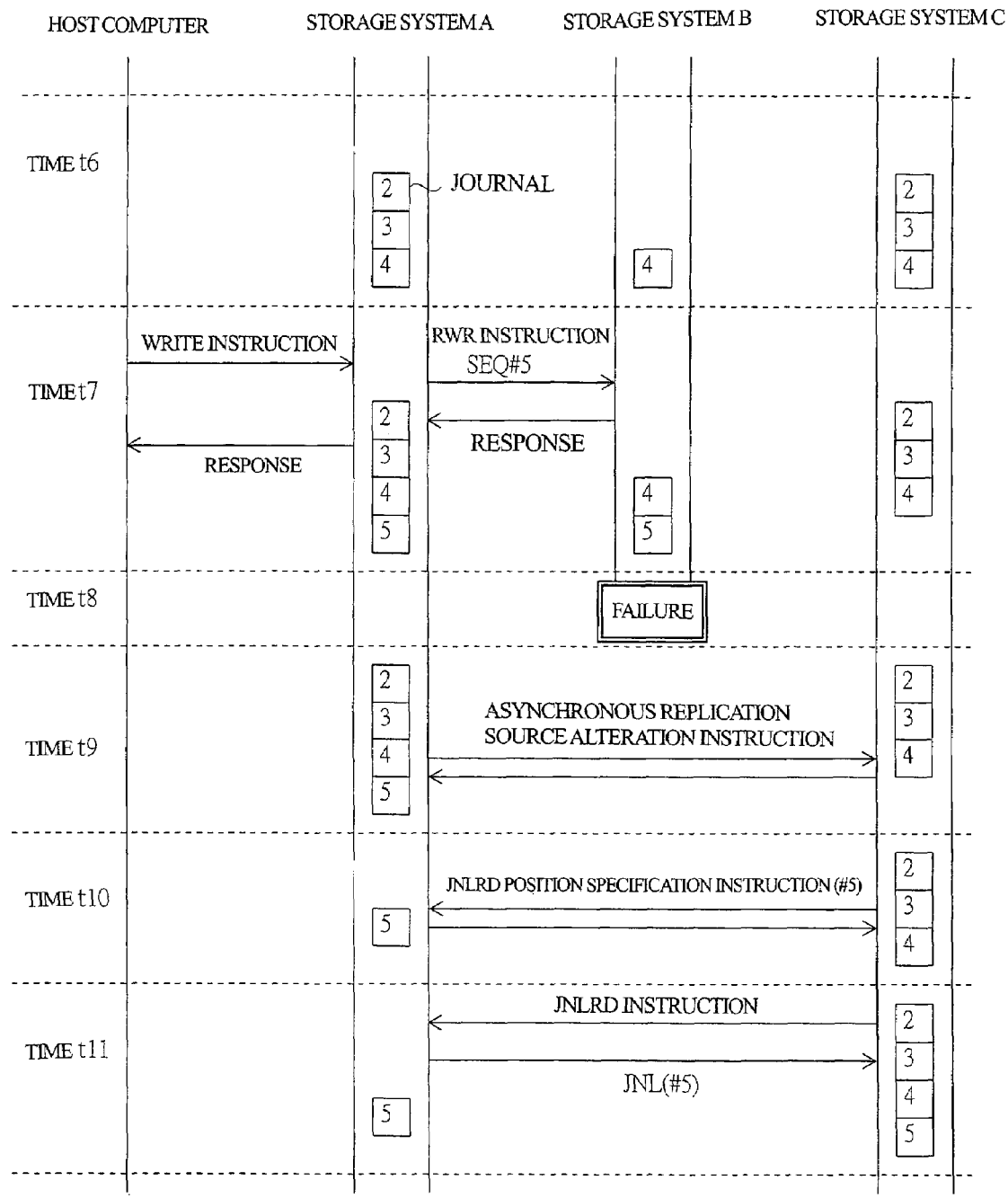
Figure 43:
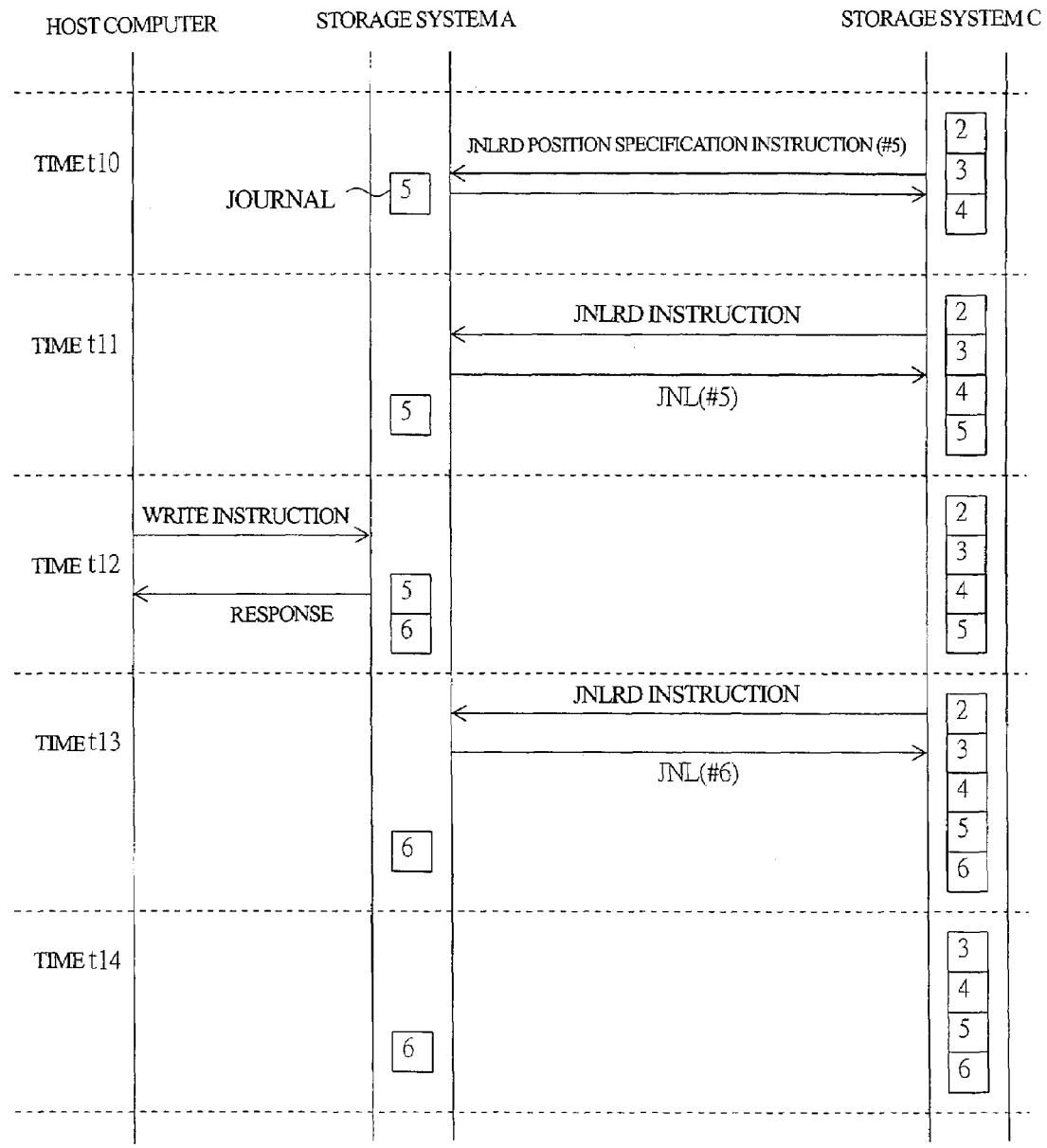
Figure 44:
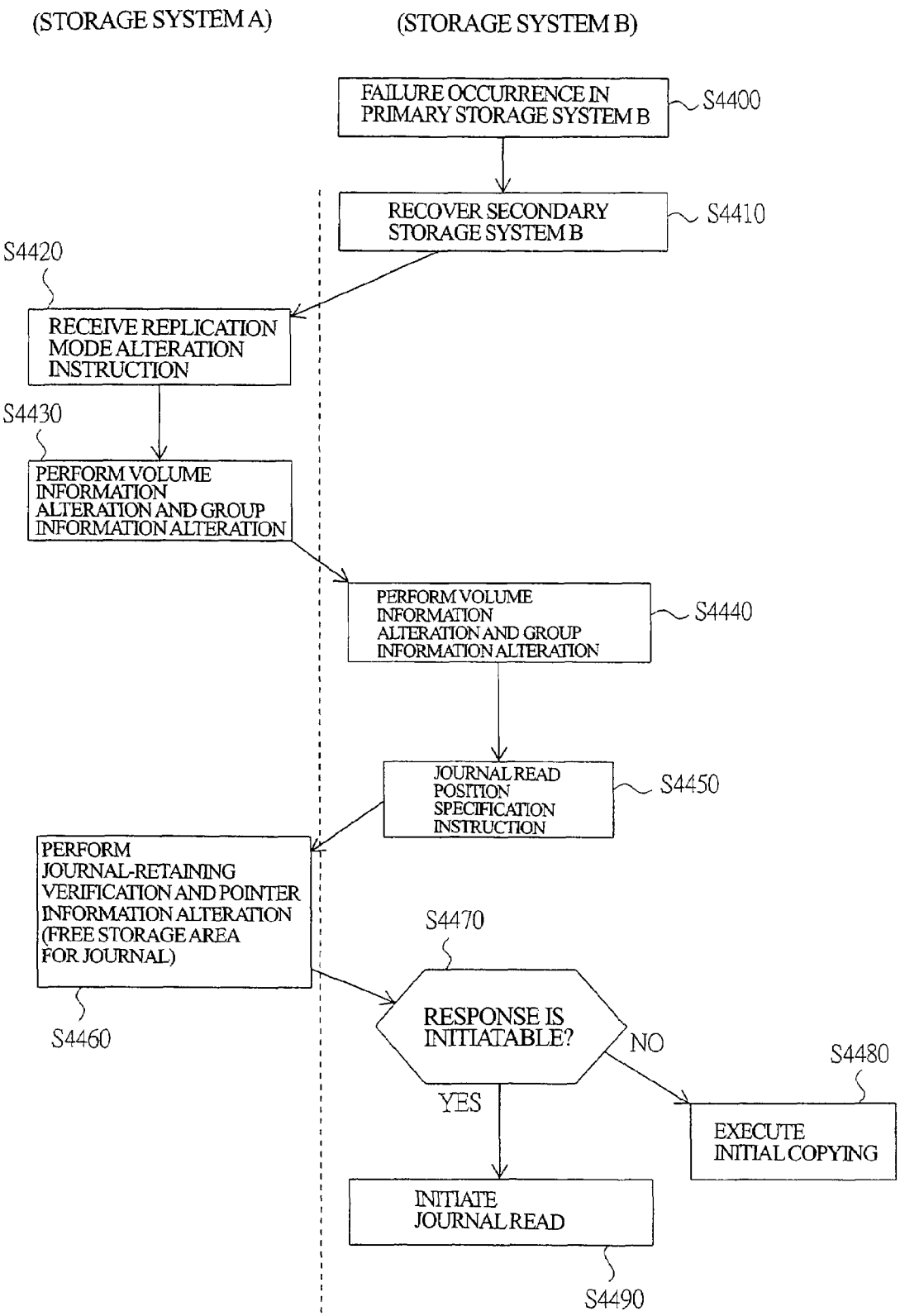
Figure 45:
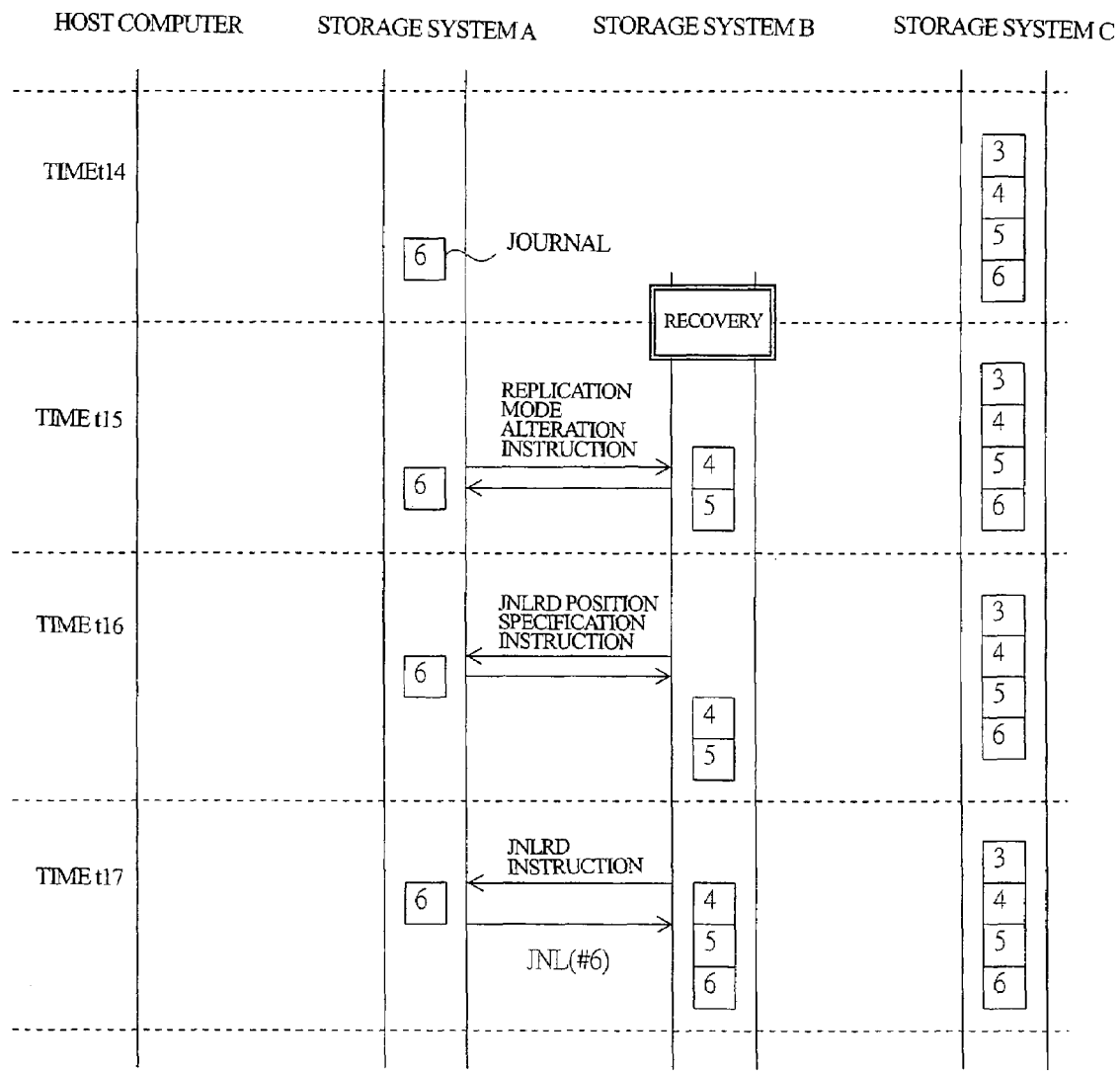
Figure 46:
Figure 47:
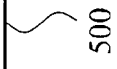
Figure 49:
Figure 51:
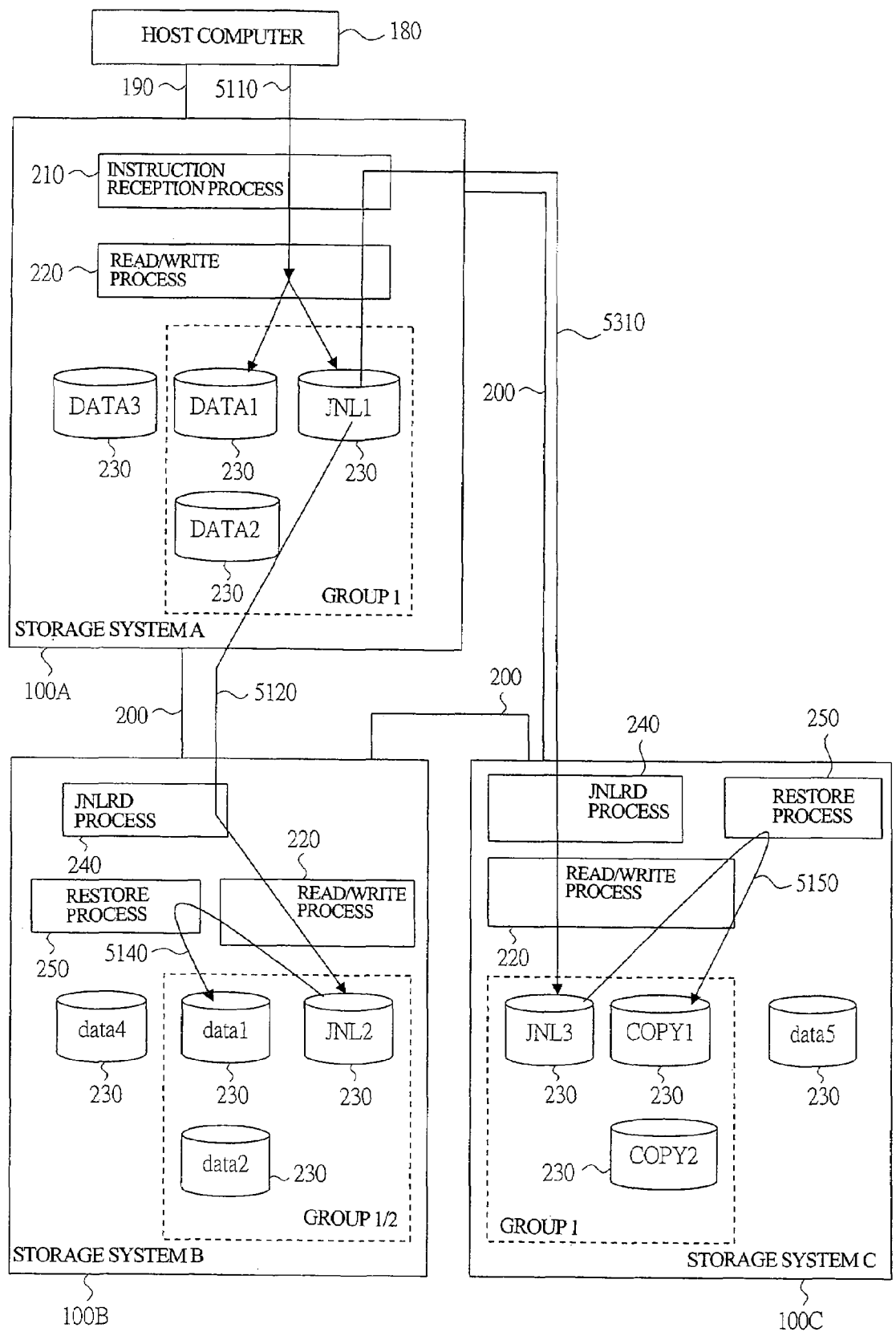
Figure 52:
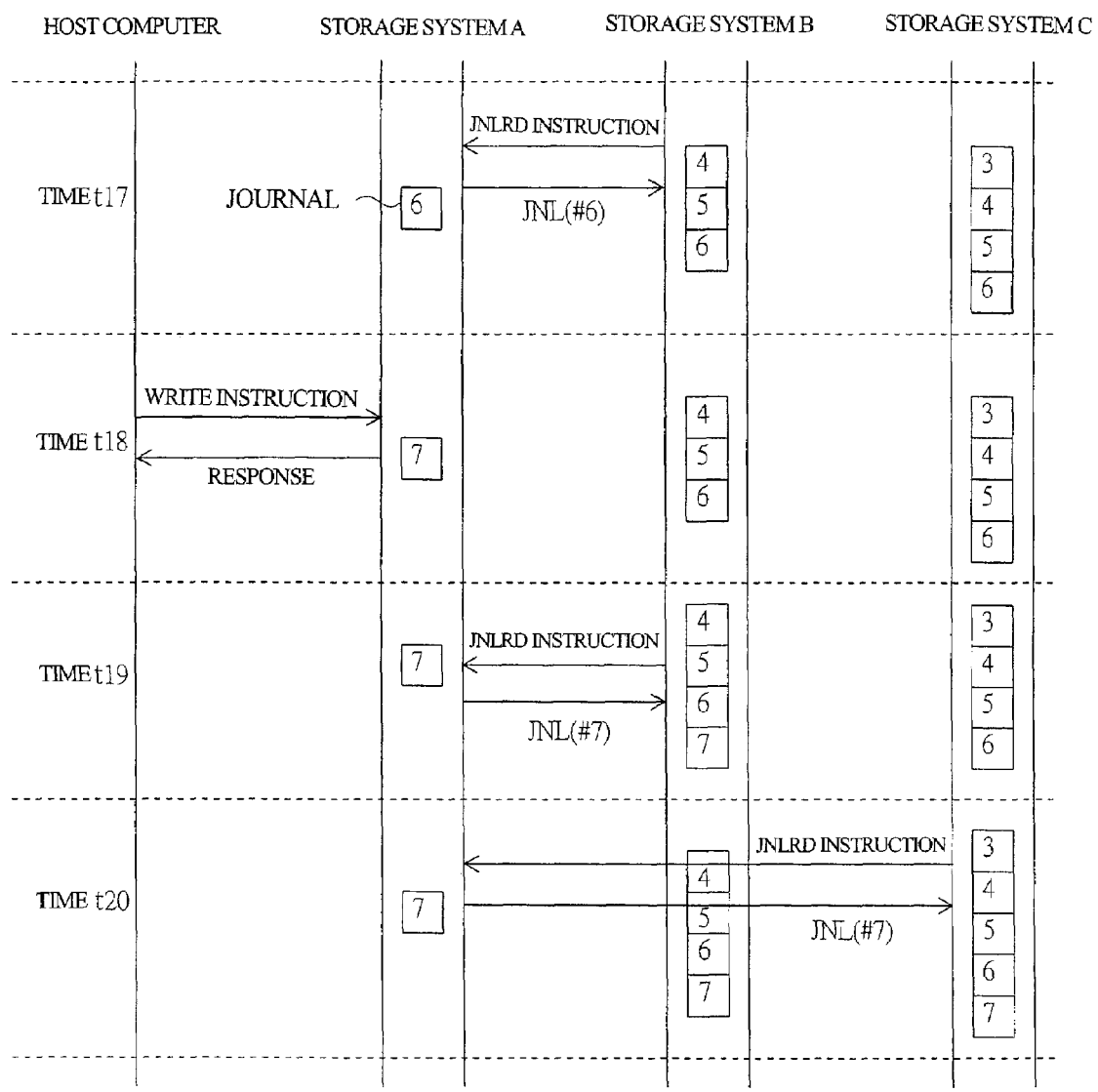
Figure 53:
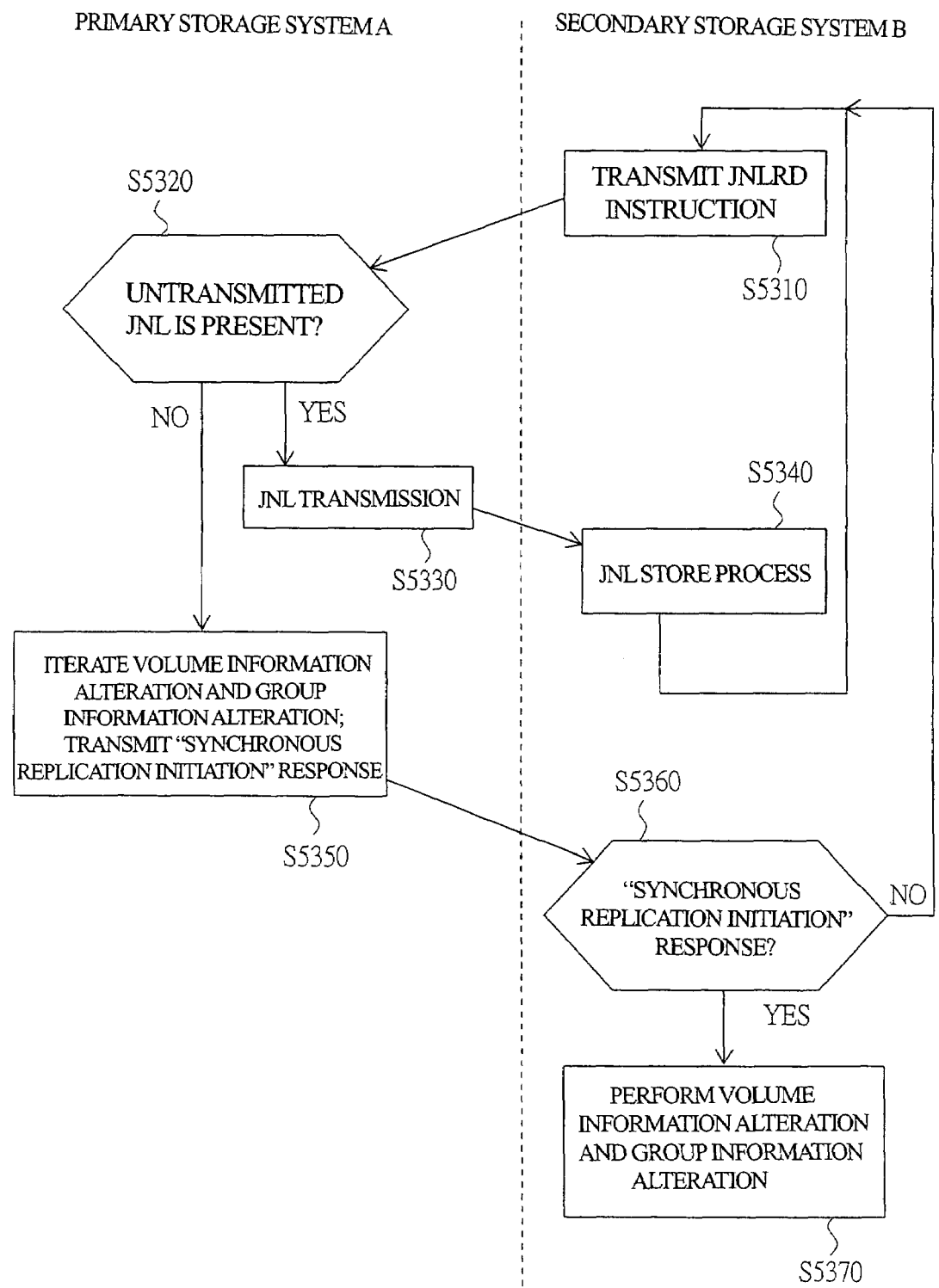
Figure 54:
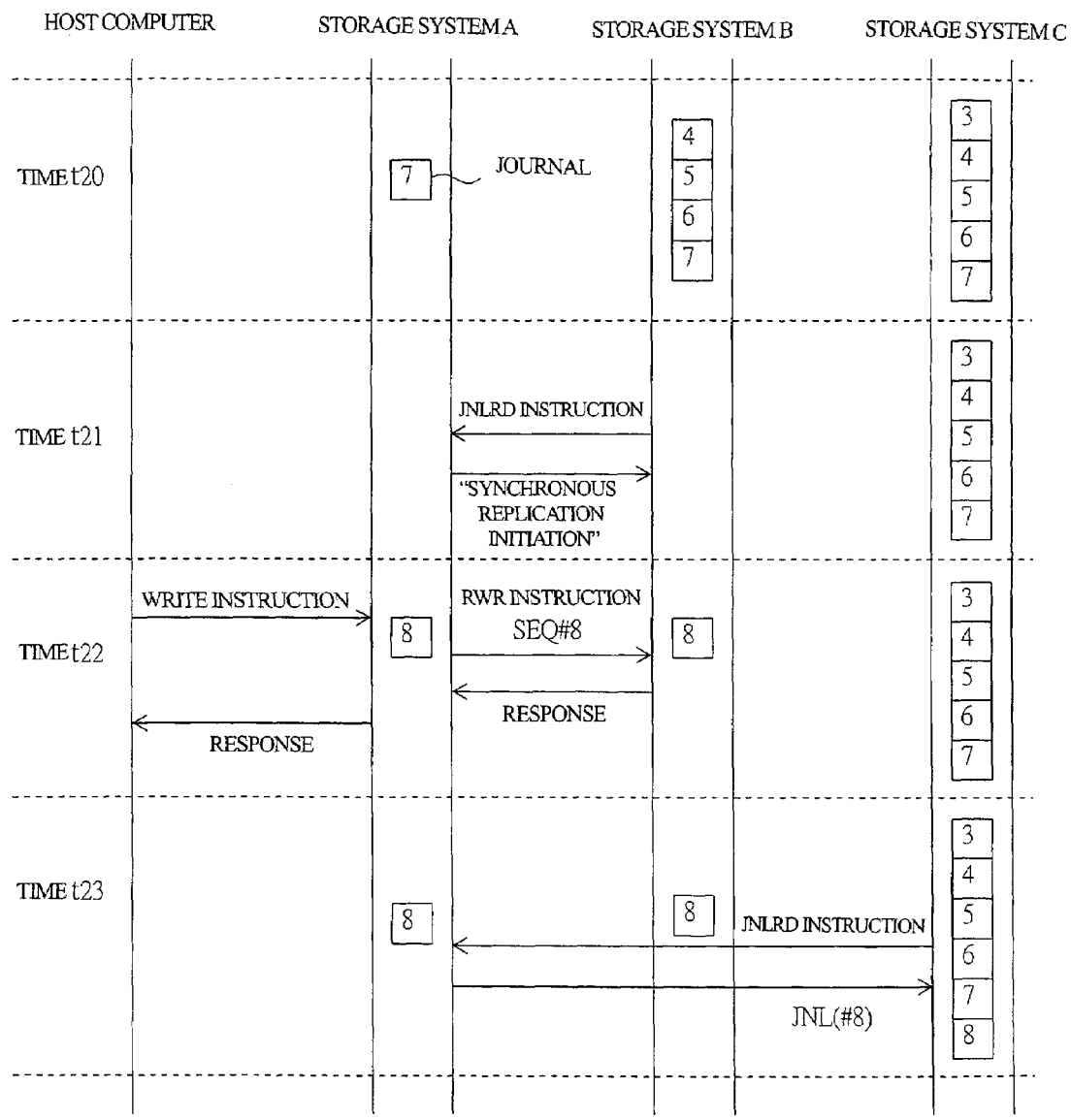
Figure 55:
Figure 59:
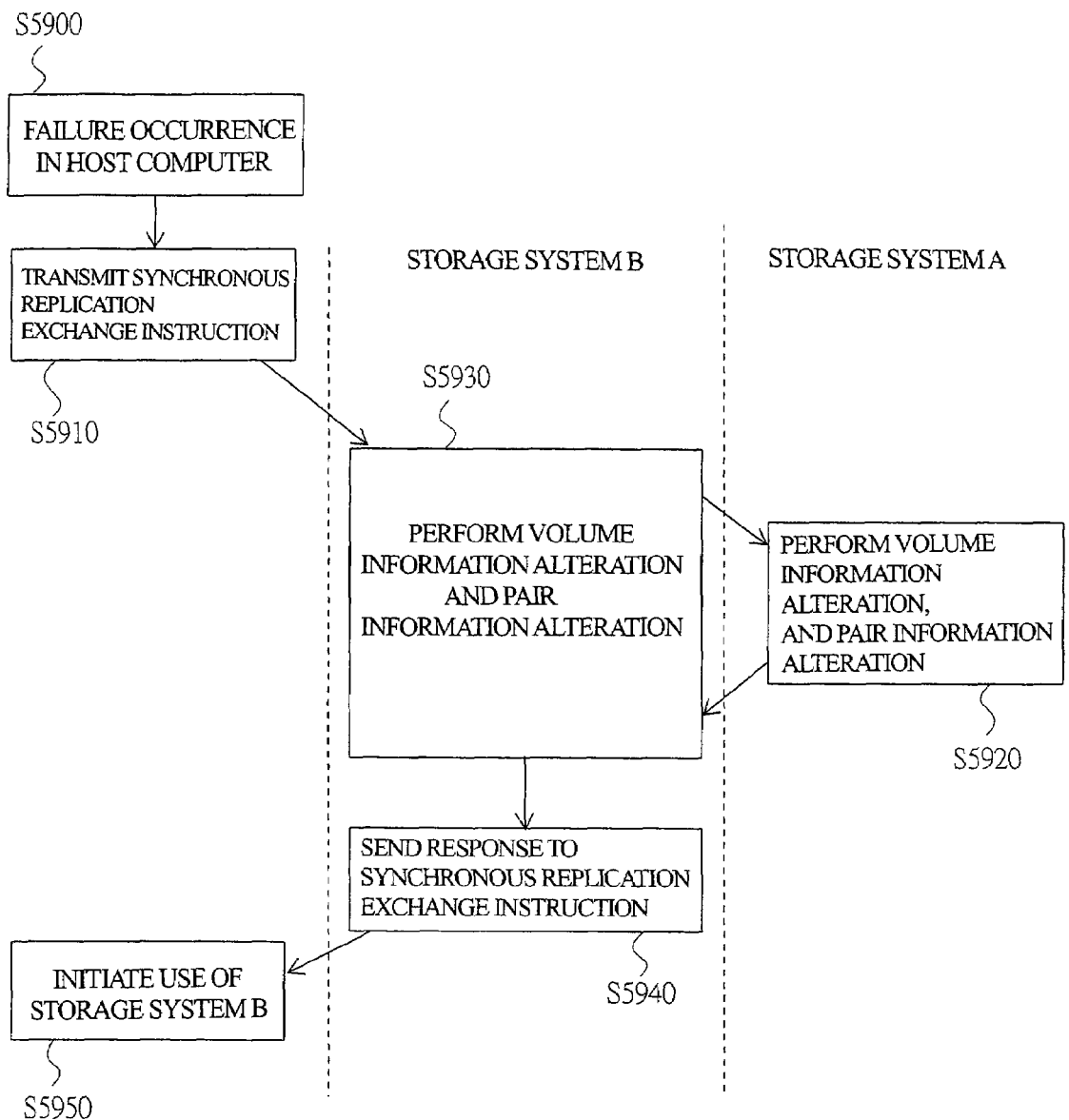
Figure 60:
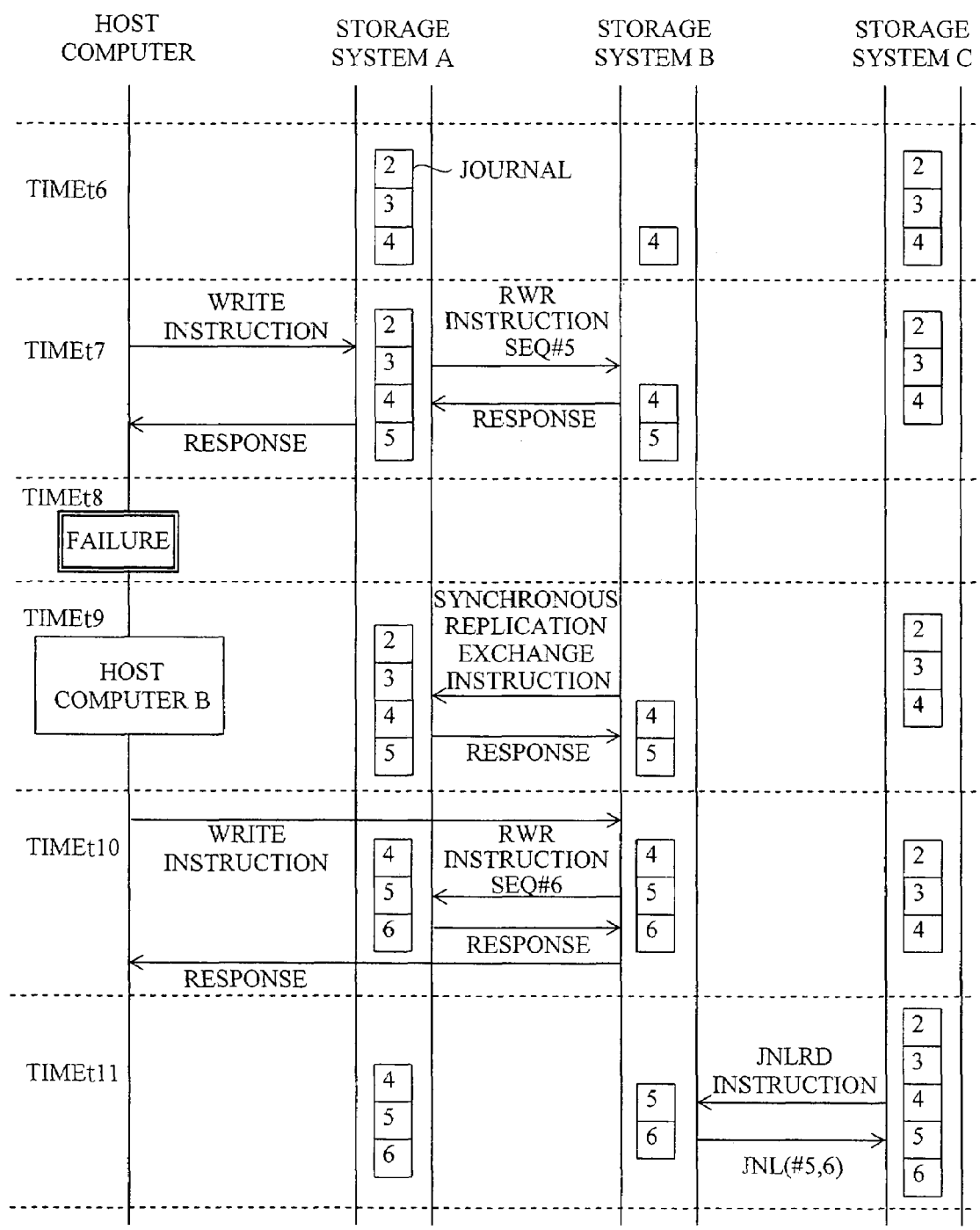
Figure 61:
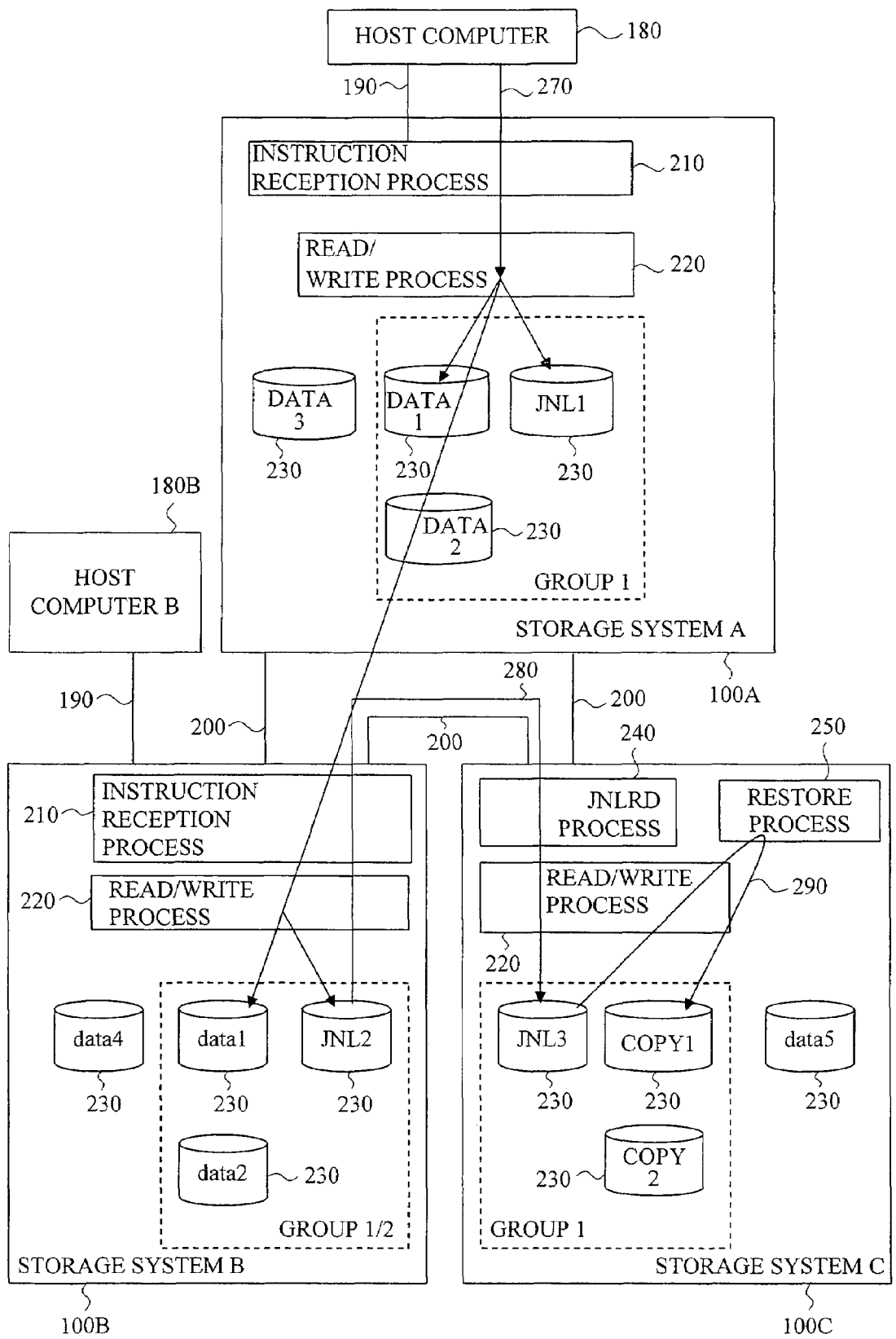
Figure 62:
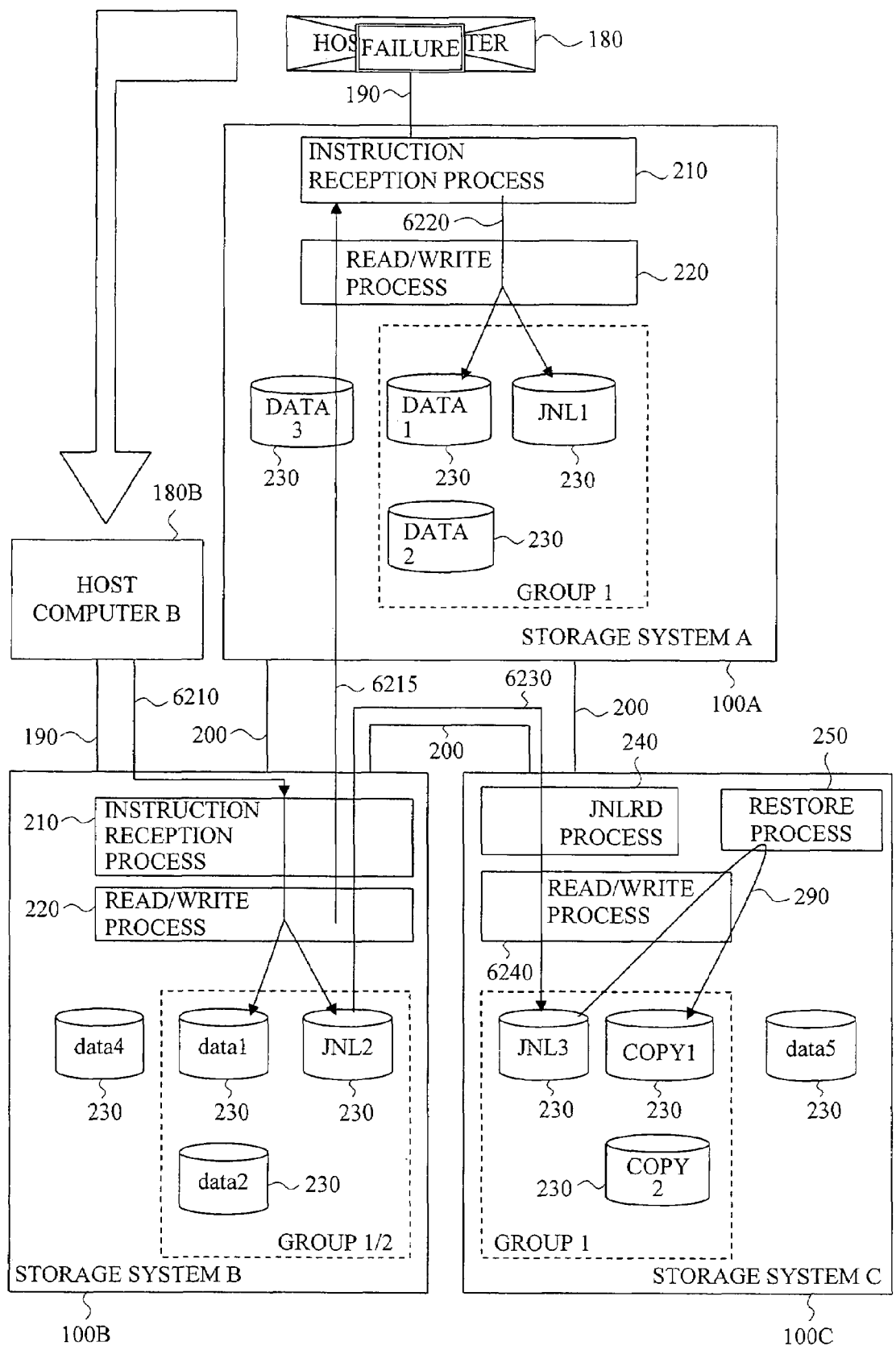
Figure 65:
Figure 66:

FIG. 5 is a view for explaining exchange of instructions and responses between a host computer and storage systems and journals retained in the individual storage systems when data updates to a primary logical volume of a first storage system is reflected in a secondary logical volumes of a second storage system and a third storage system in a data processing system of the embodiment according to the present invention;

FIG. 6 is a view for explaining an example of volume information in an embodiment according to the present invention;

FIG. 7 is a view for explaining an example of volume information in an embodiment according to the present invention;

FIG. 8 is a view for explaining an example of volume information in an embodiment according to the present invention;

FIG. 9 is a view for explaining an example of pair information in an embodiment according to the present invention;

FIG. 10 is a view for explaining an example of pair information in an embodiment according to the present invention;

FIG. 11 is a view for explaining an example of pair information in an embodiment according to the present invention;

FIG. 12 is a view for explaining an example of group information in an embodiment according to the present invention;

FIG. 13 is a view for explaining an example of group information in an embodiment according to the present invention;

FIG. 14 is a view for explaining an example of group information in an embodiment according to the present invention;

FIG. 15 is a view for explaining an example of pointer information in an embodiment according to the present invention;

FIG. 16 is a view for explaining the configuration of a journal logical 10 volume in an embodiment according to the present invention;

FIG. 17 is a view for explaining an example of pointer information in an embodiment according to the present invention;

FIG. 18 is a view for explaining an example of pointer information in an embodiment according to the present invention;

FIG. 19 is a flowchart for explaining a procedure of initiating data replication in an embodiment according to the present invention;

FIG. 20 is a flowchart for explaining an initial replication process in an embodiment according to the present invention;

FIG. 21 is a view for explaining an instruction reception process in an embodiment according to the present invention;

FIG. 22 is a flowchart of the instruction reception process in an embodiment according to the present invention;

FIG. 23 is a flowchart of a journal creation process in an embodiment according to the present invention;

FIG. 24 is a flowchart of a remote write instruction reception process in an embodiment according to the present invention;

FIG. 25 is a flowchart of a journal replication process in an embodiment according to the present invention;

FIG. 26 is a view for explaining a remote write instruction reception process in an embodiment according to the present invention;

FIG. 27 is a view for explaining an example of update information in the event of a journal creation process in an embodiment according to the present invention;

FIG. 28 is a view for explaining a journal read reception process in an embodiment according to the present invention;

FIG. 29 is a flowchart for explaining the journal read reception process in an embodiment according to the present invention;

FIG. 30 is a view for explaining a journal read process in an embodiment according to the present invention;

FIG. 31 is a flowchart showing the journal read process in an embodiment according to the present invention;

FIG. 32 is a flowchart for explaining a journal store process in an embodiment according to the present invention;

FIG. 33 is a view for explaining a journal restore process in an embodiment according to the present invention;

FIG. 34 is a flowchart for explaining a restore process in an embodiment according to the present invention;

FIG. 35 is a view for explaining a procedure of resuming data replication in the third storage system in an event where failure has occurred in the second storage system in a data processing system of an embodiment according to the present invention;

FIG. 36 is a block diagram showing a logical configuration in the third storage system in the event where failure has occurred in the second storage system in a data processing system of an embodiment according to the present invention;

FIG. 37 is a view for explaining exchange of instructions and responses between the storage systems and the host computer and journals retained in the individual storage systems in an event where data replication is resumed when the failure has occurred in the second 'storage system in a data processing system of the embodiment according to the present invention;

FIG. 38 is a view for explaining an example of volume information in an embodiment according to the present invention;

FIG. 39 is a view for explaining an example of pair information in an embodiment according to the present invention;

FIG. 40 is a view for explaining an example of group information in an embodiment according to the present invention;

FIG. 41 is a view for explaining an example of pair information in an embodiment according to the present invention;

FIG. 42 is a view for explaining an example of group information in an embodiment according to the present invention;

FIG. 43 is a view for explaining exchange of instructions and responses between the storage systems and the host computer and journals retained in the individual storage systems when data updates to the primary logical volume of a first storage system is reflected into the secondary logical volume of the third logical volume after the host computer has initiated the use of the first storage system in a data processing system of the embodiment according to the present invention;

FIG. 44 is a view for explaining a procedure of resuming data replication in the second storage system after the second storage system has recovered in a data processing system of an embodiment according to the present invention;

FIG. 45 is a view for explaining exchange of instructions and responses between the storage systems and the host computer and journals retained in the individual storage systems when data replication is resumed in the second storage system after the second storage system has recovered in a data processing system of an embodiment according to the present invention;

FIG. 46 is a view for explaining an example of volume information in an embodiment according to the present invention;

FIG. 47 is a view for explaining an example of pair information in an embodiment according to the present invention;

FIG. 48 is a view for explaining an example of group information in an embodiment according to the present invention;

FIG. 49 is a view for explaining an example of volume information in an embodiment according to the present invention;

FIG. 50 is a view for explaining an example of group information in an embodiment according to the present invention;

FIG. 51 is a block diagram showing a logical configuration in an event where data updates to the primary logical volume of the first storage system after the host computer has initiated the use of the first storage system is reflected into the secondary logical volumes of the second storage system and the third storage system in a data processing system of an embodiment according to the present invention;

FIG. 52 is a view for explaining exchange of instructions and responses between the storage systems and the host computer and journals retained in the individual storage systems when data updates to the primary logical volume of the first storage system is reflected into the secondary logical volumes of the second storage system and the third logical volume after the host computer has initiated the use of the first storage system in a data processing system of an embodiment according to the present invention;

FIG. 53 is a view for explaining a procedure of altering asynchronous data replication to synchronous data replication in the second storage system in a data processing system of an embodiment according to the present invention;

FIG. 54 is a view for explaining exchange of instructions and responses between the storage systems and the host computer and journals retained in the individual storage systems when the asynchronous data replication is altered to the synchronous data replication in the second storage system in a data processing system of an embodiment according to the present invention;

FIG. 55 is a view for explaining an example of volume information in an embodiment according to the present invention;

FIG. 56 is a view for explaining an example of group information in an embodiment according to the present invention;

FIG. 57 is a view for explaining an example of volume information in an embodiment according to the present invention;

FIG. 58 is a view for explaining an example of group information in an embodiment according to the present invention;

FIG. 59 is a view for explaining a procedure of initiating synchronous data replication of data in the first storage system when failure has occurred in a first host computer in a data processing system of an embodiment according to the present invention;

FIG. 60 is a view for explaining exchange of instructions and responses between the storage systems and the host computer and journals retained in the individual storage systems in an event of initiating the synchronous data replication of data in the second storage system in the first storage system when failure has occurred in the first storage system in a data processing system of an embodiment according to the present invention;

FIG. 61 is a block diagram showing a logical configuration before failure occurs in the first host computer in a data processing system of an embodiment according to the present invention;

FIG. 62 is a block diagram showing a logical configuration in an event of resuming data replication in the second host computer and the second storage system after failure has occurred in the first host computer in a data processing system of an embodiment according to the present invention;

FIG. 63 is a view for explaining an example of volume information in an embodiment according to the present invention;

FIG. 64 is a view for explaining an example of pair information in an embodiment according to the present invention;

FIG. 65 is a view for explaining an example of volume information in an embodiment according to the present invention; and FIG. 66 is a view for explaining an example of pair information in an embodiment according to the present invention.

DESCRIPTION OF THE PREFERRED EMBODIMENTS

An embodiment of the present invention will be described in detail below with reference to the drawings. In all the drawings for explaining the embodiment, configuration portions in accordance with on same concepts are, in principle, shown with same reference numerals, and repetitious descriptions of the portions will be omitted herefrom.

<Configuration of Data Processing>

Figure 1:
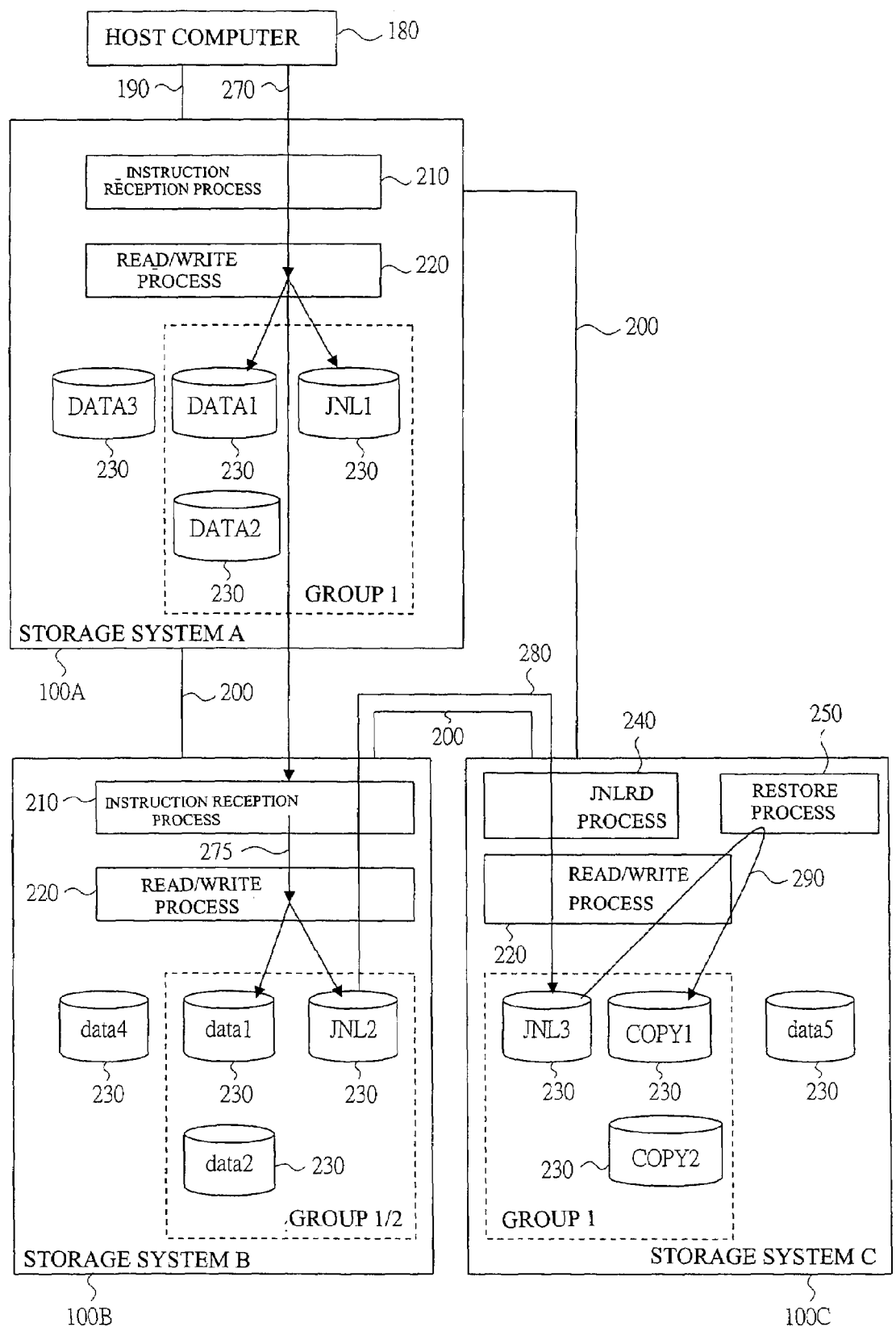
FIG. 1 is a block diagram showing a logical configuration in a data processing system of an embodiment according to the present invention.

FIG. 1 is a block diagram showing a logical configuration in a data processing system of an embodiment according to the present invention.

The data processing system of the present invention has a configuration including a plurality of storage systems (each of which is shown with numeral 100 in FIG. 2 and will be described below) each having and a storage device(s) and the functionality of storing data into a storage area. The data processing system has three storage systems as the plurality of storage systems 100, namely a storage system A (primary storage system) 100A, a storage system B (secondary storage system) 100B, and a storage system C (secondary storage system) 100C; a host computer 180 that uses the storage system A (100A); and communication lines used for communication among thereamong. The plurality of storage systems 100 are individually disposed at geographically remote sites to be prepared for occurrence of failure particularly in the case of disaster or the like. The communication lines are provided to serve such that the host computer 180 and the storage system A (100A) are connected together via a connection path 190. The storage system A (100A), the storage system B (100B), the camera unit C (100C) are connected via connection paths 200. In addition, the storage system B (100B) and the storage system C (100C) are connected together via a connection path 200.

In the state shown in FIG. 1, storage system A (100A) is a primary storage system for retaining replication target data.

The storage system B (100B) and the storage system C (100C) are each a secondary storage system for retaining replicated copy (replication data) regarding the replication target data. The host computer 180 accesses data retained in the storage system A (100A) to execute information processing (data processing).

For easy identification of the difference between the storage system between a storage system for retaining replication target data and a storage system for retaining replication data, the system on the side for retaining replication target data is named by being modified with "primary" and the system on the side for retaining replication data is named by being modified with "secondary". Specifically, corresponding to the primary and secondary states, the storage system A for retaining replication target data is referred to as a "primary storage system" or "primary storage system A", the storage system B for retaining replication data is refereed to as a "secondary storage system" or "secondary storage system B", and the storage system C for retaining replication data is refereed to as a "secondary storage system" or "secondary storage system C". The primary and secondary states are variable depending situations described below. The secondary storage system 100B retains a replicated copy of data retained in the primary storage system 100A. The secondary storage system 100C retains a replicated copy of the data retained in the primary storage system 100A in accordance with the data retained in the storage system 100B.

The host computer 180 has a CPU, a memory, and the like, in which various functions are implemented through various programs executed by the CPU. The host computer 180 is, for example, a personal computer (PC), a workstation, a mainframe computer and the like. The host computer 180 is usable not only as a computer that executes not only processes for users, such as businesses and individuals, by using the primary storage system 100A, but also as a computer that executes maintenance and/or management for the primary storage system 100A. The host computer 180 and the primary storage system 100A are interconnected by the connection path 190 in the manner of as direct connection or the like via a network such as a local area network (LAN), or a leased line, whereby to perform communication in accordance with a predetermined communication protocol. The host computer 180 is connected to a control section of the primary storage system 100A by means of the communication line and thereby making instruction for access to a logical volume.

The plurality of storage systems 100 are interconnected by direct connection using, for example, an network or a leased line, and thereby perform intercommunication in accordance with a predetermined communication protocol. The storage systems 100 individually have a functionality of remote transferring (copying) data through intercommunication between the control sections of the storage systems 100 via the connection path 200.

In the data processing system of the present embodiment, in the event of executing updating of replication target data in the storage system 100, a journal regarding the updating is created and stored into a storage area, and data replication is executed in accordance with the journal. Journals are retained in the individual storage systems 100. In asynchronous data replication, a necessary journal is transferred between the storage systems 100, and the updates are reflected into replication data in accordance with data in the journal, whereby replication data is made consistent with replication target data. In the data processing system of the present embodiment, in the event of normal operation, data replication between the storage systems 100, specifically, maintenance of replication-data retention states is performed. In the event of failure of a system configuration element, such as one of the storage systems 100, the journal is transferred between other storage systems 100 not in a failure state, and the update reflection is executed in accordance with data in the journal, whereby the data replication is continued/resumed. As the types (modes) of data replication between the storage systems 100, there are synchronous data replication and asynchronous data replication. In the event of normal operation, the two modes of data replication, namely the synchronous data replication and the asynchronous data replication, are executed between the three storage systems (100A to 100C), whereby two pieces of replication data are retained with respect to one piece of replication target data. The synchronous data replication is a process of updating replication data in synchronization with updating of replication target data, in which replication data is completely consistent with replication target data. The asynchronous data replication is a process of updating replication data in accordance with a journal in asynchronization with updating of the replication target data, in which replication data is completely consistent with the replication target data at some time after the updating of the replication target data.

In the state shown in FIG. 1, the primary storage system 100A and the storage system 100B executes an instruction reception process 210 and a read/write process 220. The storage system 100C executes a JNLRD (journal read) process 240, a read/write process 220, and a restore process 250. The processes to be executed are changeable depending the primary and secondary state of the storage system 100. The primary storage system 100A retains DATA1, DATA2, DATA3, JNL1, and the like as logical volumes 230. The primary storage system 100B retains data1, data2, data3, JNL2, and the like as logical volumes 230. The secondary storage system 100C retains COPY1, COPY2, data5, JNL3, and the like as logical volumes 230. Numeral 270 shown by arrows represents issuance of instructions for updating data retained in the primary storage system 100A from the host computer 180, and data updating and journal creation/storing in the primary storage system 100A. Numeral 275 represents data updating and journal creation/storing in the secondary storage system 100B in synchronization with the data updating in the primary storage system 100A. Numeral 280 represents a read of in the secondary storage system 100C from the secondary storage system 100B in asynchronization with the data updating and journal creation/storing into the primary storage system 100A and the secondary storage system 100B. Numeral 290 represents restoration in accordance with data in the journal (update reflection, that is, data updating by reflection (write) of an update part in the replication target data) to the retained data in the secondary storage system 100C. Each processing will be described below in detail.

A storage area retained in the storage system 100 is logically split and managed, and a split storage area is referred to as a "logical volume". Process target data is handled corresponding to the logical volume. The storage system 100 retains logical volumes 230 corresponding to data in the storage areas of one or more storage devices provided in the storage system 100. The size (storage capacity) of the each individual logical volume 230 and physical storage position (physical address) in the storage system 100 are specifiable by using a maintenance terminal, such as a computer connected to the storage system 100, or the host computer 180. The physical addresses of the individual logical volumes 230 are stored into volume information 400 described below. The physical address is comprised of a number (storage device number) identifying one or more storage devices in the storage system 100, and a numeric value uniquely indicative of the storage area of the storage device, such as a field in the position from a first position of the storage area of the storage device. In a description given below, the physical address is comprised of a set of the storage device number and the position from a first position of the storage area of the storage device.

Reference/updating of data stored in the storage system 100 is uniquely specifiable with a number (logical volume number) identifying the logical volume 230, and a numeric value uniquely indicative of the storage area, such as a field in the position from a first position of the storage area of the storage volume. Hereinafter, a set of the logical volume number and the position (intra-logical-address position) from a set of positions of the storage area in the storage volume will be referred to a "logical address". Additionally, in the description below, while the logical volumes 230 is the storage areas of one storage device, one logical volume can be correlated to storage areas of a plurality of storage devices by conversion of the logical address and the physical addresses.

For easy identification of the difference between the replication target data and the replication data, a replication-target logical volume 230 is referred to as a "primary logical volume", and a replication-data logical volume 230 is referred to as a secondary logical volume. A set of the primary logical volume and the secondary logical volume is referred to as a "pair". The relationship between the primary logical volume and the secondary logical volume, the states thereof, and the like are stored into pair information 500.

To maintain update sequences of data in the logical volume 230 and among the logical volumes 230, a management unit to be referred to as a "group" is provided. For example, suppose that the host computer 180 executes processes such that after data in a first primary logical volume has been updated, the first data is read and second data in a second primary logical volume is updated by using a numeric value of the first data. In this case, suppose a data replication process from the first primary logical volume to a first secondary logical volume is performed independently of data replication process from the second primary logical volume to a second secondary logical volume. In this case, a case occurs in which a replication process of the second data to the second secondary logical volume is executed prior to a replication process of the first data to the first secondary logical volume. As such, suppose the replication process of the first data to the first secondary logical volume is terminated by, for example, failure in the course between the replication process of the second data to the second logical volume and the replication process of the first data to the first secondary logical volume. In this case, data integrity of the first secondary logical volume and the second logical volume is lost.

Even in the above case, to maintain the data integrity of the first secondary logical volume and the second secondary logical volume, logical volumes for which the data update sequence should be maintained are registered in the same group, update information 600 described below is allocated thereto, and the replication process (data update process) is controlled to be executed for the secondary logical volumes in units of a data update in the sequence of update numbers. In lieu of the update number, update time may be used. For example, referring to FIG. 1, the logical volume DATA1 and the logical volume DATA2 constitute a group 1 (hereafter, a group having a group number n is indicated as a "group n"). In addition, the logical volume data1, which is a replicated copy of the logical volume DATA1, and the logical volume data2, which is a replicated copy of the logical volume DATA2, constitute a group 1 and a group 2 in the secondary storage system 100B. Similarly, in the secondary storage system 100C, the logical volume COPY1, which is a replicated copy of the logical volume data1, and the logical volume COPY2, which is a replicated copy of the logical volume data2, constitute a group 1. The group 1 in the primary storage system 100A and the group 1 in the secondary storage system 100B are correlated with each other, and the group 2 in the secondary storage system 100B and the group 1 in the secondary storage system 100C are correlated with each other.

When updating data in the replication-target logical volumes DATA1 and DATA2, the primary storage system 100A creates a journal described below and stores it into a logical volume in the primary storage system 100A. In the description of the present embodiment, there is allocated logical volumes (each of which hereafter will be specifically referred to as a "journal logical volume") dedicated to store only journals in units of the group. In FIG. 1, JNL1 is the journal logical volume for the group 1. Similarly, when updating data in the secondary logical volumes data1 and data2 retained in the secondary storage system 100B, the secondary storage system 100B creates a journal described below and stores it into the journal logical volume in the secondary storage system 100B. In the secondary storage system 100B, JNR 2 is the journal logical volume for the group 1 or the group 2.

The journal logical volume is allocated also to the group in the secondary storage system 100C. The journal logical volume is used to store journals transferred from the secondary storage system 100B to the secondary storage system 100C. Since the journal is stored in the journal logical volume, the operation may be performed in the following manner. For example, in the event that the load imposed on the secondary storage system 100C is high, data updating of the secondary logical volume COPY1, COPY2 is not executed at the time of journal reception, but the data updating of the secondary logical volume COPY1, COPY2 is executed some time later when the load in the secondary storage system 100C is low. In addition, in a configuration having a plurality of connection paths 200, multiple journal transfers are executed therethrough from the secondary storage system 100B to the secondary storage system 100C storage system, whereby transfer capability of the connection path 200 can be effectively utilized. Because of the data update sequence to be maintained, there can be accumulated many journals are accumulated in the secondary storage system 100C. However, this does not cause a problem because a journal that cannot be immediately used are stored in the journal logical volume. In FIG. 1, JNR3 is the journal logical volume for the group 1 in the secondary storage system 100C.

<Configuration of Storage Systems>

Figure 2:
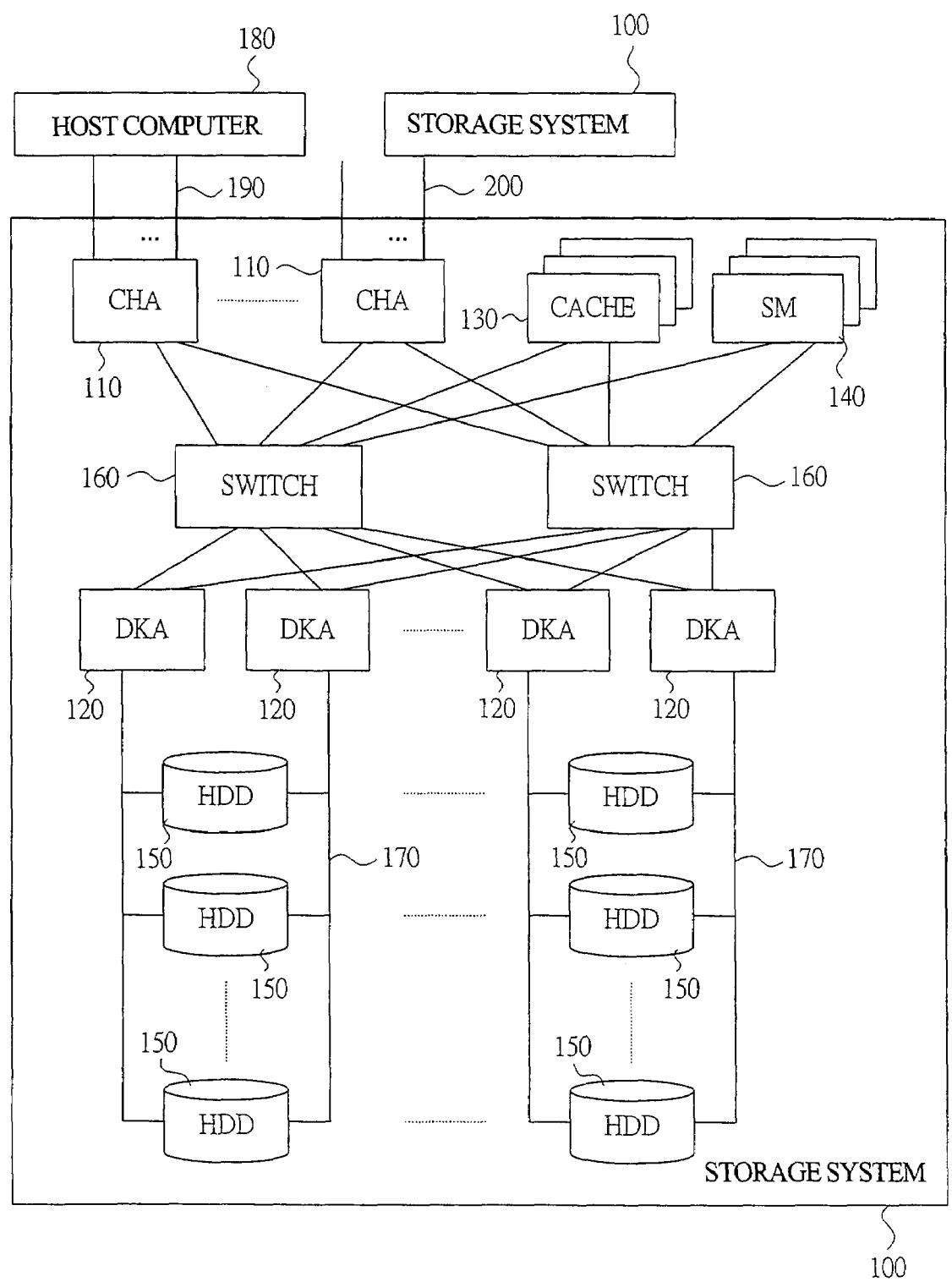
FIG. 2 is a block diagram showing an interior construction of a storage system in the data processing system of the embodiment according to the present invention.

FIG. 2 shows an interior construction of the storage system 100 that is used as a configuration element of the data processing system of the embodiment. In the present embodiment, the storage system 100 is a storage device. The storage system 100 has a configuration including one or more CHAs 110 (host adapters), one or more DKAs 120 (disk adapters), one or more CACHEs 130 (cache memories), one or more SMs 140 (shared memories), one or more HDDs 150 (storage devices), one or more SWITCHes 160 (switches), and one or more connection lines 170. The host adapters 110, disk adapters 120, cache memories 130, and shared memories 140 are interconnected by means of switches 160. The disk adapter 120 and the storage devices 150 are connected together by means of the connection line 170. Additionally, although not shown in the drawing, a maintenance terminal for executing setting, monitoring, maintenance, and the like for the host adapter 110 is connected to each of all the host adapters 110 and disk adapters 120 by means of a leased line.

The storage devices 150 are each, for example, a hard disk drive; and a plurality of storage devices 150 may be disposed to configure a RAID (redundant array of inexpensive disks) structure. The logical volume, which is a logical storage area, may be correlated to the physical volume, which is a physical storage area.

The storage system 100 has the host adapters 110 and the disk adapters 120 as control sections for controlling the instruction reception process 210 and various other processes, in which programs corresponding to the processes are executed by a processor. The host adapter 110 has functionality of exchanging input/output instructions with a communication interface for communication with the host computer 180, and thereby controls data transfer between the host computer 180 and the cache memory 130. The host adapter 110 is connected to the host computer 180 and another host adapter 110 by means of the connection path 190 and the connection path 200. The disk adapter 120 controls a read from and write to the storage device 150, and controls data transfer between the cache memory 130 and the storage device 150.

The cache memory 130 is a memory primarily temporarily storing data having been received from the received from the host computer 180 or data having been read from the storage device 150. The shared memory 140 is a memory sharedly used by the all host adapters 110 and disk adapters 120 in the storage system 100 whereby to primarily store, for example, control information. In the configuration, while the instruction for a read from or a write to the disk adapter 120 is thus made from the host adapter 110 through the cache memory 130 and the shared memory 140, the configuration may also be arranged such that the instruction is directly made from the host adapter 110 to the disk adapter 120. Still alternatively, the configuration may be such that memories equivalent to the cache memory 130 and the shared memory 140 are distributedly provided in the individual channel control sections 110 and disk adapters 120.

By using, for example, the maintenance terminal and the host computer 180 which are connected to the storage system 100, a user such as an administrator is allowed to perform various things through a predetermined user interface. The things include, for example, setting for increasing or reducing the number of the plurality of storage devices 150 and for a RAID structure; setting of the connection paths, setting of the logical volumes; verification of the operation states of the storage systems 100; designation of a failure portion in the event of failure occurrence; and setting of failure monitoring targets, the contents thereof, and a failure-notification receiving end. A constitution where the maintenance terminal is housed in the storage system 100 or a constitution where the maintenance terminal is added on may be employed.

<Configuration of Journal>

The journal is data to be created as information regarding data updating in the event of the data updating of replication target data (primary logical volume) retained in the storage system 100, and is configured to include write data and update information 300. The write data is a copy of data (write data to an update position) used from the host computer 180 in the event of data update process for the primary logical volume. The update information 300 is information for managing per-update write data and the journal per se, and is configured of, for example, write-instruction reception time (update time), a group number, an update number (update number in update information 600 described below), a write-instruction logical address, a write-data data size, and a logical address of a journal logical volume stored with the write data. The update information 300 has the write-instruction reception time (update time) and the update number as a data update identifier. The identifier enables the data update sequence to be identified. For the data update identifier, the journal may be arranged to have only one of the update time and the update number. In addition, in the case where a write-instruction creation time is contained in the write instruction from the host computer 180, the write-instruction creation time may be used in lieu of the write-instruction reception time.

Using FIGS. 3 and 4, an example of the update information 300 in the journal will be described hereunder. FIG. 3 shows the example of the update information 300 in the journal. In the example, the update information 300 stores a write instruction received at 22 (hours): 20 (minutes): 10 (seconds) on Mar. 17, 1999. The write instruction causes write data to be stored into the position of 700 in a field allocated from a first position of the storage area of the logical volume having the logical volume number 1 (primary logical volume #1); and the data size is 300. The write data in the journal is stored into the position of 1500 from a first position of a storage area of a logical volume having the logical volume number 4 (journal logical volume #4). It can be known from the journal that the logical volume having the logical volume number 1 (journal logical volume #4) belongs to the group 1, and the data updating is the fourth data updating executed after the replication initiation for data in the group 1.

Figure 4:
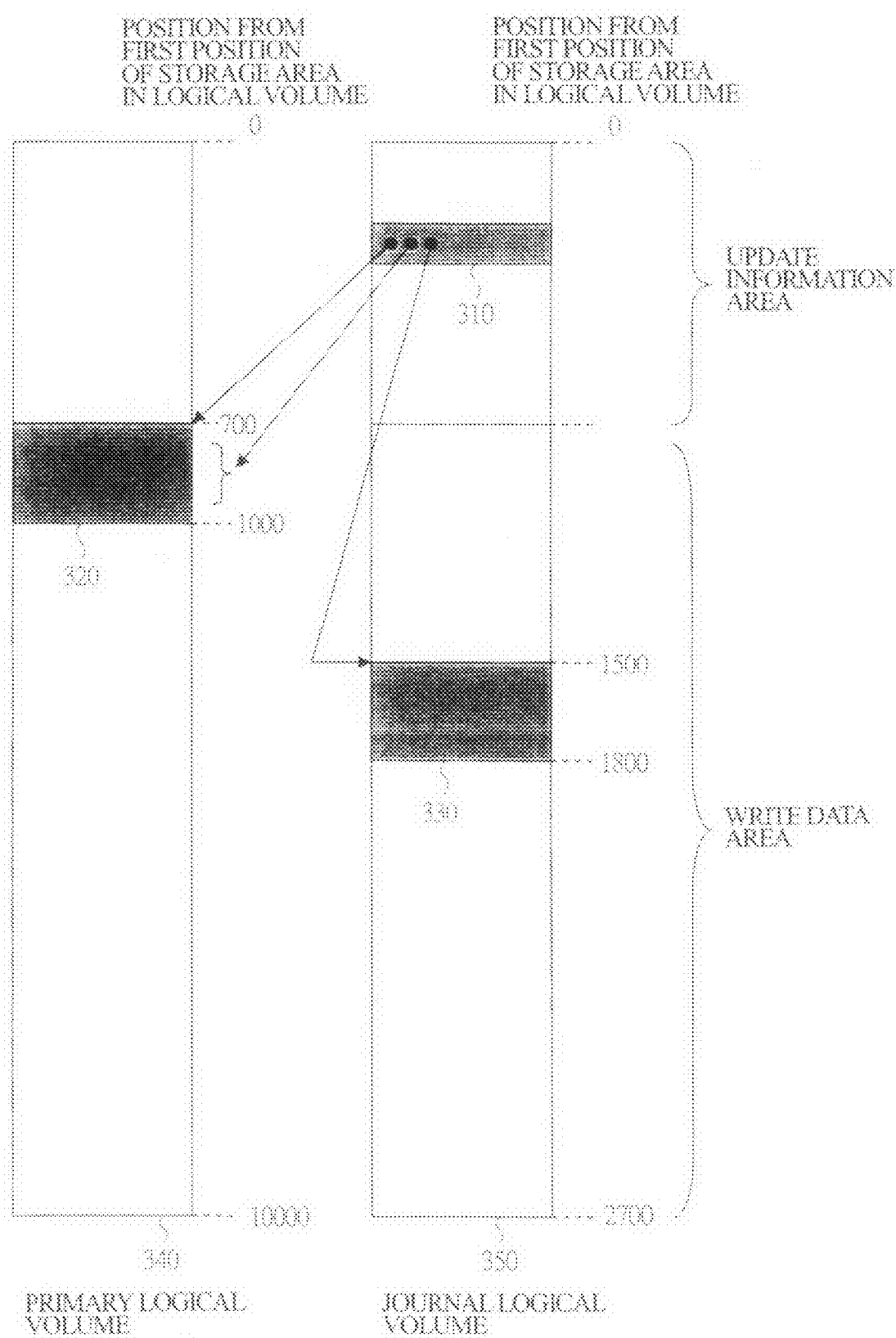
FIG. 4 is a view for explaining the relationship between update information in a journal logical volume and write data in an embodiment according to the present invention.

FIG. 4 is a view for explaining the relationship between the update information 300 in the journal logical volume and the write data, in correlation to FIG. 3. FIG. 4 shows a storage area 340 in the journal logical volume #1 and a storage area 350 in the journal logical volume #4. The journal logical volume is used by being separated into a storage area (update information area) for storing the update information 300 and a storage area (write data area) for storing the write data. In the case of update information area, the update information 300 is stored into a field from a first position of the update information area in the sequence of the update numbers. When an end position of the update information area is reached, information is repeatedly stored into a field from the first position of the update information area. Numeral 310 denotes an area being stored with the update information 300. In the case of the write data area, write data is stored in a field from the first position of the write data area. When an end position of the write data area is reached, the information is repeatedly stored into a field from the first position of the write data area. Numeral 330 denotes an area being stored with write data. The ratio between the update information area and the write data area may be a fixed value or may be a value settable from the maintenance terminal or the host computer 180. Numeral 320 denotes a data update area in the primary logical volume that is specified with the logical address of the write instruction and the data size of the write data. The information are stored into pointer information 700 described below. In the description below, the journal logical volume is used by being separated into areas of the update information 300 and the write data. However, a method may be employed that continually stores the update information 300 and the write data into a field from the first position of the storage area of the logical volume.

<Data Updating Operation>

With reference to FIG. 5 and FIG. 1 used in the above, a general description will now be provided hereunder regarding operation of reflecting data updates to the primary logical volume DATA1 in the primary storage system 100A into the secondary logical volume data1 in the secondary storage system 100B and the secondary logical volume COPY1 in the secondary storage system 100C. FIG. 5 is a view for explaining exchange of instructions and responses between the storage systems 100 (storage systems A to C) and the host computer 180 in a time series along the flow of the operation and journals retained in the individual storage systems 100. More specifically, FIG. 5 shows operation of reflecting data updates to the primary logical volume in the primary storage system 100A into the secondary logical volume in the secondary storage system 100B and the secondary logical volume in the secondary storage system 100C. At time t1, in an initial state, the all storage systems 100 retain a journal corresponding to update number 1 (SEQ#1). In the drawing, each rectangle square represents the journal, and the numeral therein represents the update number. Update number n in an instruction or a response for example is represented by "SEQ#n" or simply as "#n". The operation is described in (1) to (6) below.

(1) Upon receipt of a write instruction from the host computer 180 for data in the primary logical volume DATA1, the primary storage system 100A executes updating the data in the primary logical volume DATA1, creating a journal and storing it into the journal logical volume JNL1, and making instruction for updating data corresponding to the secondary logical volume data1 in the secondary storage system 100B through the instruction reception process 210 and read/write process 220 described below (270 in FIG. 1). Updating of data in the secondary logical volume data1 is executed with a remote write instruction (RWE instruction). The remote write instruction includes a write instruction, write data, and update information 300 in the journal from the host computer 180. The update information 300 in this case indispensably need not have all the information as shown in FIG. 3, but the information is sufficient if the information contains the update number or the time (update time) at which the write instruction has been received. At time t2, the primary storage system 100A receives the write instruction made from the host computer 180, updates the primary logical volume, and stores a journal corresponding to update number 2 (SEQ#2) into the journal logical volume. In addition, the primary storage system 100A transmits a remote write instruction (RWR instruction SEQ#2) including update number 2 as update information 300 to the secondary storage system 100B.

(2) Upon receipt of the remote write instruction from the primary storage system 100A, the secondary storage system 100B executes updating corresponding data in the secondary logical volume data1, and creating a journal and storing of the journal into the journal logical volume JNL2 by executing the instruction reception process 210 and read/write process 220 described below. For the update number and the update time to be specified in the journal, numeric values in the remote write instruction are used (275 in FIG. 1). At time t2, the storage system B (100B) receives the remote write instruction, updates data in the secondary logical volume, stores the journal corresponding to update number 2 into the journal logical volume, and returns a response to the storage system A (100A).

(3) After receipt of the response to the remote write instruction, the primary storage system A (100A) notifies the host computer 180 of termination of the write instruction. The above are indivisible processes synchronous with the data updating of the primary logical volume. Accordingly, the data in the primary logical volume data1 in the primary storage system 100B is completely consistent with the data in the secondary logical volume DATA1 in the secondary storage system 100B. In addition, the update number corresponding to the journal in the journal logical volume JNL1 and the update number corresponding to the journal in the journal logical volume JNL2 are completely consistent with each other with respect to one write instruction.

At time t2, the primary storage system 100A receives a response to the remote write instruction, and notifies the host computer 180 of completion of the write instruction. Thereafter, at time t3, the primary storage system A (100A) receives a next update write instruction from the host computer 180; and the storage system A (100A) and the storage system B (100B) each retain a journal corresponding to update number 3 (SEQ#3).

(4) The secondary storage system 100C reads the journal through the journal read process 240 from the secondary storage system 100B, and then stores the read journal into the journal logical volume JNL3 by the read/write process 220 (280 in FIG. 1). This process is executed asynchronous with the process of synchronous data replication, that is, the data updating in the primary storage system 100A and the secondary storage system 100B. At time t4, the storage system C (100C) transmits a journal read (JNLRD) instruction to the storage system B (100B), reads journals corresponding to update numbers 2 and 3 (unretrieved journals in storage system C (100C)) (JNL (#2, #3)) from the storage system B (100B).

(5) Upon receipt of the journal read instruction from the secondary storage system 100C, the secondary storage system 100B reads the journals from the journal logical volume JNL2 from the journal logical volume JNL2 in accordance with the instruction reception process 210 and read/write process 220 described below, and transmits the journals to the secondary storage system 100C (280 in FIG. 1). At time t4, the storage system B (100B) receives the journal read instruction of the storage system C (100C), and transmits the journals corresponding to update numbers 2 and 3 (journals untransmitted to the storage system C (100C)). In this case, the storage area for the journal corresponding to update number, which is older than the transmitted journals, may be freed.

(6) The secondary storage system 100C reads the journals in an ascending order of the update numbers (SEQ#) from the journal logical volume JNL3 by using the pointer information 700 in accordance with the restore process 250 and read/write process 220 described below, and thereby updates the data in the secondary logical volume COPY1 (290 in FIG. 1).

The above are autonomous processes autonomous the data updating of the primary logical volume. Accordingly, the secondary logical volume data1 in the secondary storage system 100B and the data in the logical volume COPY1 in the secondary storage system 100C completely consistent with each other at some time after the updating of the logical volume DATA1 and the logical volume data1. The data replication thus executed is referred to as "asynchronous data replication". At time t5, the storage system C (100C) reads the journal corresponding to update number 1 from the journal logical volume, and thereby updates the data in the secondary logical volume. In this case, the storage area for the journal corresponding to update number 1 that has become unnecessary may be freed. Alternatively, a method may be employed that frees the storage area for the oldest journal upon the time at which the journal storing area has become short. After the above-described operation, the storage system A (100A) receives a write instruction from the is host computer 180; and the storage system A (100A) the storage system B (100B) retains a journal corresponding to update number 4 (SEQ#4) through processes similar to the above. The arrangement may be such that, in response to the write instruction, the storage system B (100B) transmits to the storage system A (100A) the update number in the journal for which the storage area has been freed at time t4, and a storage area for journals received before the journal corresponding to the update number having been received by the storage system A (100A) is freed. As a method of noticing to the storage system A (100A) the update number of the journal with its storage area being freed, a dedicated instruction may be used.

Subsequently, at time t6, the storage system C (100C) transmits a journal read instruction to the storage system B (100B), reads the journal corresponding to update number 4 (SEQ#4) from the storage system B (100B), and stores the journal into the journal logical volume JNL3.

<Configuration of Volume Information>

FIG. 6 shows an example of volume information 400 retained in the storage system 100. The volume information 400 is used to manage the logical volumes 230, and retains a logical volume number, volume state, format type, size, synchronization pair number, asynchronization pair number, and physical address (storage device number and the position from the first position in the storage area). The volume information 400 is stored into a memory, such as the shared memory 140, which is referenceable from the host adapter 110 and the disk adapter 120.

In the volume information 400, the field of the volume state retains any one of "normal", "primary", "secondary", "primary/secondary", "abnormal", and "unused". An instance where a logical volume 230 is in the "normal" or "primary" volume state indicates that the logical volume is normally accessible from the host computer 180. An instance where a logical volume 230 is in the "secondary" or "primary/secondary" volume state indicates that access to the logical volume from the host computer 180 may be permitted. An instance where a logical volume 230 is in the "primary" volume state indicates that the logical volume is currently undergoing data replication. An instance where a logical volume 230 is in the "secondary" volume state indicates that the logical volume is currently being used for replication. An instance where a logical volume 230 in the "primary/secondary" volume state indicates that the logical volume is currently being used for replication and currently undergoing data replication. An instance where a logical volume 230 in the "abnormal" volume state indicates that the logical volume is normally inaccessible due to failure. The failure in this case refers to, for example, a failure in the storage device 150 retaining the logical volume 230. An instance where a logical volume 230 in the "unused" volume state indicates that the logical volume is not currently being used.

In the volume information 400, the synchronization pair number and the asynchronization pair number are valid in the volume state of "primary", "secondary", or "primary/secondary", and each of the pair numbers retains a pair number that specifies the pair information 500 described below. In the case where no pair number to be retained is present, an invalid value ("0", for example) is set. The example shown in FIG. 6 indicates that the logical volume having the logical volume number 1 has a format type of "OPEN 3", has a size of 3 GB, has data stored into a field from a first position in the storage area of the storage device 150 having the storage device number 1, is accessible, and is a replication target.

FIGS. 6, 7, and 8 show, respectively, the volume information 400 of the primary storage system 100A, volume information 400 of the secondary storage system 100B, and volume information 400 of the secondary storage system 100C in the state shown in FIG. 1.

<Configuration of Pair Information>

FIG. 9 shows an example of pair information 500 retained in the storage system 100. The pair information 500 is used to manage pairs, and retains a pair number, pair state, primary storage system number, primary logical volume number, secondary storage system number, secondary logical volume number, group number, and copied address. The pair information 500 is stored in a memory, such as the shared memory 140, that is referenceable from the host adapter 110 and the disk adapter 120.

In the pair information 500, the field of the pair state retains any one of states "normal", "abnormal", "unused", "uncopied", and "copying". An instance of the "normal" pair state indicates that data replication of the logical volume 230 is normally in progress. An instance of the "abnormal" pair state indicates that the logical volume 230 cannot be replicated due to failure. The failure in this case refers to, for example, a disconnection of the connection path 200, for example. An instance of the "unused" pair state indicates that the information corresponding to the pair number is invalid. An instance of the "copying in progress" pair state indicates that an initial copying process described below is in progressed. An instance of the "uncopied" pair state indicates that the below-described initial copying process is not yet processed. An instance of the "uncopied" pair state indicates that the below-described initial copying process is not yet executed.

In the pair information 500, the primary storage system number retains a number that specifies a primary storage system 100 retaining a primary logical volume 230. The secondary storage system number retains a number that specifies a secondary storage system 100 retaining a secondary logical volume 230. In the case of the primary storage system, the group number retains a group number to which the primary logical volume belongs. In the case of the secondary storage system, the group number retains a group number to which the secondary logical volume belongs. The copied address is described with the initial copying process described below. In FIG. 9, pair information of pair number indicates that the data replication target is a logical volume having the primary logical volume number 1 in the primary storage system A, the data replication destination is a logical volume having the secondary logical volume number 1 in the secondary storage system B, and data replication process is normally being executed.

FIGS. 9, 10, and 11 show, respectively, the pair information 500 of the primary storage system 100A, pair information 500 of secondary storage system 100B, pair information 500 of the secondary storage system 100C in the state shown in FIG. 1.

<Configuration of Group Information>

FIG. 12 shows an example of the group information 600 retained in the storage system 100. The group information 600 retains a group number, group state, pair set, journal logical volume number, update number, replication mode, destination storage system number, and destination group number. The group information 600 is stored into a memory, such as the shared memory 140, which is referenceable from the host adapter 110 and the disk adapter 120.

In the group information 600, the group state retains any one of "normal", "abnormal", "unused", "halt", and "waiting". In the case that the group state is "normal", the case indicates that at least one of the pairs states of the pair sets is "normal". In the case that the group state is "abnormal", the case indicates that all of the pair states of the pair sets are "abnormal". In the case that the group state is "unused", the case indicates that the information corresponding to the group number is not valid. In the case of the primary storage system, a "halt" group state indicates that journal creation is not performed for a time. This is used when the journal creation is desired to halt for a time during the "normal" group state. In the case of the sub-storage system, the "halt" group state indicates that journal read reception process is not executed for a time. This is used when the read of the journal is desired to halt for a time during the "normal" group state. A "waiting" group state indicates that a data-replication initiation process described below is in progress.

In the group information 600, in the case of the primary storage system, the pair set retains pair numbers of all primary logical volumes that belong to a group indicated by the group number. In the case of the secondary storage system, the pair set retains pair numbers of the all secondary logical volumes that belong to the group indicated by the group number. The journal logical volume number indicates a journal logical volume number that belongs to the group corresponding to the group number. In the case where no journal logical volume belonging to the group corresponding to the group number is present, an invalid value ("0", for example) is set. An initial value of the update number is "1", and the update number is altered in the event of journal creation. The update number is stored into the field of the update information 300 and is used to maintain the update sequence of data in the restore process 250 described below.

In the group information 600, the replication mode is information indicating the mode of data replication, and the field thereof retains "synchronization" or "asynchronization". An instance where the replication mode is "synchronization" indicates synchronous data replication, in which updating processes of a primary logical volume and a secondary logical volume are synchronously executed. Accordingly, there occurs a time in which data in the primary logical and data in the secondary logical volume are not completely consistent with each other (state in which the data in the secondary logical volume is older than the data in the primary logical volume), the data in the secondary logical volume is completely consistent with the data in the primary logical volume some time later, specifically, upon completion of update reflection.

In the group information 600, in the case of the primary storage system, the destination storage system number retains the secondary storage system number that retains the secondary logical volume of the pair belonging to the group. In the case of the secondary storage system, the destination storage system number retains the primary storage system number that retains the primary logical volume of the pair belonging to the group. In the case of the primary storage system, the destination group number retains the group number to which the secondary logical volume of the pair belonging to the group. In the case of the secondary storage system, the destination group number retains the group number to which the primary logical volume of the pair belonging to the group. For example, in FIG. 12, the group information 600 corresponding to the group number 1 is configured of the primary logical volumes having the primary logical volume numbers 1 and 2 and the journal logical volume having the journal logical volume number 4, and the synchronous data replication process is normally in progress.

FIGS. 12, 13, and 14 show, respectively, the group information 600 of the primary storage system 100A, group information 600 of secondary storage system 100B, group information 600 of the secondary storage system 100C in the state shown in FIG. 1.

<Configuration of Pointer Information>

FIG. 15 shows an example of the pointer information 700 retained in the storage system 100. FIG. 16 is a view for explaining the configuration of a journal logical volume corresponding to setting example of the pointer information 700 shown in FIG. 15. The FIG. 16 shows the information regarding the journal logical volume #4. The pointer information 700 is information for managing the journal logical volume in the group. The information retains an update information area first address, write data area first address, update information latest address, update information oldest address, write data latest address, write data oldest address, read initiation address, and retry initiation address.

In the pointer information 700, the update information area first address retains a first logical address of a storage area (update information area) that stores update information 300 of a journal logical volume. The write data area first address retains a first logical address of a storage area (write data area) to store write data in the journal logical volume. The update information latest address retains a first logical address to store update information 300 in the event of storing a subsequent journal. The update information oldest address retains a first logical address to store update information 300 of an oldest journal (with a low (small) update number). The write data latest address retains a first logical address to store write data in the event of storing the subsequent journal. The write data oldest address retains a first logical address to store an oldest journal (with a lowest update number). The read initiation address and the retry initiation address are used in a journal read reception process described below.

In an example of the pointer information 700 shown in FIGS. 15 and 16, the area (update information area) for storing journal update information 300 is allocated from a first position to the position of 699 in the storage area of the logical volume corresponding to the logical volume number 4 journal logical volume #4), and the area (write data area) for storing journal write data is allocated to range from the position of 700 to the position of 2699 in the storage area of the same logical volume as above. The journal update information 300 is stored into a field ranging from the position of 50 to the position of 249 in the storage area of the same logical volume, and update information 300 of a subsequent journal is to be stored into the field from the position of 250. The journal write data is stored in the field ranging from the position of 1300 to the position of 2199, and write data corresponding to the subsequent journal is to be stored into the position of 2200 in the storage area of the same logical volume.

FIGS. 15, 17, and 18 show, respectively, the pointer information 700 of the primary storage system 100A, pointer information 700 of secondary storage system 100B, pointer information 700 of the secondary storage system 100C in the state shown in FIG. 1.

Preferably, the above-described volume information 400, pair information 500, group information 600, and pointer information 700 are stored into the shared memory 140. However, without being limited by the above case, the above-described information may be concentrically or distributedly stored into the cache memories 130, host adapters 110, disk adapters 120, and storage devices 150.

In description below, although a patter is employed in which one journal logical volume is allocated to one group, a plurality of journals may be allocated to one group. An example is that two journal logical volumes are allocated to one group, pointer information 700 is provided in units of the journal logical volume, and journals are alternately stored thereinto. Thereby, writes of journals to the storage devices 150 can be distributed, so that performance enhancement can be expected. Further, the journal-read performance can be enhanced. Another example is that two journal logical volumes are allocated to one group, in which ordinarily only one of the journal logical volumes is used. The other journal logical volume is used in such an event that the functionality of the journal logical volume in use is deteriorated or the volume cannot be used due to occurrence of failure. An example case where the performance is deteriorated is a case where the storage area for journal logical volumes is configured of a plurality of storage devices 150, the data are retained in a RAID method, and one of the storage devices 150 constituting the RAID enters a failure state.

<Operation of Data Replication Initiation>

A procedure (data-replication initiation process) for initiating data replication from the primary storage system 100A to the secondary storage system 100B and the secondary storage system 100C will be described in (1) to (5) below with reference to FIGS. 19 and 20. FIG. 19 is a flowchart for explaining the procedure of initiating data replication.

(1) Group creation (step S1900) will be described hereunder. By using a maintenance terminal or the host computer 180, a user accesses and refers to the group information 600 in the primary storage system 100A to retrieve a group number A corresponding to the "unused" group state. Similarly, the user retrieves a group number B of the secondary storage system 100B. Then, the user makes group creation specification to the primary storage system 100A by using the maintenance terminal or the host computer 180. The group creation specification is comprised of an instruction-target group number A, a destination storage system number B, a destination group number B, and the replication mode "synchronization".

Upon receipt of the group creation specification, the primary storage system 100A alters the group information 600. Specifically, the primary storage system 100A alters the group state indicated in the group information 600 to "waiting", alters the destination storage system number in the information to the specified destination storage system number B, alters the destination group number in the information to the specified destination group number B, and alters the replication mode in the information to the specified replication mode "synchronization". The primary storage system 100A sets the update number in the group information 600 to "1" (initial value). Further, the primary storage system 100A makes group creation specification. The instruction-target group number in the group creation specification is set to the destination group number B, the destination storage system number in the instruction is set to the storage system number corresponding to the primary storage system 100A, the destination group number in the instruction is set to the instruction-target group number A, and the replication mode of the instruction is set to the replication mode "synchronization".

By using the maintenance terminal or the host computer 180, the user refers to the group information 600 in the primary storage system 100B to acquire a group number D corresponding to the "unused" group state.

Similarly, the user retrieves a group number C of the secondary storage system 100C. Then, the user makes group creation specification to the primary storage system 100B by using the maintenance terminal or the host computer 180. The group creation specification is comprised of the instruction-target group number D, destination storage system number C, destination group number C, and replication mode "asynchronization".

Upon receipt of the group creation specification, the secondary storage system 100B alters the group information 600. Specifically, the secondary storage system 100B alters the group state indicated in the group information 600 corresponding to the instruction-target group number D to "waiting", alters the destination storage system number in the information to the specified destination storage system number C, alters the destination group number in the information to the specified destination group number C, and alters the replication mode in the information to the specified replication mode "asynchronization". The secondary storage system 100B sets the update number in the group information 600 to "1" (initial value). Further, the secondary storage system 100B makes group creation specification. The instruction-target group number in the group creation specification is set to the destination storage system number C, the destination storage system number in the instruction is set to the storage system number corresponding to the secondary storage system 100B, the destination group number in the instruction is set to the instruction-target group number D, and the replication mode is set to the replication mode "asynchronization".

(2) Pair registration (S1910) will be described hereunder. By using the maintenance terminal or the host computer 180, the user specifies information indicating a synchronous data replication target and information indicating a data replication destination whereby to make pair creation specification to the primary storage system 100A. The information indicating the data replication targets indicates the group number A and primary logical volume A corresponding to the data replication target. The information indicating the data replication destination indicates the secondary logical volume number B in the secondary storage system 100B that is to store replication data.

Upon receipt of the pair creation specification, the primary storage system 100A retrieves a pair number corresponding to the "unused" pair state from the pair information 500, sets the pair state to "uncopied", sets the primary storage system number to the primary storage system number A indicating the primary storage system 100A, sets the primary logical volume number to the specified primary logical volume number A, sets the secondary storage system number to the destination storage system number corresponding to the group number A in the group information 600, sets the secondary logical volume number to the specified secondary logical volume number B, and set the group number to the specified group number A. Further, the primary storage system 100A adds the retrieved pair number to the pair set indicated in the group information 600 corresponding to the specified group number A, and alters the volume state corresponding to the primary logical volume number A to "primary".

The primary storage system 100A then notifies the primary storage system A indicating the primary storage system 100A, and the destination group number B, primary logical volume number A, and secondary logical volume number B indicated in the group information 600 corresponding to the group number A to the destination storage system indicated in the group information 600 corresponding to the specified group number A, thereby making instruction for pair registration. The secondary storage system 100B retrieves an "unused" pair number from the pair information 500, sets the pair state to "uncopied", sets the primary storage system number to the notified primary storage system number A, sets the primary storage system number to the notified primary logical volume number A, sets the secondary storage system number to the secondary storage system number B, sets the secondary logical volume number B to the notified secondary logical volume number B, and the group number is set to the notified group number B. Further, the secondary storage system 100B adds the retrieved pair number to the pair set indicated in the group information 600 corresponding to the specified group number B, and alters the volume state corresponding to the secondary logical volume number B to "secondary".

Subsequently, by using the maintenance terminal or the host computer 180, the user specifies information indicating an asynchronous data replication target and information indicating a data replication object whereby to make pair creation specification to the secondary storage system 100B. The information indicating the data replication target indicates the group number D and logical volume number B corresponding to the data replication object. The information indicating the data replication target indicates the group number C in the secondary storage system 100C that is to store replication data.

Upon receipt of the pair creation specification, the primary storage system 100B retrieves an "unused" pair number from the pair information 500, sets the pair state to "normal", sets the primary storage system number to the specified storage system number B indicating the secondary storage system 100B, sets the logical storage system number to the specified logical volume number B, sets the secondary storage system number to the destination storage system number corresponding to the group number D in the group information 600, sets the secondary logical volume number to the specified secondary logical volume number C, and sets the group number to the specified group number D. Further, the secondary storage system 100B adds the retrieved pair number to the pair set indicated in the group information 600 corresponding to the specified group number D, and alters the volume state corresponding to the logical volume number B from "secondary" to "primary/secondary".

In addition, the secondary storage system 100B notifies the primary storage system B indicating the secondary storage system 100B, and the destination group number C, primary logical volume number B, and secondary logical volume number C indicated in the group information 600 corresponding to the group number D to the destination storage system indicated in the group information 600 corresponding to the specified group number D, thereby making instruction for pair registration. The secondary storage system 100C retrieves an "unused" pair number from the pair information 500, sets the pair state to "normal", sets the primary storage system number to the notified primary storage system number B, sets the primary logical volume number to the notified storage system number B, sets the secondary storage system number to the secondary storage system number C, the secondary logical volume number to the notified secondary logical volume number C, and the group number to the notified group number D. Further, the secondary storage system 100C adds the retrieved pair number to the pair set indicated in the group information 600 corresponding to the specified group number C, and alters the volume state corresponding to the secondary logical volume number C to "secondary".

The above-described operation is performed for all data replication target pairs. In the above, while description has been made regarding the process in which the registration of the logical volumes to the group is executed synchronous with the setting of the logical volume pair, the registration and the setting may be executed independently of each other.

(3) Journal-logical-volume registration (S1920) will be described hereunder. By using the maintenance terminal or the host computer 180, the user makes to the primary storage system 100A instruction journal-logical-volume registration instruction) for registering a journal logical volume to a group. The journal-logical-volume registration instruction is comprised of the group number and the logical volume number.

The primary storage system 100A registers the specified logical volume number to the journal logical volume number indicated in the group information 600 corresponding to the specified group number. Further, the primary storage system 100A sets the volume state in the volume information 400 of the logical volume to "normal".

Similarly, the journal logical volume is registered also to the group of secondary storage systems 100B. By using the maintenance terminal or the host computer 180, the user refers to the volume information 400 corresponding to the secondary storage systems 100B, the user specifies the secondary storage system 100B, the group number B, and the logical volume number to be used as the journal logical volume whereby to execute journal-logical-volume registration into the primary storage system 100A. The primary storage system 100A transfers the journal-logical-volume registration instruction to the secondary storage system 100B. The secondary storage system 100B registers the specified logical volume number to the journal logical volume number in the group information 600. Further, the secondary storage system 100B sets the volume state in the volume information 400 to "normal".

The user may make the journal-logical-volume registration instruction to the secondary storage system 100B in the manner that the maintenance terminal of the secondary storage system or the host computer 180 (180B) coupled to the secondary storage system 100B is used to specify the group number and the logical volume number to be used as the journal logical volume.

Similarly, the journal logical volume is registered also to the group of secondary storage systems 100C. The above-described operation is performed for the all logical volumes that are to be used as journal logical volumes. Steps S1910 and S1920 may be reversed.

(4) Data-replication initiation process (S1930) will be described hereunder. By using the maintenance terminal or the host computer 180, the user specifies the group number D for which the asynchronous data replication process and thereby makes instruction to the secondary storage system 100B for initiating the asynchronous data replication process. The secondary storage system 100B makes to the secondary storage system 100C, which is the destination storage system indicated in the group information 600 corresponding to the group number D, specification for altering the group state of the destination group number indicated in the group information 600 corresponding to the group number C to "normal", and an instruction for initiating the journal read process 240 and restore process 250 described below.

Subsequently, by using the maintenance terminal or the host computer 180, the user specifies the group number A for which the synchronous data replication process whereby to make specification for initiating the data replication process to the primary storage system 100A. The primary storage system 100A sets all copied addresses belonging to the group A in the pair information 500 to "0". The primary storage system 100A makes to the secondary storage system 100B, which is the destination storage system indicated in the group information 600 corresponding to the group number A, specification for altering the group state of the destination group number indicated in the group information 600 corresponding to the group number B to "normal". The primary storage system 100A alters the group state in the group information 600 corresponding to the group number A to "normal", and then initiates the initial copying process described below.

(5) Processing to be executed after the initial copying process (S1940) will be described hereunder. Upon completion of the initial copying process, the primary storage system 100A notifies the secondary storage system 100B of the completion of the initial copying process. The secondary storage system 100B sets the pair states of the all secondary logical volumes belonging to the group number B to "normal".

<Operation of Data Replication Initiation>

FIG. 20 is a flowchart regarding the procedure of the initial replication process. The initial copying process creates the journal in units of a unit size in a field sequentially from the first position by using the copied address in the pair information 500 for each of the storage areas of primary logical volumes specified as synchronous replication targets. The copied address is set to the initial value "0" and adds the amount of created data each time the journal is created. In the initial copying process, journals are already created in the storage area from the first position to the position immediately before the copied address. Executing the initial copying process enables unupdated data in the primary logical volume to be transferred to the secondary logical volume. While description is provided below with reference to the case where a host adapter A in the primary storage system 100A executes the process, the disk adapter 120 may be used to execute the process. The operation will be described in (1) to (5) below.

(1) The host adapter A in the primary storage system 100A retrieves a primary logical volume A that constitute a pair that belongs to the group A for process-target synchronous data replication and that is in the "uncopied" pair state, and alters the pair state to "copying in progress", whereby processing described below is iterated (steps S2010 and S2020). If no primary logical volume A is present, the process terminates (S2030).

(2) If upon the determination at S2020 a primary storage system A is present, the host adapter executes journal creation for target data in a unit size (1 MB, for example). The journal creation (S2040) will be described below.

(3) To update data in a synchronization-paired secondary logical volume of the primary logical volume A, the host adapter A transmits a remote write instruction to the storage system B (100B) retaining the synchronization-pair secondary logical volume. The remote write instruction includes a write instruction, a logical address (logical volume=secondary storage system B corresponding to the synchronization pair number; intra-logical volume position=copied address), a data amount (unit size), and an update number used in S2040. The update number may be substituted by the time at which the journal has been created (S2045). Operation of the secondary storage system B (100B) when the remote write instruction has been received will be described below together with the instruction reception process 210.

(4) After receipt of a response to the remote write instruction, the host adapter A adds the data size of the journal created in the area of the copied address (S2050).

(5) The processing described above is iterated until the copied address reaches the storage capacity of the primary storage system A (S2060). If the copied address has reached the level equal to the storage capacity of the primary storage system A, the pair state is updated to "normal", and processing of another primary logical volume is initiated (S2070).

According to the processing flow described above, while target logical volumes are processed one by one, a plurality of target logical volumes may be processed at the same time.

<Operation of Instruction Reception Process>

FIG. 21 is a view for explaining the instruction reception process 210. FIG. 22 is a flowchart of the instruction reception process 210. FIG. 23 is a flowchart of a journal creation process. FIG. 24 is a flowchart of a remote write instruction reception process. FIG. 25 is a flowchart of a journal replication process. FIG. 26 is a view for explaining a remote write instruction reception process. By using these drawings, a description will be made in (1) to (7) below regarding operation in the event that the primary storage system 100A has received from the host computer 180 a write instruction issued to a data-replication-target logical volume 230.

(1) The host adapter A in the primary storage system 100A receives an access instruction from the host computer 180. The access instruction includes, for example, a instruction such as a read, write, or a journal-read instruction described below; a instruction-target logical address; and a data amount. Hereafter, the logical address in the access instruction will be referred to as a "logical address A", the logical volume will be referred to as a "logical volume A", the intra-logical volume position will be referred to as an "intra-logical volume position A", and the data amount will be referred to as a "data amount A" (step S2200 in FIG. 22).

(2) The host adapter A determines the access instruction (S2210, S2215, and S2225). If upon the determination at S2215 the access instruction is a journal read instruction, the operation executes the below-described journal read reception process (S2900). If the access instruction is a remote write instruction, the operation executes the remote write instruction reception process described below (S2400). If the access instruction is another different instruction, such as a read instruction, the system executes a conventional read process (S2230).

(3) If upon the determination at S2210 the access instruction is a write instruction, the system accesses and refers to the volume information 400 of the logical volume A, and checks to determine the volume state thereof (S2240). If upon the determination at S2240 the volume state of the logical volume A is other than "normal" or "primary", the logical volume A cannot be accessed, so that the system posts a notification of abnormal termination to the host computer 180 (S2245).

(4) If upon the determination at S2240 the volume state of the logical volume A is "normal" or "primary", the host adapter A reserves a cache memory 130 and sends to the host computer 180 a notification that the system is ready for data reception. Upon receipt of the notification, the host computer 180 transmits write data to the primary storage system 100A. The primary storage system 100A receives the write data and stores the data into the cache memory 130 (S2250; 2100 in FIG. 21).

(5) The host adapter A accesses and refers to the volume information 400, pair information 500, and group information 600, and consults them to determine whether the logical volume A is a synchronous-data replication target (S2260). If upon the determination at S2260 the volume state of the logical volume A is "primary", the pair state of the paired storage volume corresponding to the synchronization pair number of the logical volume A is "normal", and the group state of a group to which the pair belongs is "normal", the journal creation process described below is executed (S2300).

(6) In the event that the result of the journal creation process is unsuccessful and journal creation is unnecessary, the host adapter A transmits a remote write instruction for storing the write data, which has been received from the host computer 180, to the secondary storage system 100 of the pair corresponding to the synchronization pair number (2180 and 2185 in FIG. 21). The remote write instruction includes a write instruction, logical address (logical volume number=secondary logical volume B of the pair corresponding to the synchronization pair number; intra-logical volume position=intra-logical volume position A), data amount A, and an update number used in S2300. The update number may be substituted by the time at which the write instruction has been received from the host computer 180. In the event that the journal creation process at S2300 is unsuccessful, the update number is set to the numeric value "0" indicative of invalidity.

(7) After receipt of a response to S2260 or the remote write instruction in S2265, the host adapter A instructs the disk adapter 120 to write the write data into the storage area of the storage device 150 corresponding to the logical address A (2160 in FIG. 21), and then posts a termination notification to the host computer 180 (S2270 and S2280). Thereafter, the disk adapter 120 executes the read/write process and thereby stores the write data into the storage area (2170 in FIG. 21).

<Operation of Journal Creation Process>

The journal creation process (S2500) will be described hereunder (FIG. 23).

(1) The host adapter A checks the volume state indicated in the journal logical volume (step S2310). If at S2310 the volume state of the journal logical volume is "abnormal", the journal cannot be stored in the journal logical volume, so that the group state is altered to "abnormal", and the process terminates (S2315). In this event, processing such as alteration of the journal logical volume to a normal logical volume is executed.

(2) If upon the determination at S2310 the journal logical volume is normal, the system continues the journal creation process. The journal creation process is different depending on whether the process is executed in the initial copying process or in the instruction reception process (S2320). If the journal creation process is executed in the instruction reception process, the steps from S2330 is executed. If the journal creation process are executed in the initial copying process, the steps from S2370 are executed.

(3) In the event that the journal creation process is executed in the instruction reception process, the host adapter A checks to determine whether the write-target logical address A is a process target of the initial copying process (S2330). If the pair state of the logical volume A is "uncopied", the journal creation process is executed later in the initial copying process, so that the journal creation process is unnecessary and is terminated without creating the journal (S2335). If the pair state of the logical volume A is "copying in progress", when the copied address is lower than or equal to the intra-logical-address position A, the journal creation process is executed later in the initial copying process, so that the journal creation process is unnecessary and is terminated without creating the journal (S2335). In a other than the above, specifically, in a case where that the pair state of the logical volume A is "copying in progress", and concurrently, where the copied address is higher than the intra-logical-address position A or the pair state of the logical volume A is "normal", the initial copying process is already completed, so that the journal creation process is continued.

(4) Subsequently, the host adapter A checks to determine whether the journal can be stored in the journal logical volume. By using the pointer information 700, the host adapter A checks to determine whether a free area is present or absent in the update information area (S2340). In event that the update information latest address and update information oldest address indicated in the pointer information 700 are equal to each other, no free area is present in the update information area, so that the process determines the event to be a journal creation failure and hence terminates (S2390).

If upon the determination at S2340 the free area is present in the update information area, the host adapter A uses the pointer information 700 to check whether the write data can be stored into the write data area (S2345).

In an event that the write data oldest address falls within a range of a numeric value obtained by adding the data amount A to the write data latest address, the write data cannot be stored in the write data area, so that the process determines the event to be a journal creation failure and hence terminates (S2390).

(5) In the event the journal can be stored, the host adapter A retrieves logical addresses for storing the update number and the update information 300 and a logical address for storing the write data, and creates the update information 300 in the cache memory 130. The update number is retrieved from the group information 600 corresponding to the target group, and the update number in the group information 600 is set to the numeric value added with "1". The logical address for storing the update information 300 is the update information latest address indicated in the pointer information 700, so that the update information latest address in the pointer information 700 is set to the numeric value added with the sized of the update information 300.

The logical address for storing the write data is the write data latest address in the pointer information 700, so that the write data latest address in the pointer information 700 is set to a numeric value obtained by adding the data amount A to the write data latest address.

The host adapter A sets in the update information 300 the numeric values retrieved as described above, the group number, the time (update time) when the write instruction was received, the logical address A in the write instruction, and the data amount A (S2350; 2120 in FIG. 21). For instance, update information 300 shown in FIG. 27 is created in the event that a write instruction for a data size of 100 is received at the position of 800 from the first position of the storage area of the primary logical volume #1 belonging to the group 1 (logical volume corresponding to the logical volume number 1) in the state of the group information 600 shown in FIG. 12 and the pointer information 700 shown in FIG. 15. In this case, the update number in the group information 600 is set to "6", the update information latest address in the 700 is set to "300" (the size of the update information 300 is set to "50"), and the write data latest address is set to "2300".

(6) The host adapter A instructs the disk adapter 120 to write the update information 300 and the write data into the storage device 150, and the process normally terminates (S2360; 2130, 2140, and 2150 in FIG. 21).

(7) In the case where the journal creation process is executed in the initial copying process, the steps from S2370 are executed. The host adapter A checks to determine whether the journal can be created. That is, by using the pointer information 700, the host adapter A performs checks for the presence or absence of a free area in the update information area by using the pointer information 700 (S2370). In event that the update information latest address indicated and update information oldest address indicated in the pointer information 700 are equal to each other, no free area is present in the update information area, so that the process determines the event to be a journal creation failure and hence terminates (S2390). In the case of the initial copying process disclosed in the present embodiment, the write data for the journal is read from the primary logical volume, and no write data area is used, so that verification for a free area in the write data area is not necessary.

(8) If upon the determination at S2370 the journal can be created, the host adapter A creates update information 300 in the cache memory 130. The time (update time) at which the write instruction for the update information 300 was received is set to the time at which the update number has been retrieved. The group number is set to the group number to which the synchronization pair number of the logical volume belongs. The update number is retrieved from the group information 600, and the update number in the group information 600 is set to the numeric value added with "1". The logical address of the journal logical volume into which the logical address in the write instruction and the write data are stored is set to the logical address (copied address in the pair information 500) corresponding to the initial copying process target. The size of the write data is set to the unit size in the initial copying process. The logical address for storing the update information 300 corresponds to the position of the update information latest address in the pointer information 700, and the update information latest address in the pointer information 700 is set to the numeric value added with the size of the update information 300 (S2380; 2120 in FIG. 21).

(9) The host adapter A instructs the disk adapter 120 to write the update information 300 into the storage device 150, and the process normally terminates (S2385; 2140 and 2150 in FIG. 21).

In the above, while description has been made with reference to the case where the update information 300 is present in the cache memory 130, the update information 300 may be stored in the shared memory 140 and the like.

The write data need not be written asynchronous, that is, immediately after S2360 and S2385. However, in the event that the host computer 180 again makes the write instruction to the logical volume A whereby the journal write data retained in the cache memory 130 is overwritten, write data needs to be written into the storage device 150 before the write data is received from the host computer 180. Alternatively, the processing may be arranged such that the write data is saved in another cache memory, the position of the saved cache memory is stored into the update information 300, and the write data is written later into the storage device 150 corresponding to the logical address for the journal logical volume indicated in the update information 300.

In the journal creation process described above, the journal is stored into the storage device 150. However, the process may be arranged such that a predetermined amount of journal-dedicated cache memory 130 is preliminarily provided, and the journal is stored into the storage device 150 after the cache memory has all been used up. The size of the journal-dedicated cache memory is specified from the maintenance terminal, for example.

<Operation of Remote Write Instruction Reception Process>

A description will now be made below regarding a process (remote write remote write instruction reception process) in the event that a host adapter B in the secondary storage system 100B has received a remote write instruction from the primary storage system 100A (FIG. 24). The remote write instruction includes a write instruction, a logical address (logical volume B; intra-logical volume position A), a data amount A, and an update number.

(1) The host adapter B in the secondary storage system 100B accesses and refers to the volume information 400 corresponding to the secondary storage system B, and perform checks for the volume state of the secondary storage system B (step S2410). If upon the determination at S2410 the volume state of the secondary storage system B is other than "secondary" or "primary/secondary", the secondary storage system B cannot be accessed, so that the primary storage system A posts a notification of abnormal termination to the primary storage system A (S2415).

(2) If upon the determination at S2410 the volume state of the logical volume B is "secondary" or "primary/secondary", the host adapter B reserves a cache memory 130 and sends to the host computer 180 a notification that the system is ready for data reception. Upon receipt of the notification, the primary storage system 100A transmits write data to the secondary storage system 100B. The secondary storage system 100B receives the write data and stores the data into the cache memory 130 (S2420; 2610 in FIG. 26).

(3) The host adapter B checks the update number included in the remote write instruction. If the update number is the invalid value "0", the journal is not created in the primary storage system 100A, so that a journal replication process to be executed at S2500 is not executed (S2430).

(4) The host adapter B checks the update number included in the remote write instruction. If the update number is a valid number (other than "0"), the host adapter B checks the volume state of the journal logical volume. If the volume state of the journal logical volume is "abnormal", the journal cannot be stored into the journal logical volume, so that the journal replication process to be executed at S2500 is not executed (S2440).

(5) If upon the determination at S2440 the volume state of the journal logical volume is "normal", the journal replication process (S2500) described below is executed.

(6) The host adapter B instructs the disk adapter 120 to write the write data into the storage area of the storage device 150 corresponding to the logical address included in the remote write instruction, and then posts a termination notification to the primary storage system A (100A) (S2460 and S2470; 2650 in FIG. 26). Thereafter, the disk adapter 120 executes the read/write process and thereby stores the write data into the storage area (2660 in FIG. 26).

<Operation of Journal Replication Process>

The journal replication process (S2500) will now be described hereunder (FIG. 25).

(1) The host adapter B checks whether the journal can be stored in the journal logical volume. By using the pointer information 700, the host adapter B checks to determine whether a free area is present or absent in the update information area (S2510). In event that the update information latest address and update information oldest address indicated in the pointer information 700 are equal to each other, no free area is present in the update information area, so that the process frees the storage area for the oldest journal and reserves an update information area (S2515). Then, by using the pointer information 700, the host adapter B checks to determine whether the write data can be stored into in the write data area (S2520). In the event that the write data oldest address is present in the range between the write data latest address and a numeric value obtained by adding the data amount A to the write data latest address, the write data cannot be stored in the write data area, so that the storage area for the journal is freed from the oldest journal to enable the write data to be stored (S2525).

(2) The host adapter B creates update information 300 in the cache memory 130. The write-instruction received time (update time) in the update information 300 is set to the update time included in the remote write instruction. The group number is set to the group number to which the paired logical volume corresponding to the synchronization pair number of the logical volume B belongs. The update number is set to the update number in the remote write instruction. The logical address in the write instruction is set to the logical address included in the remote write instruction. The data size of the write data is set to the data amount A included in the remote write instruction. The logical address for the journal logical volume having stored the write data is the write data latest address indicated in the pointer information 700, so that the write data latest address in the pointer information 700 is set to the numeric value obtained by adding the size of the write data to the write data latest address. The logical address for storing the update information 300 is the update information latest address indicated in the pointer information 700, so that the update information latest address in the pointer information 700 is set to the numeric value added with the size of the update information 300 (S2530; 2620 in FIG. 26).

(3) The host adapter B instructs the disk adapter 120 to write the update information 300 and the write data into the storage device 150, and terminates the process as having accomplished successful journal creation (S2540; 2630 in FIG. 26). Thereafter, by the read/write process 220, the disk adapter 120 writes the update information 300 and the write data into the storage device 150, and frees the cache memory 130 (2640 and .2660 in FIG. 26).

As described above, according to the data processing system of the present embodiment, the secondary storage system 100B frees the storage area for the old journal to constantly retain plurality of renewed journals.

The read/write process 220 is a process that the disk adapter 120 executes in the manner that the disk adapter 120 receives the instruction from the host adapter 110 or the disk adapter 120. Processing to be executed includes write processing and read processing such as the write processing writes data in a specified cache memory 130 into the storage area in a storage device 150 corresponding to a specified logical address; and the read processing reads data to a specified cache memory 130 from a storage area in a storage device 150 corresponding to a specified logical address.

<Operation of Journal Read Reception Process>

FIG. 28 is a view for explaining operation journal read reception process) of the logical volume B in the secondary storage system 100B that has received a journal read instruction; and FIG. 29 is a flowchart corresponding thereto. By using these drawings, the operation in the event where the secondary storage system 100B received the journal read instruction from the secondary storage system 100C will be described in (1) to (8) below.

(1) The host adapter B in the secondary storage system 100B receives an access instruction from the secondary storage system 100C. The access instruction includes an identifier indicating that the instruction is the journal read instruction; a instruction-target group number; and the information of presence or absence of a retry specification. Hereafter, the group number in the access instruction will be referred to as a "group number D" (step S2900; 2810 in FIG. 28).

(2) The host adapter B executes checks to determine whether the volume state corresponding to the group number D is "normal" (S2910). If upon the determination at S2910 the volume state is other than "normal", for example, "abnormal", the host adapter B notifies the secondary storage system 100C of the group state and then terminates the process. In response to the received information of the group state, the secondary storage system 100C executes processing. For example, if the group state is "abnormal", the secondary storage system 100C terminates the journal read process (S2915).

(3) If upon the determination at S2910 the volume state corresponding to the group number D is "normal", the host adapter B checks to determine the state of the journal logical volume (S2920). If upon the determination at S2920 the volume state of the journal logical volume is not "normal", for example, if the state is "abnormal", the host adapter B alters the group state to "abnormal", and notifies the secondary storage system 100C of the group state, and terminates the process. The secondary storage system 100C performs the processing in accordance with the received group state. For example, in the event of "abnormal of the group state", the journal read process is terminated (S2925).

(4) If upon the determination at S2920 the group state of the journal logical volume is "normal", the host adapter B checks to determine whether the journal read instruction is a retry specification (S2930).

(5) If upon the determination at S2930 the journal read instruction is a retry specification, the host adapter B retransmits to the secondary storage system 100C a journal previously transmitted. The host adapter B reserves a cache memory 130 and instructs the disk adapter 120 to transmit to the cache memory the information of the size of update information 300 to be stored therein from the read initiation address indicated in the pointer information 700 (S2820 in FIG. 28).

The read/write process 220 by the disk adapter reads the update information 300 from the storage device 150, stores it into the cache memory 130, and posts a notification to the host adapter B (2830 in FIG. 28).

Upon receipt of the completion notice of reading the update information 300, the host adapter B retrieves the logical address in the write data and the size of the write data from the update information 300, reserves a cache memory 130, and instructs the disk adapter 120 to read the write data to the cache memory (S2940; 2840 in FIG. 28).

The read/write process 220 by the disk adapter reads the write data from the storage device 150, stores it into the cache memory 130, and posts a notification to the host adapter B (2850 in FIG. 28).

Upon receipt of the completion notice of reading the write data, the host adapter B transmits the update information 300 and the write data to the secondary storage system 100C, frees the cache memory 130 retaining the journal, and terminates the process (S2945; 2860 in FIG. 28).

(6) If upon the determination at S2930 the instruction is determined not to be a retry specification, the host adapter B checks to determine whether no journal remaining untransmitted is present. If present, the host adapter B transmits the journal to the secondary storage system 100C. The host adapter B performs a comparison between the read initiation address and update information latest address indicated in the pointer information 700 (S2950).

If the read initiation address and the update information latest address are equal to each other, the all journals have been transmitted to the secondary storage system 100C. As such, the host adapter B transmits a "no remaining journal" response to the secondary storage system 100C (S2960), and then executes the process of freeing the storage area of the journal transmitted to the secondary storage system 100C in the event of the previous journal read instruction (S2990).

The process of freeing the storage area for the journal sets the update information oldest address indicated in the pointer information 700 to the retry initiation address. When the update information oldest address has reached the write data area first address, the update information oldest address is set to "0". The write data oldest address in the pointer information 700 is altered to the numeric value added with the size of the write data transmitted in response to the previous journal read instruction. When the write data oldest address has reached a logical address higher (i.e., with a number greater) than or equal to the size of the journal logical volume, the write data area first address is reduced and thereby corrected.

(7) If upon the determination at S2950 an untransmitted journal is present, the host adapter B reserves a cache memory 130, and instructs the disk adapter 120 to read the information of the size of the update information 300 from the read initiation address indicated in the pointer information 700 (S2820 in FIG. 28).

The read/write process 220 by the disk adapter reads the update information 300 from the storage device 150, stores it into the cache memory 130, and posts a notification to the host adapter B (2830 in FIG. 28).

Upon receipt of the completion notice of reading the update information 300, the host adapter B retrieves the logical address for the write data and the size of the write data from the update information 300, reserves a cache memory 130, and instructs the disk adapter 120 to read the write data to the cache memory (S2970; 2840 in FIG. 28).

The read/write process 220 by the disk adapter reads the write data from the storage device 150, stores it into the cache memory 130, and posts a notification to the host adapter B (2850 in FIG. 28).

Upon receipt of the notification regarding the completion notice of reading the write data, the host adapter B transmits the update information 300 and the write data to the secondary storage system 100C (S2980), and frees the cache memory 130 retaining the journal (S2860 in FIG. 28). Then, the retry initiation address indicated in the pointer information 700 is set to the read initiation address, and the read initiation address is set to a numeric value obtained by adding the size of the transmitted update information 300.

(8) The host adapter B frees the storage area for the journal transmitted to the secondary storage system 100C in the event of the previous journal read instruction (S2990).

In the journal read reception process described above, while the host adapter B transmits journals one by one to the secondary storage system 100C, a plurality of journals may be transmitted at the same time to the secondary storage system 100C. The number of journals to be transmitted in response to one journal read instruction may be set by the secondary storage system 100C to be included in the journal read instruction, but it may be set by the user for the secondary storage system 100B and the secondary storage system 100C in the event of group registration, for example. Alternatively, the number of journals to be transmitted in response to one journal read instruction may be dynamically altered corresponding to, for example, the transfer capability of or loads imposed on each of the connection paths 200 in the secondary storage systems 100B and 100C. Still alternatively, the transfer amount of journals may be specified by taking into consideration the size of journal write data in lieu of the number of journals.

In the journal read reception process described above, although the journal is read into the cache memory 130 from the storage device 150, the process is not necessary when the journal is present in the cache memory 130.

The freeing process for the storage area for the journal to be executed in the journal read reception process is executed at the time of processing of the journal read instruction, not in the subsequent retry specification. However, the storage area may be freed immediately after the transmission of the journal to the secondary storage system 100C.

Alternatively, the process may be arranged such that the secondary storage system 100C inputs a specification of an update number of a freeable journal into the journal read instruction, and the secondary storage system 100B frees the storage area for the journal in accordance with the specification.

<Operation of Journal Read Process>

FIG. 30 is a view for explaining the journal read process 240, and FIG. 31 is a flowchart thereof. FIG. 32 shows a flowchart of the journal store lo process (S3200). By using these drawings, a description will be made in (1) to (6) below regarding the operation in which the host adapter C in the secondary storage system 100C reads the journal from the secondary storage system 100B, and stores the journal into the journal logical volume.

(1) In the event that the group state is "normal" and the replication mode is "asynchronization", the host adapter C in the secondary storage system 100C reserves a cache memory 130. Concurrently, the host adapter C transmits to the secondary storage system 100B an access instruction containing an identifier indicating that the instruction is the journal read instruction; a instruction-target group number corresponding to the secondary storage system 100B; and the information presence or absence of a retry specification. Hereafter, the group number in the access instruction will be referred to as a "group number C" (step S3100; 3010 in FIG. 30).

(2) The host adapter C receives a response and a journal from the secondary storage system 100B (3020 in FIG. 30). The host adapter C checks the response. If the response indicates "no remaining journal", no journal corresponding to the specified group is present in the secondary storage system 100B, so that the host adapter C transmits the journal read instruction to the secondary storage system 100B (S3120 and S3125).

(3) If the response of the secondary storage system 100B indicates "group state is abnormal" or "group state is unused", the group state of the secondary storage system 100C is altered to the group state indicated in the received response, and the journal read reception process is terminated (S3130 and S3135).

(4) If the response of the secondary storage system 100B is other than the above, that is, if the response indicates normal termination, the volume state of the journal logical volume is checked (S3140). If the volume state of the journal logical volume is "abnormal", the journal cannot be stored into the journal logical volume. Accordingly, the group state is altered to "abnormal", and the process is terminated (S3145). In this case, processing such as alteration of the journal logical volume to a normal logical volume is executed, and the state of the group is returned to the normal state.

(5) If upon the determination at S3140 the volume state of the journal logical volume is "normal", a journal store process (S3200) described below is executed. When the journal store process has normally terminated (S3150-Yes), a subsequent journal read instruction is transmitted. Alternatively, a subsequent journal read instruction is transmitted after passage of a predetermined time (S3100). Timing of transmitting the subsequent journal read instruction may be timing of periodically transmitting the journal at a predetermined time interval. Alternatively, the timing may be determined corresponding to the number of received journals, a communication amount in the connection path 200, the storage size for journals retained in the secondary storage system 100C, and loads in the secondary storage system 100C, for example. Still alternatively, the timing may be determined in accordance with the numeric value obtained by reading from the secondary storage system 100C the storage size for journals retained in the secondary storage system 100B or the pointer information 700 corresponding to the secondary storage system 100B. Transfer of the above-described information may be executed by using a dedicated instruction or by including a specification in the response to the journal read instruction. Subsequent processings are the same as those at and after S3100.

(6) If upon the determination at S3200 the journal store process does not normally terminate (S3150-No), a free area in the journal logical volume is insufficient, so that the received journal is discarded, and a journal read instruction with a retry specification is transmitted after passage of a predetermined time (S3155). Alternatively, the journal is preserved in the cache memory 130, the journal store process is again tried after passage of a predetermined time. This is because the free area can increase in the journal logical volume in a predetermined time after the execution of the restore process 250 described below. This method obviates the need to input the presence or absence of the retry specification to the journal read instruction.

<Operation of Journal Store Process>

The journal store process (S3200) will be described hereunder (FIG. 32).

(1) The host adapter C checks whether the journal can be stored in the journal logical volume. Using the pointer information 700, the host adapter C checks to determine whether a free area is present or absent in the update information area (step S3210). In event that the update information latest address and update information oldest address indicated in the pointer information 700 are equal to each other, no free area is present in the update information area, so that the host adapter C terminates the process as having caused a journal creation failure (S3220).

(2) If upon the determination at S3210 a free area is present, the host adapter C uses the pointer information 700 and checks whether the write data can be stored in the write data area (S3230). Suppose that the write data oldest address is present in the range between the write data latest address and a numeric value obtained by adding the data amount A to the write data latest address. In this case, the write data cannot be stored in the write data area, so that the process terminates as having caused a journal creation failure (S3220).

(3) In the event the journal can be stored, the host adapter C alters the group number corresponding to the received update information 300 and the logical address in the journal logical volume storing the write data. The host adapter C alters the group number to the group number corresponding to the secondary storage system 100C, and alters the logical address in the journal logical volume to the write data latest address indicated in the pointer information 700. Further, the host adapter C alters the update information latest address in the pointer information 700 to the numeric value obtained by adding the size of the update information 300 to the update information latest address in the pointer information 700, and alters the write data latest address to the numeric value obtained by adding the size of the write data to the write data latest address. Furthermore, the host adapter C alters the update number in the group information 600 to the update number in the received update information 300 (S3240).

(4) The host adapter C instructs the disk adapter 120 to write the update information 300 and the write data into the storage device 150, and terminates the process as having accomplished successful journal creation (S3250; 3030 in FIG. 30). Thereafter, by executing the read/write process 220, the disk adapter 120 writes the write data into the storage device 150, and frees the cache memory 130 (S3040 in FIG. 30).

The journal store process stores the journal into the storage device 150, as described above. However, the process may be arranged such that a predetermined size of a journal-dedicated cache memory 130 is preliminarily allocated, and the journal is stored into the storage device 150 after the cache memory has been used overall. In this case, the size of the journal-dedicated cache memory is specified from the maintenance terminal, for example.

<Operation of Restore Process>

FIG. 33 is a view for explaining the restore process 250, and FIG. 34 is a flowchart thereof. By using these drawings, a description will be made in (1) to (6) regarding operation that the host adapter C in the secondary storage system 100C executes by way of the restore process 250 to update data by using the journal. The restore process 250 may be executed by the disk adapter 120 in the secondary storage system 100C.

(1) The host adapter C checks to determine whether the group state corresponding to the group number C is "normal" or "halt" (step S3410). If upon the determination at S3410 the group state is other than "normal" or "halt", for example, "abnormal", the restore process terminates (S3415).

(2) If upon the determination at S3410 the group state is "normal" or "halt", the host adapter C then checks the volume state of the journal logical volume (S3420). If upon the determination at S3420 the volume state of the journal logical volume is "abnormal", the volume cannot be accessed, so that the host adapter C alters the group state to "abnormal" and terminates the process (S3425).

(3) If upon the determination at S3420 the volume state of the journal logical volume is "normal", the host adapter C then checks whether a restore-process target journal is present. The host adapter C retrieves the update information oldest address and update information latest address in the pointer information 700. If the update information oldest address and the update information latest address are equal to each other, no journal is present, so that the restore process once terminates and resumes after passage of a predetermined time (S3430).

(4) If upon the determination at S3430 a restore-process target journal is present, processing described hereinbelow will be executed for a journal having an oldest (lowest (smallest)) update number. The update information 300 in the journal having the oldest (lowest (smallest)) update number is stored in the storage area from the update information oldest address indicated in the pointer information 700. The host adapter C reserves a cache memory 130, and then instructs the disk adapter 120 to read from the update information oldest address into the cache memory 130 the information of the size of the update information 300 (3310 in FIG. 33).

The read/write process 220 by the disk adapter 120 reads the update information 300 from the storage device 150, stores it into the cache memory 130, and notifies the host adapter C of the completion (S3320 in FIG. 33).

Upon receipt of the completion notice of reading the update information 300, the host adapter C retrieves the logical address for the write data and the information of the size of the write data from the update information 300, reserves the cache memory 130, and then instructs the disk adapter 120 to read the write data into the cache memory 130 (S3330 in FIG. 33).

The read/write process 220 by the disk adapter 120 thus reads the write data from the storage device 150 into the cache memory 130, and posts a notification to the host adapter. (S3440 in FIG. 33)

(5) The host adapter C retrieves from the update information 300 the logical address of the to-be-updated secondary logical volume, and then instructs the disk adapter 120 to write the write data into the secondary logical volume (S3450; 3350 in FIG. 33). The read/write process 220 by the disk adapter writes the data into the storage device 150 corresponding to the logical address of the secondary logical volume, frees the cache memory 130, and posts a notification to the host adapter (S3360 in FIG. 33).

(6) Upon receipt of the completion notification of the write processing by the disk adapter 120, the host adapter C frees the storage area for the is journal. The freeing process for the storage area for the journal alters the update information oldest address in the pointer information 700 to the numeric value added with the size of the update information 300. In the event that the update information oldest address has reached the write data area first address, the update information oldest address is set to "0". The write data oldest address in the pointer information 700 is altered to the numeric value added with the size of the write data. In the event that the write data oldest address has reached a logical address higher than or equal to the size of the journal logical volume, the write data area first address is reduced and thereby corrected. Thereafter, the host adapter C initiates a subsequent restore process (S3460).

In the restore process 250, although the journal is read from the storage device 150 into the cache memory 130, the processing is not necessary when the journal is present in the cache memory 130.

For the synchronous data replication, in the process of data updating of primary logical volume and data updating of the secondary logical volume, journals are created in the primary storage system 100A and the secondary storage system 100B. However, since the secondary storage system 100C obtains the journal from the secondary storage system 100B, the process may be arranged such that the journal is created only in the secondary storage system 100B without creating the journal in the primary storage system 100A.

Alternatively, the journal created in the primary storage system 100A may be transferred (copied) to the storage area in the secondary storage system 100B in response to a remote write instruction or the like.

For the asynchronous data replication, in the journal read reception process and the journal read process, the secondary storage system 100B determines the journal to be transmitted to the secondary storage system 100C in accordance with the pointer information 700. However, the secondary storage system 100C may be used to determine the journal to be transmitted from the secondary storage system 100B. For example, an update number specification is additionally input to the journal read instruction that is transmitted from the secondary storage system 100C. In this case, in the journal read reception process in the secondary storage system 100B, a table or retrieval means for retrieving from the update number the logical address of the field storing the update information 300 is provided in the shared memory 140 of the secondary storage system 100B to obtain the logical address of the update information 300 corresponding to the update number specified by the secondary storage system 100C.

Although the journal read instruction is used in the above-described journal read reception process and journal read reception process for transferring the journal, a regular read process may be used therefor. For example, the group information 600 and pointer information 700 corresponding to the secondary storage system 100B are pre-transferred to the secondary storage system 100C, whereby the secondary storage system 100C reads data, i.e., the journal in the journal logical volume in the secondary storage system 100B in response to the read instruction.

According to the journal read reception process described above, although the journal is transmitted to the secondary storage system 100C from the secondary storage system 100B in the sequence of the update numbers, the journal need not be transferred in the sequence of the update number. In addition, a plurality of journal read instructions may be transmitted from the secondary storage system 100B to the secondary storage system 100C. In this case, a table or retrieval means for obtaining from the update number a logical address storing the update information 300 therein is provided in the secondary storage system 100C whereby to execute data updating by processing the journals in the sequence of the update numbers in the restore process 250 in the secondary storage system 100C.

According to the journal read reception process and journal read process described above, the secondary storage system 100C retrieves the journal by transmitting the journal read instruction to the secondary storage system 100B. However, the secondary storage system 100B may make a write instruction (journal write instruction) to the secondary storage system 100C to store the journal. Although a dedicated instruction journal write instruction) may be used for the write instruction for the journal to the secondary storage system 100C, a regular write instruction may be used. For example, the group information 600 and pointer information 700 corresponding to the secondary storage system 100C are pre-transferred to the secondary storage system 100B, whereby the secondary storage system 100B writes data, i.e., the journal in the journal logical volume in the secondary storage system 100C.

In the example described above, although the storage sizes of the journal logical volume in the primary storage system 100A and the journal logical volume in the secondary storage system 100B are equal to each other, the storage sizes may be different from each other.

In the case that the storage size of the journal logical volume in the primary storage system 100A is larger, the case increases the probability of enabling initiating the asynchronous data replication in the secondary storage system 100B in the event that the secondary storage system 100B has recovered from failure—which is described below. In the case that the storage size of the journal logical volume in the secondary storage system 100B is larger, the case enables reducing the probability of causing discontinuation of the asynchronous data replication in the secondary storage system 100C in such an event that high loads are imposed on the secondary storage system 100C or a large amount of communication occurs through the connection path 200 between the secondary storage system 100B and the secondary storage system 100C. In the case that the storage size of the journal logical volume in the secondary storage system 100C is larger, the case enables reducing the probability of causing discontinuation of the asynchronous data replication in the secondary storage system 100C in such an event that high loads are imposed on the secondary storage system 100C.

In the above-described data processing system of the present embodiment, the secondary storage system 100B retains the replicated copy of data retained in the group primary storage system 100A. The primary storage system 100A makes the instruction for the data updating of the corresponding data retained in the secondary storage system 100B. In response to the instruction, the secondary storage system 100B executes the data updating of the corresponding data and the process of storing the information regarding the data updating in the form of the journal. The secondary storage system 100C retains the replicated copy of the data retained in the primary storage system 100A. The secondary storage system 100C autonomously retrieves the journal necessary for the data updating from the secondary storage system 100B, and updates data corresponding to the data in the primary storage system 100A in accordance with the data update sequence. These operations enable the secondary storage system 100B and the secondary storage system 100C to retain the replicated copy of the data in the primary storage system 100A while maintaining the data integrity.

<Operation When Failure Has Occurred in Secondary Storage System B>

A description will be made hereunder regarding operation in the event that failure has occurred in a configuration element in the data processing system of the embodiment that performs the operations described above. FIG. 35 shows a procedure of resuming data replication in the in the secondary storage system 100C in the event that failure has occurred in the secondary storage system 100B in the data processing system of the embodiment. FIG. 36 is a block diagram corresponding to the procedure, which shows a logical configuration of the data processing system according to the present embodiment. FIG. 37 is a view corresponding to the above for explaining exchange of commands and responses between the storage systems 100 and the host computer 180 and journals retained in the individual storage systems 100. Regarding the time shown in FIG. 37, time t6 corresponds to time t6 shown in FIG. 5. Similarly, other times also shown in the drawing corresponds in the time series. In description given hereinbelow, the volume information 400 corresponding to the primary storage system 100A before the failure occurs in the secondary storage system 100B (at time t7) is shown in FIG. 6; and similarly, the pair information 500 is shown in FIG. 9, the group information 600 is shown in FIG. 12, and a pointer information 700 is shown in FIG. 15. The volume information 400 corresponding to the secondary storage system 100B before the failure occurs in the secondary storage system 100B (at time t7) is shown in FIG. 7; and similarly, the pair information 500 is shown in FIG. 10, the group information 600 is shown in FIG. 13, and the pointer information 700 is shown in FIG. 17. The volume information 400 corresponding to the secondary storage system 100C before the failure occurs in the secondary storage system 100B (at time t7) is shown in FIG. 8; and similarly, the pair information 500 is shown in FIG. 11, the group information 600 is shown in FIG. 14, and the pointer information 700 is shown in FIG. 18.

Since the secondary storage system 100C is engaged in the asynchronous data replication, cases can occur in which the secondary logical volume COPY1 and the primary logical volume DATA1 are not consistent with each other. In addition, if the secondary storage system 100C does not retain all journals stored in the secondary storage system 100B, the secondary logical volume COPY1 cannot be made consistent with the primary logical volume DATA1. At time t7 in FIG. 37, the primary storage system 100A retains the journals corresponding to update numbers 2 to 5, the secondary storage system 100B retains the journals corresponding to update numbers 4 and 5, and the secondary storage system 100C retains the journals corresponding to update numbers 2 to 4. In the example shown in FIG. 37, the secondary logical volume COPY1 and the primary logical volume DATA1 are not consistent with each other, and the secondary storage system 100C does not retain the journal corresponding to update number 5, so that the secondary logical volume COPY1 and the primary logical volume DATA1 cannot be made consistent with each other. The operation will be described in (1) to (4) below.

(1) Because of the failure having occurred in the secondary storage system 100B, the secondary logical volumes (such as data1 and data2) and the journal logical volume (JNL2) become unusable. Thereby, the journal corresponding to update number 5 in the secondary storage system 100B cannot be read (step S3510; time t8 in FIG. 37). The failure in the secondary storage system 100B is detected in the manner that, for example, the user monitors the secondary storage system 100B through the maintenance terminal or the like. Alternatively, for example, the user may be notified of failure in the following manner. For example, Information of failure associated with a synchronized remote write instruction at the time of a write instruction to the primary storage system 100A is included into the write instruction, is notified to the host computer 180, and is then notified to the user.

(2) By using the maintenance terminal or the host computer 180, the user makes an asynchronous replication source alteration instruction to the primary storage system 100A. The asynchronous replication source alteration instruction is an instruction for altering a data replication source (primary logical volume) in the asynchronous data replication in units of the group. This instruction includes replication source information (the secondary storage system number B retaining the primary logical volumes (data1 and data2), and the group number D), replication source information (the storage system number C retaining the secondary logical volumes (COPY1 and COPY2), and the group number C (S3520; time t9 in FIG. 37).

Upon receipt of the asynchronous replication source alteration instruction, the primary storage system 100A accesses and refers to the volume information 400, pair information 500, and group information 600 corresponding to the primary storage system 100A retrieves a group number E in the "unused" group state in the primary storage system 100A. Then, the primary storage system 100A alters the volume information 400, pair information 500, and group information 600 corresponding to the primary storage system 100A to arrange an asynchronous data replication pair in which the logical volume A (DATA1, DATA2) belonging to the group A in the primary storage system 100A is the primary logical volume, and the logical volume C (COPY1, COPY2) belonging to the group C in the secondary storage system 100C is the secondary logical volume. However, the combination between the logical volume A and the logical volume C is configured by using a logical volume paired with the logical volume B in the secondary storage system 100B. In addition, the primary storage system 100A alters the group information 600 to continually use in the group E the journal logical volume having belonged to the group A. By execution of the asynchronous replication source alteration instruction, the primary storage system 100A alters the volume information 400 from the state in FIG. 6 to the state in FIG. 38, alters the pair information 500 from the state in FIG. 9 to the state in FIG. 39, and alters the group information 600 from the state in FIG. 12 to the state in FIG. 40.

The primary storage system 100A instructs the secondary storage system 100C to alter the volume information 400, pair information 500, and group information 600 corresponding to the secondary storage system 100C to arrange an asynchronous data replication pair in which the logical volume A (DATA1, DATA2) belonging to the group A in the primary storage system 100A is the primary logical volume, and the logical volume C (COPY1, COPY2) belonging to the group C in the secondary storage system 100C is the secondary logical volume. In the present case, the instruction is made by transmitting the asynchronous replication source alteration instruction. However, the combination between the logical volume A and the logical volume C is configured by using the same logical volume paired with the logical volume in the secondary storage system 100B.

The secondary storage system 100C receives the above-described instruction and halts transmission of the journal read instruction to the secondary storage system 100B. The secondary storage system 100C accesses and refers to the volume information 400, pair information 500, and group information 600 corresponding to the primary storage system 100A and the secondary storage system 100C, and alters the pair information 500 and group information 600 corresponding to the secondary storage system 100C. The secondary storage system 100C alters the pair information 500 from the state in FIG. 11 to the state in FIG. 41, and alters the group information 600 from the state in FIG. 14 to the state in FIG. 42 (S3530 and S3540).

The primary storage system 100A returns a response to the host computer 180 or maintenance terminal. The user recognizes completion of the asynchronous replication source alteration, and initiates the use of the primary storage system 100A (S3550 and S3560).

(3) The secondary storage system 100C transmits a journal read (JNLRD) position specification instruction to the primary storage system 100A (S3570; time t10 in FIG. 37). The journal read position specification instruction is an instruction that alters the pointer information 700 corresponding to the primary storage system 100A and that specifies a journal transmitted from the primary storage system 100A in response to a journal read instruction transmitted from the secondary storage system 100C. This instruction includes a destination group number E and an update number C.

The destination group number specifies a destination group number corresponding to the group number C. The update number specifies a numeric value obtained by adding "1" to the update number in the group information 600 corresponding to the group number C. In the example shown in FIG. 37, the group number 2 and the update number 5 are specified.

When the journal read position specification instruction has been received from the secondary storage system 100C, the primary storage system 100A accesses and refers to the pointer information 700 and checks whether it retains the journal corresponding to the update number C. The primary storage system 100A obtains an oldest (smallest) update number A by reading from the storage device 150 update information 300 corresponding to the update information oldest address in the pointer information 700.

If the update number A is equal to or lower (smaller) than the update number C in the journal read position specification instruction, the primary storage system 100A retains the journal corresponding to the update number C, so that the secondary storage system 100C can continue/resume the asynchronous data replication. In this event, the primary storage system 100A alters the read initiation address and the retry initiation address to logical addresses of fields storing the update information 300, and returns a "resumable" response to the secondary storage system 100C. At this time, storage areas for journals before the update number C may be freed. At time t10, the primary storage system 100A frees the storage areas for the journals corresponding to the update numbers 2 to 4. However, to initiate synchronous data replication (described below) in the secondary storage system 100B, storage areas used for journals occurring not earlier than the time when the failure has occurred in the secondary storage system 100B (in the present example, journals corresponding to update number 6 and thereafter) should not be freed (S3580).

On the other hand, if the update number A is higher (larger) than the is update number C in the journal read position specification instruction, the primary storage system 100A does not retain a necessary journal for the secondary storage system 100C, so that the asynchronous data replication cannot be continued/resumed in the secondary storage system 100C. In this case, a "non-resumable" response is returned to the secondary storage system 100C, and data replication from the primary storage system 100A to the secondary storage system 100C should be initiated in accordance with the procedure described using FIGS. 19 and 20.

(4) In the event that the "resumable" response has been received, the journal read reception process to the primary storage system 100A is initiated s by altering the group state in the group information 600 corresponding to the group C to "normal" (S3590; time t11 in FIG. 37).

The process described above may be such that the secondary storage system 100C does not make the journal read position specification instruction. In this case, the secondary storage system 100C initiates the journal read reception process to receive the oldest journal from the primary storage system 100A. Suppose that the update number A in the journal received by the secondary storage system 100C is higher (greater) than the numeric value obtained by adding "1" to the update number C in the group information 600 corresponding to the group number C. In this case, the primary storage system 100A does not retain a journal necessary for the secondary storage system 100C, so that the data replication process is discontinued. If the update number A in the received journal is equal to or lower than the update number C, the journal is discarded, and the journal read reception process is continued. If the update number A in the received journal is equal to the numeric value obtained by adding "1" to the update number C, the received journal is stored into the journal logical volume, and the journal read reception process is continued.

In the above-described data processing system of the present embodiment, the asynchronous replication source alteration instruction is transmitted to the primary storage system 100A from the host computer 180 or the maintenance terminal in the primary storage system 100A. However, the asynchronous replication source alteration instruction may be transmitted to the secondary storage system 100C by using, for example, a maintenance terminal in the secondary storage system 100C or a host computer coupled to the secondary storage system 100C.

In the above-described data processing system of the present embodiment, the determination is made whether the asynchronous data replication of data in the secondary storage system 100C can be initiatable (resumable) with the journal read position specification instruction. However, the process may be such that the pointer information 700 corresponding to the primary storage system 100A is transmitted to the secondary storage system 100C, and the secondary storage system 100C accesses and refers to the received pointer information 700 whereby to determine whether the asynchronous data replication of the data is initiatable.

Subsequently, by using FIG. 43 and FIG. 36 referenced in the above, a description will be made regarding operation of reflecting data updates to the primary logical volume DATA1 in the primary storage system 100A into the secondary logical volume COPY1 in the secondary storage system 100C after the host computer 180 has initiated the use of the primary storage system 100A. FIG. 43 shows a view corresponding to the above operation for explaining exchange of instructions and responses between the storage systems 100 and the host computer 180 and journals retained in the individual storage systems 100. At time t10 shown in FIG. 43, the host computer 180 initiates the use of the primary storage system 100A. The primary storage system 100A retains the journal corresponding to update number 5, and the secondary storage system 100C retains the journals corresponding to update numbers 2 to 4. At time t11, the secondary storage system 100C reads the journal corresponding to update number 5 from the primary storage system 100A in accordance with the journal read process 240, and stores the journal.

(1) Upon receipt of a write instruction from the host computer 180 for a write to data in the primary logical volume DATA1, the primary storage system 100A executes data updating in the primary logical volume DATA1 and stores the journal into the journal logical volume JNL1 in accordance with the above-described instruction reception process 210 and read/write process 220, and notifies the host computer 180 of the completion of the write instruction (3600 in FIG. 36). At time t12 shown in FIG. 43, the primary storage system 100A receives a write instruction from the host computer 180 and executes updating of the primary logical volume and storing of the journal corresponding to update number 6 into the logical volume.

(2) The secondary storage system 100C reads the journal from the primary storage system 100A in accordance with the journal read process 240 and stores the journal into the journal logical volume JNL3 in accordance with the read/write process 220 (3610 in FIG. 36). At time t13 shown in FIG. 43, the secondary storage system 100C transmits a journal read instruction to the primary storage system 100A, reads the journal corresponding to update number 6 from the group primary storage system 100A, and stores the journal into the journal logical volume JNL3.

Upon receipt of the journal read instruction from the secondary storage system 100C, the primary storage system 100A reads the journal from the journal logical volume JNL1 and transmits the journal to the secondary storage system 100C in accordance with the instruction reception process 210 and read/write process 220 (3610 in FIG. 36). In this event, the storage area for the journal corresponding to update number 5, which is older than the transmitted journal, may be freed. In the example shown in FIG. 43, the intersection region for the journal corresponding to update number 5 is freed.

(3) By using the pointer information 700, the secondary storage system 100C reads the journal in the ascending order of the update number from the journal logical volume JNL3, and updates the data in the secondary logical volume COPY1 in accordance with the restore process 250 and the read/write process 220 (3620 in FIG. 36). According to the above, data in the primary logical volume DATA1 in the primary storage system 100A and data in the secondary logical volume COPY1 in the secondary storage system 100C are completely consistent with each other at some time after the updating of the primary logical volume. At time t14 shown in FIG. 43, the secondary storage system 100C reads the journal corresponding to update number 2 from the journal logical volume, and then update data in the secondary logical volume. In this case, the storage area for the journal corresponding to the update number 2 may be freed; or alternatively, a method may be employed that frees the storage area for the oldest journal upon the time at which the journal storing area has become short.

According to the above-described data processing system of the present embodiment, the primary storage system 100A creates the journal, and the secondary storage system 100B creates the journal by using the update number and update time received from the primary storage system 100A. In addition, the secondary storage system 100C retrieves the journal from the secondary storage system 100B. Consequently, the operation enables the two storage systems to retain replicated copies of the data. If failure has occurred in the secondary storage system 100B, the secondary storage system 100C changes a journal-retrieving end, that is, the replication source, from the secondary storage system 100B to the primary storage system 100A. Thereby, the secondary storage system 100C is enabled to continue the data replication (asynchronous data replication) for data in the primary storage system 100A while maintaining the data integrity.

<Operation of Storage System B after Recovery>

FIG. 44 is a view for explaining a procedure of resuming data replication in the secondary storage system 100B after the secondary storage system 100B has recovered from the failure in the data processing system of the present embodiment. FIG. 45 shows a view corresponding to the above for explaining exchange of commands and responses between the storage systems 100 and the host computer 180 and journals retained in the individual storage systems 100. The operation will be described in (1) to (6) below.

(1) The user causes the storage system B (100B) to be recovered (step S4410 in FIG. 44; time t15 in FIG. 45).

(2) By using the maintenance terminal or the host computer 180, the user transmits a replication mode alteration instruction the primary storage system 100A. The replication mode alteration instruction is an instruction for altering the synchronous data replication to the asynchronous data replication in units of the group with respect to the type (mode) of data replication between the storage systems 100. This instruction includes replication source information (storage system number A retaining primary logical volumes (DATA1 and DATA2), and the group number A), and replication destination information (secondary logical volumes (data1 and data2))(S4420).

(3) Upon receipt of the replication mode alteration instruction, the primary storage system 100A alters the pair information 500 and group information 600 corresponding to the primary storage system 100A to alter the data replication of a logical volume belonging to the group corresponding to the group number A. In accordance with the replication mode alteration instruction, the primary storage system 100A alters the volume information 400 from the state in FIG. 38 to the state in FIG. 46, alters the volume information 400 from the state in FIG. 38 to the state in FIG. 46, alters the pair information 500 from the state in FIG. 39 to the state in FIG. 47, and alters the group information 600 from the state in FIG. 40 to the state in FIG. 48 (S4430).

Further, the primary storage system 100A instructs the secondary storage system 100B to alter the volume information 400 and the group information 600 so that the data replication of the logical volume belonging to the group corresponding to the group number B alters to the asynchronous data replication. In the present case, the above is performed by transmission of the replication mode alteration instruction. The secondary storage system 100B alters the volume information 400 and group information 600 corresponding to the specified group B. In accordance with the replication mode alteration instruction, the secondary storage system 100B alters the volume information 400 from the state in FIG. 7 to the state in FIG. 49, and alters the group information 600 from the state in FIG. 13 to the state in FIG. 50 (S4440).

(4) The secondary storage system 100B transmits a journal read position specification instruction to the primary storage system 100A (S4450). The journal read position specification instruction is an instruction that alters the pointer information 700 corresponding to the primary storage system 100A and that specifies a journal transmitted from the secondary storage system 100B in response to a journal read instruction transmitted from the secondary storage system 100B. This instruction includes a destination group number A and an update number B. The destination group number specifies a destination group number corresponding to the group number B. The update number specifies a numeric value obtained by adding "1" to the update number in the group information 600 corresponding to the group number B.

In the example shown in FIG. 45, the group number 1 and the update number 6 are specified in accordance with the journal read position specification instruction (S4450; time t16 in FIG. 45).

(5) When the journal read position specification instruction has been received, the primary storage system 100A accesses and refers to the pointer information 700 and checks whether it retains the journal corresponding to the update number B. The primary storage system 100A obtains an oldest (smallest) update number A by reading from the storage device 150 update information 300 corresponding to the update information oldest address in the pointer information 700.

If the update number A is equal to or lower than the update number B in the journal read position specification instruction, the primary storage system 100A retains the journal corresponding to the update number B, so that the secondary storage system 100B can initiate the asynchronous data replication. In this event, the primary storage system 100A alters the read initiation address and the retry initiation address to addresses of fields storing the update information 300, and returns an "initiatable" response to the secondary storage system 100B. At this time, storage areas for journals before the update number B may be freed (S4460).

On the other hand, if the update number A is higher than the update number B in the journal read position specification instruction, the primary storage system 100A does not retain a necessary journal for the secondary storage system 100B, so that the asynchronous data replication cannot be initiated in the secondary storage system 100B. In this case, a "non-initiatable" response is returned to the secondary storage system 100B, and data replication from the primary storage system 100A to the primary storage system 100A should be initiated in accordance with the procedure described using FIGS. 19 and 20 (S4480).

(6) In the event that the "initiatable" response has been received, the journal read reception process to the primary storage system 100A is initiated by altering the group state in the group information 600 corresponding to the group C to "normal" (S4490; time t17 in FIG. 45).

The process may be such that the secondary storage system 100B does not make the journal read position specification instruction. In this case, the secondary storage system 100B initiates the journal read reception process to receive the oldest journal from the primary storage system 100A. Suppose that the update number A in the journal received by the secondary storage system 100B is higher than the numeric value obtained by adding "1" to the update number in the group information 600 corresponding to the group number B. In this case, the primary storage system 100A does not retain a journal necessary for the secondary storage system 100B, so that the data replication process is discontinued. If the update number A in the received journal is equal to or lower than the update number B, the journal is discarded, and the journal read reception process is continued. If the update number A in the received journal is equal to the numeric value obtained by adding "1" to the update number B, the received journal is stored into the journal logical volume, and the journal read reception process is continued.

In the above-described data processing system of the present embodiment, the asynchronous replication source alteration instruction is transmitted to the primary storage system 100A. However, the asynchronous replication source alteration instruction may be transmitted to the secondary storage system 100B by using, for example, a maintenance terminal in the secondary storage system 100B or a host computer coupled to the secondary storage system 100B.

In the above-described data processing system of the present embodiment, the determination is made whether the asynchronous data replication of data in the secondary storage system 100B can be initiatable (resumable) with the journal read position specification instruction. However, the process may be such that the pointer information 700 corresponding to the primary storage system 100A is transmitted to the secondary storage system 100B, and the secondary storage system 100B accesses and refers to the received pointer information 700 whereby to determine whether the asynchronous data replication of the data is initiatable.

Subsequently, by using FIGS. 51 and 52, a description will be made regarding operation of reflecting data updates to the primary logical volume DATA1 in the primary storage system 100A into the secondary logical volume data1 in the secondary storage system 100B and the secondary logical volume COPY1 in the secondary storage system 100C after the host computer 180 has initiated the use of the primary storage system 100A. FIG. 51 shows a block diagram corresponding to the above and showing a logical configuration of the data processing system according to the present embodiment. FIG. 52 shows a view corresponding to the operation for explaining exchange of instructions and responses between the storage systems 100 and the host computer 180 and journals retained in the individual storage systems 100. The operation will be described in (1) to (3) below.

(1) Upon receipt of a write instruction from the host computer 180 for writes to data in the primary logical volume DATA1, the primary storage system 100A executes data updating in the primary logical volume DATA1 and stores the journal into the journal logical volume JNL1 in accordance with the above-described instruction reception process 210 and read/write process 220 (5110 in FIG. 51). At time t18 shown in FIG. 52, the primary storage system 100A receives a write instruction from the host computer 180 executes updating of the primary logical volume and storing of the journal corresponding to update number 7 into the logical volume.

(2) The secondary storage system 100B reads the journal from the primary storage system 100A in accordance with the journal read process 240 and stores the journal into the journal logical volume JNL2 in accordance with the read/write process 220 (5120 in FIG. 51). At time t19 shown in FIG. 52, the secondary storage system 100B transmits a journal read instruction to the primary storage system 100A, reads the journal corresponding to update number 7 from the primary storage system 100A, and stores the journal into the journal logical volume JNL2.

(3) The secondary storage system 100C reads the journal from the primary storage system 100A in accordance with the journal read process 240 and stores the journal into the journal logical volume JNL3 in accordance with the read/write process 220 (5130 in FIG. 51). At time t20 shown in FIG. 52, the secondary storage system 100C transmits a journal read instruction to the primary storage system 100A, reads the journal corresponding to update number 7 from the primary storage system 100A, and stores the journal into the journal logical volume JNL3. In this case, the storage area for the journal corresponding to the update number 7 may be freed; or alternatively, a method may be employed that frees the storage area for the oldest journal upon the time at which the journal storing area has become short.

After the above, in accordance with the restore process 250, the secondary storage system 100B and secondary storage system 100C each read journals from the journal logical volume in the order of the update numbers, and update data in the secondary logical volume. (5140, 5150 in FIG. 51)

According to the above-described data processing system of the present embodiment. The primary storage system 100A and secondary storage system 100C each retrieve the journal from the primary storage system 100A, and update data corresponding to the primary storage system is 100A. Thereby, the secondary storage system 100B and secondary storage system 100C are each enabled to retain the asynchronous data replication copy of the primary storage system 100A while maintaining the data integrity.

In addition, FIG. 53 shows a procedure of altering asynchronous data replication to synchronous data replication in the secondary storage system 100B. FIG. 54 shows a view corresponding to the procedure for explaining exchange of instructions and responses between the storage systems 100 and the host computer 180 and journals retained in the individual storage systems 100.

The host adapter B transmits a journal read instruction to the primary storage system 100A in accordance with the journal read process 240 described above. A last (largest (highest) update number for which the restore process 250 has been completed is included into the journal read instruction (step S5310). In accordance with a similar method as the journal read process 240 described above, the primary storage system 100A checks to determine whether a journal untransmitted to the secondary storage system 100B is present (S5320). If an untransmitted journal is present, the primary storage system 100A transmits the journal to the secondary storage system 100B (S5330). The secondary storage system 100B receives the journal from the primary storage system 100A, and executes the journal store process described above (S5340).

If upon the determination at S5320 no journal untransmitted to the secondary storage system 100B is present and the restore process 250 for all journals is completed in the secondary storage system 100B, the primary storage system 100A alters the data replication mode from the asynchronous data replication to the asynchronous data replication, and then transmits a "synchronous replication initiation" response to the secondary storage system 100B. On the other hand, if the restore process 250 for the all journals is not completed in the secondary storage system 100B, the primary storage system 100A transmits a "no remaining journal" response to the secondary storage system 100B. Whether the restore process 250 is completed for the all journals is completed in the secondary storage system 100B is determined in accordance with the last (highest) update number in the journal read instruction and the update number in the group information corresponding to group number 1 corresponding to the primary storage system 100A. If a "last (highest) update number+1" value in the journal read instruction is equal to the group number in the group information corresponding to group number 1 corresponding to the primary storage system 100A, the restore process 250 for the all journals in the secondary storage system 100B is completed in the secondary storage system 100B. If the "last (highest) update number+1" is value in the journal read instruction is equal to or smaller than the update number in the group information corresponding to group number 1 corresponding to the primary storage system 100A, the restore process 250 for the all journals in the secondary storage system 100B is not completed.

The primary storage system 100A alters the volume information 400 shown in FIG. 46 to the state shown in FIG. 55, and alters the group information 600 shown in FIG. 48 to the state shown in 56 (S5350).

Upon receipt of the "synchronous replication initiation" response from the primary storage system 100A, the secondary storage system 100B executes the restore process 250 for the all journals (unreflected journals) and determines whether data updating of the secondary logical volume has been executed (S5360). If the restore process 250 for the all journals is not yet executed, the operation returns to S5310. If the restore process 250 for the all journals is executed, the operation halts the journal read reception process and alters the data replication mode corresponding to the group from the asynchronous data replication to the synchronous data replication. The secondary storage system 100B alters the volume information 400 shown in FIG. 49 to the state shown in FIG. 57, and alters the group information 600 shown in FIG. 50 to the state shown in FIG. 58 (S5370; time t21 in FIG. 54).

After execution of the restore process 250 for the all journals (journals corresponding to update numbers 4 to 7), the secondary storage system 100B transmits a journal read instruction to the primary storage system 100A. The last (highest) update number in the journal read instruction is 7.

Thereafter, upon receipt of a write instruction from the host computer 180 for writes to the logical volume, the primary storage system 100A executes data updating, storing of the journal into the journal logical volume, and transmission of a remote write instruction to the secondary storage system 100B. At time t22 shown in FIG. 54, the primary storage system 100A stores the journal corresponding to update number 8 into the logical volume. The secondary storage system 100B receives the remote write instruction from the primary storage system 100A, and executes updating of data corresponding to the secondary logical volume. Additionally, the secondary storage system 100B may store the journal into the secondary logical volume.

Subsequently, the secondary storage system 100C reads the journal from the primary storage system 100A, and stores the journal into the journal logical volume. At time t23 shown in FIG. 54, by using the pointer information 700, the secondary storage system 100C in accordance with the restore process 250 and the read/write process 220 reads the journal in the ascending order of the update number from the primary storage system 100A, and updates the data in the secondary logical volume.

According to the data processing system of the present embodiment, in the event that in the asynchronous data replication, no untransmitted journal to the secondary storage system 100B is present in the primary storage system 100A, and data updating is already completed in the secondary storage system 100B in accordance with the restore process 250, the data replication mode in the storage system A (100A) and the storage system B (100B) is altered from the asynchronous data replication to the synchronous data replication. This enables the secondary storage system 100B to initiate the synchronous data replication of data in the primary storage system 100A while maintaining the data integrity.

According to the processes described above, the data processing system of the present embodiment in the event of failure occurrence,in the secondary storage system 100B serving as the replication source, i.e., the journal-retrieving end, the replication source in the asynchronous data replication is altered to the primary storage system 100A serving as the replication source in the synchronous data replication, transfer (copying) of the journal necessary to make the replication data to be consistent with the replication target data in the secondary storage system 100C, update reflection is performed in accordance with the transferred journal, whereby the data is made consistent. Different from the conventional related art, the full data in the replication target data (primary logical volume) in the primary storage system need not be transferred to the sub-storage system, it is sufficient to perform only the process of update reflection by transmitting the journal for data-update occurrence portions, consequently enabling the data replication to be resumed, that is, enabling the state of retaining complete replication data to be introduced in a reduced time.

<Operation When Failure Has Occurred in Host Computer>

By using FIGS. 59 to 62, a description will now be provided regarding a procedure of operation to be performed such that, in the event that failure has occurred in the host computer 180 (first host computer) using the primary storage system 100A during normal operation in the data processing system of the present embodiment, information processing being performed with the host computer 180 is resumed by using a second host computer 180B (host computer B), and the synchronous data replication for data in the storage system B (100B) is initiated in the storage system A (100A). FIG. 59 is a view for explaining a procedure of initiating the synchronous data replication of data in the storage system B (100B) in the storage system A (100A) when the failure has occurred in the first host computer 180 in the data processing system of the present embodiment. FIG. 60 is a view corresponding to the above-described procedure for explaining exchange of commands and responses between the storage systems 100 and the host computer (180, 180B) and journals retained in the individual storage systems 100. Time t6 shown in FIG. 60 corresponds to time t6 shown in FIG. 5. FIG. 61 is a block diagram showing a logical configuration before failure occurs in the first host computer 180. The configuration shown in FIG. 61 is the same as that shown in FIG. 1, except for the second host computer 180B connected to the storage system B (100B) via the connection path 190. FIG. 62 is a block diagram showing a logical configuration in the event of resuming the process in the second host computer 180B the storage system B (100B) after failure has occurred in the first host computer 180. In the configuration shown FIG. 62, the state of the storage system 100 changes; specifically, the storage system B changes from the sub-storage system to the primary storage system, and the storage system A changes from the primary storage system to the sub-storage system. The operation will be described in (1) to (5) below.

In description given hereinbelow, the volume information 400 corresponding to the primary storage system 100A before the failure occurs in the first host computer 180 (at time t7 in FIG. 60) is shown in FIG. 6; and similarly, the pair information 500 is shown in FIG. 9, the group information 600 is shown in FIG. 12, and a pointer information 700 is shown in FIG. 15. The volume information 400 corresponding to the primary storage system 100B before the failure occurs in the secondary storage system 100B (at time t7) is shown in FIG. 6; and similarly, the pair information 500 is shown in FIG. 9, the group information 600 is shown in FIG. 12, and the pointer information 700 is shown in FIG. 15. The volume information 400 corresponding to the secondary storage system 100C before the failure occurs in the first host computer 180 (at time t7) is shown in FIG. 8; and similarly, the pair information 500 is shown in FIG. 11, the group information 600 is shown in FIG. 14, and the pointer information 700 is shown in FIG. 18. At time t7 shown in FIG. 60, upon data updating in accordance with a write instruction from the first host computer 180, the primary storage system 100A retains the journals corresponding to update numbers 2 to 5, the secondary storage system 100B retains the journals corresponding to update numbers 4 and 5, and the secondary storage system 100C retains the journals corresponding to update numbers 2 to 4.

(1) Failure occurs in the first host computer 180 having used the primary storage system 100A (S5900; time t8 in FIG. 60). At and after time t9, the synchronous data replication is initiated for data in the storage system B (100B) by using the second host computer 180B connected to the secondary storage system 100B.

(2) The user transmits a synchronous replication exchange instruction to the secondary storage system 100B by using the second host computer 180B or a maintenance terminal (S5910; time t9 in FIG. 60). The synchronous replication exchange instruction is an instruction that reverses the relationship between the primary logical volume the secondary logical volume in the synchronous data replication. This instruction includes replication source information (primary system number A retaining synchronous-data-replication primary logical volumes (DATA1 and DATA2), and the group number A), and replication destination information (synchronous-data-replication secondary logical volumes (data1 and data2)).

Upon receipt of the synchronous replication exchange instruction, the secondary storage system 100B accesses and refers to the volume information 400, the pair information 500, and group information 600, corresponding to the storage system 100B to alter the volume information 400 and the pair information 500 corresponding to the storage system B to constitute a synchronous-data-replication pair with the logical volume A (DATA1, DATA2) belonging to the group A in the primary storage system 100A and the logical volume B (data1, data2) belonging to the group B in the storage system B. However, the combination between the logical volume A and the logical volume B is configured by using logical volumes already constituted the synchronous-data-replication pair. In accordance with the synchronous replication exchange instruction, the volume information 400 corresponding to the storage system B is altered to the state shown in FIG. 63, and the pair information 500 corresponding thereto is altered to the state shown in FIG. 64.

The storage system B (100B) instructs the primary storage system 100A to alter the volume information 400 and the pair information 500 corresponding to constitute a synchronous-data-replication pair with the logical volume A (DATA1, DATA2) belonging to the group A in the primary storage system 100A and the logical volume B (data1, data2) belonging to the group B in the storage system B. In the present case, the above is performed by transmission of the synchronous replication exchange instruction. The combination between the logical volume A and the logical volume B is configured by using logical volumes already constituted the synchronous-data-replication pair (S5920 and S5930).

(3) In accordance with the received synchronous replication exchange instruction, the primary storage system 100A accesses and refers to the volume information 400, pair information 500, and group information 600 corresponding to storage system A, and alters the volume information 400 and pair information 500 corresponding to the storage system A. In accordance with the synchronous replication exchange instruction, the volume information 400 corresponding to the storage system A is altered to the state shown in FIG. 65, and the pair information 500 corresponding thereto is altered to the state shown in FIG. 66.

(4) After completion of alteration of the individual information on the storage system A (100A) and the storage system B (100B), the storage system B (100B) transmits a response to, for example, the second host computer 180B or a maintenance terminal (S5940). According to the procedure described above, the storage system B becomes the primary storage system, and the storage system A becomes the substorage system. Correspondingly, the secondary logical volumes (such as data1 and data2) each become the primary logical volume, and the primary logical volumes (such as DATA1 and DATA2) each become the secondary logical volume.

(5) The user recognizes completion of the synchronous replication exchange from the second host computer 180B, the maintenance terminal, or the like, and then initiates the use of the secondary storage system 100B (S5950).

Subsequently, by using FIG. 62, a description will be made in (1) to (6) below regarding operation of reflecting a data update to the primary logical volume data1 in the primary storage system 100C into the secondary logical volume DATA1 and the secondary logical volume COPY1 in the secondary storage system 100A and the secondary logical volume COPY1 in the secondary storage system 100C after completion of the synchronous replication exchange.

(1) Upon receipt of a write instruction from the second host computer 180B for a write to data in the primary logical volume data1, the primary storage system 100B executes data updating in the primary logical volume data1, storing of the journal into the journal logical volume JNL2, and data updating of the secondary logical volume DATA1 in the secondary storage system 100A in accordance with the above-described instruction reception process 210 and read/write process 220 (6210 and 6215 in FIG. 62). The data updating of the secondary logical volume DATA1 is executed in accordance with a remote write instruction. The remote write instruction includes a write instruction from the second host computer 180B, write data, and the update information 300 in the journal. The update information 300 in this case indispensably need not have all the information as shown in FIG. 3, but the information is sufficient if the information contains the update number or the update time. At time t10 in FIG. 60, the primary storage system 100B receives the write instruction made from the second host computer 180B, updates the primary logical volume data1, and stores a journal corresponding to update number 6 into the journal logical volume JNL2. In addition, the primary storage system 100A transmits to the secondary storage system 100A a remote write instruction for data updating of data to which the secondary logical volume corresponds.

(2) Upon receipt of the remote write instruction from the primary storage system 100B, the secondary storage system 100A executes updating corresponding data in the secondary logical volume DATA1, and storing of the journal into the journal logical volume JNL1 in accordance with the instruction reception process 210 and read/write process 220 described below. For the update number and the update time in the journal, numeric values in the remote write instruction are used (6620 in FIG. 62). At time t10, the secondary storage system 100A receives the remote write instruction, executes data updating of the secondary logical volume DATA1 and storing of the journal corresponding to update number 6 into the journal logical volume JNL1, and returns a response to the secondary storage system 100B.

(3) After receipt of the response to the remote write instruction from the secondary storage system 100A, the primary storage system B notifies the second host computer 180B of the completion of the write instruction. The above are indivisible processes synchronous with the data updating of the primary logical volume. Accordingly, the data in the primary logical volume DATA1 in the primary storage system 100A is completely consistent with the data in the secondary logical volume data1 in the secondary storage system 100B. In addition, the update number corresponding to the journal in the journal logical volume JNL1 and the update number corresponding to the journal in the journal logical volume JNL2 are completely consistent with each other with respect to one write instruction. At time t10 in FIG. 60, the primary storage system 100B receives a response to the remote write instruction from the secondary storage system 100A, and notifies the second host computer 100B of completion of the write instruction.

(4) In asynchronization with the above, the secondary storage system 100C reads the journal through the journal read process 240 from the secondary storage system 100B, and then stores the read journal into the journal logical volume JNL3 in accordance with the read/write process 220 (6230 in FIG. 62). At time t11 in FIG. 60, the secondary storage system 100C transmits a journal read instruction to the secondary storage system 100B, reads the journals corresponding to update numbers 5 and 6, and stores them into the journal logical volume JNL3.

(5) Upon receipt of the journal read instruction from the secondary storage system 100C, the secondary storage system 100B reads the journal in accordance with the instruction reception process 210 and the read/write process 220 from the journal logical volume JNL2, and then transmits them the secondary storage system 100C (S6230 in FIG. 62). At time t1 in FIG. 60, the primary storage system 100B receives a journal read instruction from the secondary storage system 100C, and transmits the journals corresponding to update numbers 5 and 6. In this case, the journal corresponding to update number 4, which is older than the transmitted journals, may be discarded.

(6) The secondary storage system 100C reads the journals in an ascending order of the update numbers from the journal logical volume JNL3 by using the pointer information 700 in accordance with the restore process 250 and read/write process 220 described above, and thereby updates the data in the secondary logical volume COPY1 (6240 in FIG. 62). Accordingly, the primary logical volume data1 in the primary storage system 100B and the data in the secondary logical volume COPY1 in the secondary storage system 100C completely consistent with each other at some time after the updating of the secondary logical volume DATA1 and the primary logical volume data1. At this time, the storage area for the journal that has become unnecessary in the secondary storage system 100C may be freed. Alternatively, a method may be employed that frees the storage area for the oldest journal upon the time at which the journal storing area has become short.

According to the above-described data processing system of the present embodiment, in the event that failure has occurred in the first host computer 180 using the primary storage system 100A, and the process is continued/resumed by using the secondary storage system 100B and the second host computer 180B connected thereto, the storage system B (100B) reverses the relationship between the replication source (primary logical volume) and the replication destination (secondary logical volume) in the synchronous data replication in accordance with the synchronous replication exchange instruction. Thereby, two modes of the data replication, that is, in the synchronous and asynchronous modes can be implemented for data in the storage system B (100B) in the two storage systems, namely the storage system A (100A) and the storage system C (100C). In the foregoing, the invention made by the inventors of the present invention has been concretely described based on the embodiment. However, it is needless to say that the present invention is not limited to the foregoing embodiment and various modifications and alterations can be made within the scope of the present invention.

Among other things, the invention may be used as techniques for implementing data security in preparation for failure occurrence and the like by being applied to, for example, data processing systems in environments for providing all-time continuous services.

What is claimed is:

1. A system comprising:

a plurality of storage systems each including a control section and storage devices whereby to have the functionality of storing data into storage areas, wherein a first storage system retains first data as replication target data, a second storage system retains second data as replication data of the first data, and a third storage system retains third data as replication data of the first data, wherein in accordance with an instruction received from a host computer, the first storage system performs data updating of the first data, creates information regarding the data updating as a first journal including an identifier of data update sequence, stores the journal into a storage area in the first storage system, and makes an instruction including the identifier for data updating of the second data to the second storage system in synchronization with the data updating of the first data via a communication line between the first and second storage systems, wherein in accordance with the instruction for the data updating, the second storage system performs the data updating of the second data, creates information regarding the data updating as a second journal by using information including the identifier received from the first storage system, and stores the second journal into a storage area in the second storage system, wherein in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal, and wherein, in the event of failure occurrence, transfer of the each individual journal is performed between the storage systems and data updating is performed by using the transferred journal, wherein each storage system includes at least one group of data volumes for which data integrity is to be maintained, and wherein a journal volume is assigned to each of said at least one group of data volume.

2. The system according to claim 1, wherein the replication target in a process of synchronous data updating is altered from the first storage system to the second storage system, and wherein the data updating of the first data in synchronization with the data updating of the second data in the second storage system is performed through exchange of instructions and responses.

3. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

in synchronization with data updating of the first data in the first storage system, the data processing system performs the processes of data updating of the second data stored in a data volume related to at least one disk drive in the second storage system in the second storage system, creating information regarding data updating of the first and second data as a journal including identifiers of data update sequence, and storing the journal into a journal volume related to at least one disk drive in at least any one of the first and second storage systems, wherein the journal is stored in at least one of the first and second storage systems after the updating of the first data in the first storage system;

in asynchronization with the data updating of the first data in the first storage system, the data processing system performs transfer to store the journal into a journal volume related to at least one disk drive in the third storage system, and the third storage system performs data updating of the third data in accordance with the data update sequence in the first storage system by using the third journal, wherein each storage system includes at least one group of data volumes for which data integrity is to be maintained, and wherein a journal volume is assigned to each of said at least one group of data volume.

4. The data processing system according to claim 3, wherein for the timing with which journal transfer is performed between the storage systems in the asynchronization process, instructions for the journal transfer are periodically performed at a predetermined time interval.

5. A data processing system of the type, comprising:

a plurality of storage systems each including a control section and storage devices whereby to have the functionality of storing data into storage areas, wherein the storage systems are interconnected by means of communication lines whereby replication of data is retained between the storage systems, and wherein a first storage system retains first data as replication target data, a second storage system retains second data as replication data of the first data, and a third storage system retains third data as replication data of the first data;

in accordance with an instruction received from a host computer, the first storage system performs data updating of the first data stored in the first journal into a first journal volume related to at least one disk drive in the first storage system, and making of an instruction for data updating of the second data to the second storage system in synchronization with the data updating via a communication line between the first and second storage systems and wherein the first journal is stored in the first journal volume for a time period after the first storage system instructs data updating to second storage system, in accordance with the instruction for the data updating, the second storage system performs the data updating of the second data, creates information regarding the data updating as a journal including an identifier of data update sequence, and stores the journal into a storage area in the second storage system; and in asynchronization with the data updating of the first and second data stored in a data volume related to at least one disk drive in the second storage system, stores the second journal into a second journal volume related to at least one disk drive in the second storage system, wherein the second journal is stored in the second journal volume for a time period after the first storage system instructs data updating to the third storage system;

wherein the third storage system retrieves the second journal from the second storage system via a communication line between the second and third storage systems, stores the second journal into a third journal volume related to at least one disk drive in the third storage system, and data updating of the third data stored in a data volume related to at least one drive in the third storage system is in accordance with the data update sequence in the first storage system by using the third journal, wherein each storage system includes at least one group of data volumes for which data integrity is to be maintained, and wherein a journal volume is assigned to each of said at least one group of data volume.

6. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

a host computer performs information processing by accessing the first data by using the first storage system through a communication line;

in accordance with an instruction received from the host computer, the first storage system performs data updating of the first data stored in a data volume related to at least one disk drive in the first storage system, creates information regarding the data updating as a first journal including an identifier of data update sequence, stores the first journal into a first journal volume related to at least one disk drive in the first storage system and making of an instruction including the identifier for data updating of the second data to the second storage system in synchronization with the data updating via a communication line between the first and second storage systems;

wherein the first journal is stored in the first journal volume for a time period after the first storage system instructs data updating to second storage system, wherein in accordance with the instruction for the data updating, the second storage system performs the data updating of the second data stored in a data volume related to at least one disk drive in the second storage system, creates information regarding the data updating as a second journal by using information including the identifier received from the first storage system, and stores the second journal into a second journal volume related to at least one disk drive in the second storage system, wherein the second journal is stored in the second journal volume for a time period after the first storage system instructs data updating to the third storage system;

in asynchronization with the data updating of the first and second data, the third storage system retrieves the second journal from the second storage system via a communication line between the second and third storage systems, stores the second journal as a third journal into a third journal volume related to at least one disk drive in the third storage system and data updating of the third data stored in a data volume related to at least one drive in the third storage system is based on the identifier in accordance with the data update sequence of the first data in the first storage system by using the third journal; and in the event of failure occurrence, transfer of the each individual journals stored in the journal volumes is performed between the storage systems, and data updating is performed by using the transferred journals, wherein each storage system includes at least one group of data volumes for which data integrity is to be maintained, and wherein a journal volume is assigned to each of said at least one group of data volume.

7. The data processing system according to claim 6, wherein in the event that failure has occurred in the second storage system, wherein the third storage system obtains a differential with the third journal from the first journal of first storage system via a communication line between the first and third storage systems, stores the differential as the third journal into the storage area in the third storage system, and performs data updating of the third data based on the identifier in accordance with the data update sequence of the first data in the first storage system by using the third journal.

8. The data processing system according to claim 7, wherein in the event that failure has occurred in the second storage system;

a replication source in the process of the asynchronous data updating is altered from the second storage system to the first storage system; and the third storage system retrieves data from the first journal of the first storage system through exchange of instructions and responses, and thereby performs the data updating of the third data.

9. The data processing system according to claim 7, wherein after the second storage system has recovered from the failure, in asynchronization with the data updating of the first data, the second storage system retrieves datafrom the first journal of the first storage system via the communication line between the first and second storage systems, stores the data as the second journal into the storage area in the second storage system, and performs data updating of the second data based on the identifier in accordance with the data update sequence of the first data in the first storage system by using the second journal.

10. The data processing system according to claim 6, wherein the first, second, and third journals are each comprised of a copy of the data used in the data updating, a write instruction at the time of the data updating, and an update number or update time as the identifier of the data update sequence.

11. The data processing system according to claim 6, wherein the third storage system makes a read instruction to the second storage system, and in response thereto the second storage system transmits untransmitted journal data from the second journal in accordance with the identifier.

12. The data processing system according to claim 6, wherein the third storage system makes an instruction for a journal transmission specification to the second storage system in accordance with the identifier, and the second storage system transmits specified journal data from the second journal in accordance with the specification.

13. The data processing system according to claim 6, wherein the timing with which journal transfer is performed between the storage systems in the asynchronization process is determined in accordance with the size of retained or exchanged or write data in the storage systems.

14. The data processing system according to claim 6, wherein the timing with which journal transfer is performed between the storage systems in the asynchronization process is determined in accordance with a communication load state in the communication line between the storage systems or processing load state in the storage system.

15. A data processing system of the type comprising:
a plurality of storage systems each including a control section and storage devices whereby to have the functionality of storing data into storage areas,
wherein the storage systems are interconnected by means of communication lines whereby replication of data is retained between the storage systems,
wherein a first storage system retains first data as replication target data, a second storage system retains second data as replication data of the first data, and a third storage system retains third data as replication data of the first data;
a host computer performs information processing by accessing the first data by using the first storage system through a communication line;
in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems; and in accordance with the instruction for the data updating, the second storage system performs the data updating of the second data, creates information regarding the data updating as a second journal by using information including the identifier received from the first storage system, and stores the second journal into a storage area in the second storage system; and
in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and
in the event of failure occurrence, transfer of the each individual journal is performed between the storage systems, and data updating is performed by using the transferred journal,
wherein in the event that failure has occurred in the second storage system,
wherein the third storage system obtains a differential with the third journal from the first journal of first storage system via a communication line between the first and third storage systems, stores the differential as the third journal into the storage area in the third storage system, and performs data updating of the third data based on the identifier in accordance with the data update sequence of the first data in the first storage system by using the third journal,
wherein after the second storage system has recovered from the failure,
in asynchronization with the data updating of the first data, the second storage system retrieves data from the first journal of the first storage system via the communication line between the first and second storage systems, stores the data as the second journal into the storage area in the second storage system, and performs data updating of the second data based on the identifier in accordance with the data update sequence of the first data in the first storage system by using the second journal,
wherein after the second storage system has recovered from the failure,
when the second storage system enters a state where retrieval from first journal of the first storage system has been completed and the data updating of the second data has been completed, the data replication of the first data in the first storage system and the second storage system is altered from the asynchronization process to the synchronization process, and the data updating of the second data is performed in synchronization with the data updating of the first data,
wherein each storage system includes at least one group of data volumes for which data integrity is to be maintained, and
wherein a journal volume is assigned to each of said at least one group of data volume.

16. The data processing system according to claim 15, wherein a replication source in the process of the synchronous data updating is altered from the first storage system to the second storage system; and the data updating of the first data in synchronization with the data updating of the second data in the second storage system is performed through exchange of instructions and responses.

17. A data processing system of the type comprising:
a plurality of storage systems each including a control section and storage devices whereby to have the functionality of storing data into storage areas,
wherein the storage systems are interconnected by means of communication lines whereby replication of data is retained between the storage systems,
wherein a first storage system retains first data as replication target data, a second storage system retains second data as replication data of the first data, and a third storage system retains third data as replication data of the first data;
a host computer performs information processing by accessing the first data by using the first storage system through a communication line;
in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems; and in accordance with the instruction for the data updating, the second storage system performs the data updating of the second data, creates information regarding the data updating as a second journal by using information including the identifier received from the first storage system, and stores the second journal into a storage area in the second storage system; and in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and in the event of failure occurrence, transfer of the each individual journal is performed between the storage systems, and data updating is performed by using the transferred journal, wherein in the event that failure has occurred in a first host computer that performs information processing by accessing the first data by using the first storage system, when performing continuation/resumption of processing by using the second storage system and a second host computer using the second storage system, wherein the second storage system performs the data updating of the second data in accordance with an instruction received from the second host computer, creates information regarding the data updating as the second journal including the identifier, stores the second journal into the storage area in the second storage system, making of an instruction including the identifier for data updating of the first data to the first storage system in synchronization with the data updating via a communication line between the first and second storage systems, and in accordance with the instruction for the data updating, the first storage system performs the data updating of the first data, creates information regarding the data updating as the first journal by using the identifier, and stores the first journal into the storage area in the first storage system, wherein each storage system includes at least one group of data volumes for which data integrity is to be maintained, and wherein a journal volume is assigned to each of said at least one group of data volume.

18. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

a host computer performs information processing by accessing the first data by using the first storage system through a communication line;

in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems, and in accordance with the instruction for the data updating, the second storage system performs the data updating of the second data, creates information regarding the data updating as a second journal by using information including the identifier received from the first storage system, and stores the second journal into a storage area in the second storage system; and in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and in the event of failure occurrence, transfer of the each individual journal is performed between the storage systems, and data updating is performed by using the transferred journal, wherein the each individual storage system registers a group of data required to follow the data update sequence, allocates an update number in units of data updating in data in the group, and includes information regarding the group into the journal; and wherein in the storage system retaining the replication data, the data updating process is performed for the replication data in the sequence of the update number, wherein each storage system includes at least one group of data volumes for which data integrity is to be maintained, and wherein a journal volume is assigned to each of said at least one group of data volume.

19. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

a host computer performs information processing by accessing the first data by using the first storage system through a communication line;

in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems, and in accordance with the instruction for the data updating, the second storage system performs the data updating of the second data, creates information regarding the data updating as a second journal by using information including the identifier received from the first storage system, and stores the second journal into a storage area in the second storage system; and in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and in the event of failure occurrence, transfer of the each individual journal is performed between the storage systems, and data updating is performed by using the transferred journal, wherein the second storage system makes to the third storage system a write instruction for journal data from the second data, and in response thereto the third storage system receives the journal data and writes the data into the storage area, wherein each storage system includes at least one group of data volumes for which data integrity is to be maintained, and wherein a journal volume is assigned to each of said at least one group of data volume.

20. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

a host computer performs information processing by accessing the first data by using the first storage system through a communication line;

in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems, and in accordance with the instruction for the data updating, the second storage system performs the data updating of the second data, creates information regarding the data updating as a second journal by using information including the identifier received from the first storage system, and stores the second journal into a storage area in the second storage system; and in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and in the event of failure occurrence, transfer of the each individual journal is performed between the storage systems, and data updating is performed by using the transferred journal, wherein the timing with which journal transfer is performed between the storage systems in the asynchronization process is determined in accordance with the number of retained or exchanged journals in the storage systems, wherein each storage system includes at least one group of data volumes for which data integrity is to be maintained, and wherein a journal volume is assigned to each of said at least one group of data volume.

21. A data processing system of the type comprising:

a plurality of storage systems each including a control section and storage devices whereby to have the functionality of storing data into storage areas, wherein the storage systems are interconnected by means of communication lines whereby replication of data is retained between the storage systems, wherein a first storage system retains first data as replication target data, a second storage system retains second data as replication data of the first data, and a third storage system retains third data as replication data of the first data;

a host computer performs information processing by accessing the first data by using the first storage system through a communication line;

in accordance with an instruction received from the host computer, the first storage system performs data updating of the first data, creates of information regarding the data updating as a first journal including an identifier of data update sequence, stores the journal into a storage area in the first storage system, and making of an instruction including the identifier for data updating of the second data to the second storage system in synchronization with the data updating via a communication line between the first and second storage systems, and in accordance with the instruction for the data updating, the second storage system performs the data updating of the second data, creates information regarding the data updating as a second journal by using information including the identifier received from the first storage system, and stores the second journal into a storage area in the second storage system; and in asynchronization with the data updating of the first and second data, the third storage system retrieves the second journal from the second storage system via a communication line between the second and third storage systems, stores the second journal as a third journal into a storage area of the third storage system, and data updating of the third data based on the identifier in accordance with the data update sequence of the first data in the first storage system by using the third journal; and in the event of failure occurrence, transfer of the each individual journal is performed between the storage systems, and data updating is performed by using the transferred journal, wherein the each individual storage system stores the each individual journal into a journal-dedicated storage area in the own storage system, and frees the storage area from an oldest journal in the data update sequence in accordance with the identifier, wherein each storage system includes at least one group of data volumes for which data integrity is to be maintained, and wherein a journal volume is assigned to each of said at least one group of data volume.

* * * * *